United States Patent
Dingman et al.

(10) Patent No.: US 9,430,114 B1
(45) Date of Patent: *Aug. 30, 2016

(54) DATA TRANSFORMATION SYSTEM, GRAPHICAL MAPPING TOOL, AND METHOD FOR CREATING A SCHEMA MAP

(75) Inventors: Paul C. Dingman, Leander, TX (US); William G. Bunton, Austin, TX (US); Kathryn E. Van Dyken, Anderson, SC (US); Yimin Zhang, Austin, TX (US); Laurence T. Yogman, Austin, TX (US)

(73) Assignee: Pervasive Software, Austin, TX (US)

( * ) Notice: Subject to any disclaimer, the term of this patent is extended or adjusted under 35 U.S.C. 154(b) by 711 days.

This patent is subject to a terminal disclaimer.

(21) Appl. No.: 13/288,435

(22) Filed: Nov. 3, 2011

(51) Int. Cl.
*G06F 7/00* (2006.01)
*G06F 17/30* (2006.01)
*G06F 3/048* (2013.01)
*G06F 15/16* (2006.01)

(52) U.S. Cl.
CPC .............. *G06F 3/048* (2013.01); *G06F 15/16* (2013.01)

(58) Field of Classification Search
CPC .......... G05F 7/00; G06F 17/30; G06F 3/048; G06F 15/16
See application file for complete search history.

(56) References Cited

U.S. PATENT DOCUMENTS

| | | | |
|---|---|---|---|
| 5,627,979 A | 5/1997 | Chang et al. | |
| 6,061,515 A | 5/2000 | Chang et al. | |
| 6,785,689 B1 | 8/2004 | Daniel et al. | |
| 6,795,868 B1 * | 9/2004 | Dingman | G06F 17/30569 707/999.202 |
| 6,823,495 B1 | 11/2004 | Vedula et al. | |
| 7,003,722 B2 | 2/2006 | Rothchiller et al. | |
| 7,096,422 B2 | 8/2006 | Rothschiller et al. | |
| 7,159,185 B1 | 1/2007 | Vedula et al. | |
| 7,181,734 B2 | 2/2007 | Swamy et al. | |
| 7,225,411 B1 | 5/2007 | Stoner et al. | |
| 7,237,207 B2 | 6/2007 | Panditharadhya et al. | |
| 7,406,660 B1 | 7/2008 | Sikchi et al. | |
| 7,437,378 B2 | 10/2008 | Minium et al. | |
| 7,478,079 B2 | 1/2009 | Robertson et al. | |
| 7,516,145 B2 | 4/2009 | Sikchi et al. | |
| 7,647,298 B2 | 1/2010 | Adya et al. | |
| 7,680,767 B2 | 3/2010 | Adya et al. | |
| 7,685,208 B2 | 3/2010 | Gaurav et al. | |

(Continued)

OTHER PUBLICATIONS

Raffio et al., "Clip: a Visual Language for Explicit Schema Mappings," ICDE 2008, pp. 30-39.

(Continued)

*Primary Examiner* — Azam Cheema
(74) *Attorney, Agent, or Firm* — Egan, Peterman, Enders & Huston LLP

(57) ABSTRACT

Graphical mapping interface embodiments and method are provided for creating and displaying a schema map, which may be used by a data transformation system to perform a data transformation between at least one source schema and at least one target schema. According to one embodiment, the graphical mapping interface may comprise a source schema region for displaying a graphical representation of at least one source schema, a target schema region for displaying a graphical representation of at least one target schema, and a mapping region for displaying graphical representations of a plurality of links connecting the source nodes displayed in the source schema region to the target nodes displayed in the target schema region. The plurality of links may comprise at least one control link having at least one ECA rule associated therewith and at least one data link having at least one textual-based target field expression associated therewith.

36 Claims, 44 Drawing Sheets

(56) References Cited

U.S. PATENT DOCUMENTS

| | | | |
|---|---|---|---|
| 7,693,861 B2 | 4/2010 | Mital et al. | |
| 7,703,099 B2 | 4/2010 | Gaurav et al. | |
| 7,712,042 B2 * | 5/2010 | Hernandez-Sherrington | G06F 3/0481 |
| | | | 715/713 |
| 7,739,292 B2 | 6/2010 | Falk et al. | |
| 7,739,309 B2 | 6/2010 | Singh et al. | |
| 7,783,614 B2 | 8/2010 | Jones et al. | |
| 7,853,553 B2 * | 12/2010 | Lankinen et al. | 707/602 |
| 8,392,356 B2 * | 3/2013 | Stoner | G06F 17/30569 |
| | | | 707/602 |
| 2002/0052893 A1 * | 5/2002 | Grobler | G06F 17/30569 |
| | | | 715/234 |
| 2004/0117407 A1 | 6/2004 | Kumar et al. | |
| 2006/0218158 A1 | 9/2006 | Stuhec et al. | |
| 2007/0239749 A1 | 10/2007 | Farahbod | |
| 2008/0140601 A1 | 6/2008 | Mital et al. | |
| 2010/0049728 A1 | 2/2010 | Chiticariu et al. | |

OTHER PUBLICATIONS

Legler et al., "A Classification of Schema Mappings and Analysis of Mapping Tools," BTW 2007, pp. 449-463.

Office Action mailed Mar. 18, 2014 for U.S. Appl. No. 13/288,380.

Office Action mailed Oct. 7, 2014 for U.S. Appl. No. 13/288,380.

Final Office Action mailed Apr. 6, 2016 for U.S. Appl. No. 13/288,380.

Notice of Allowance mailed Aug. 28, 2015 for U.S. Appl. No. 13/288,380.

* cited by examiner

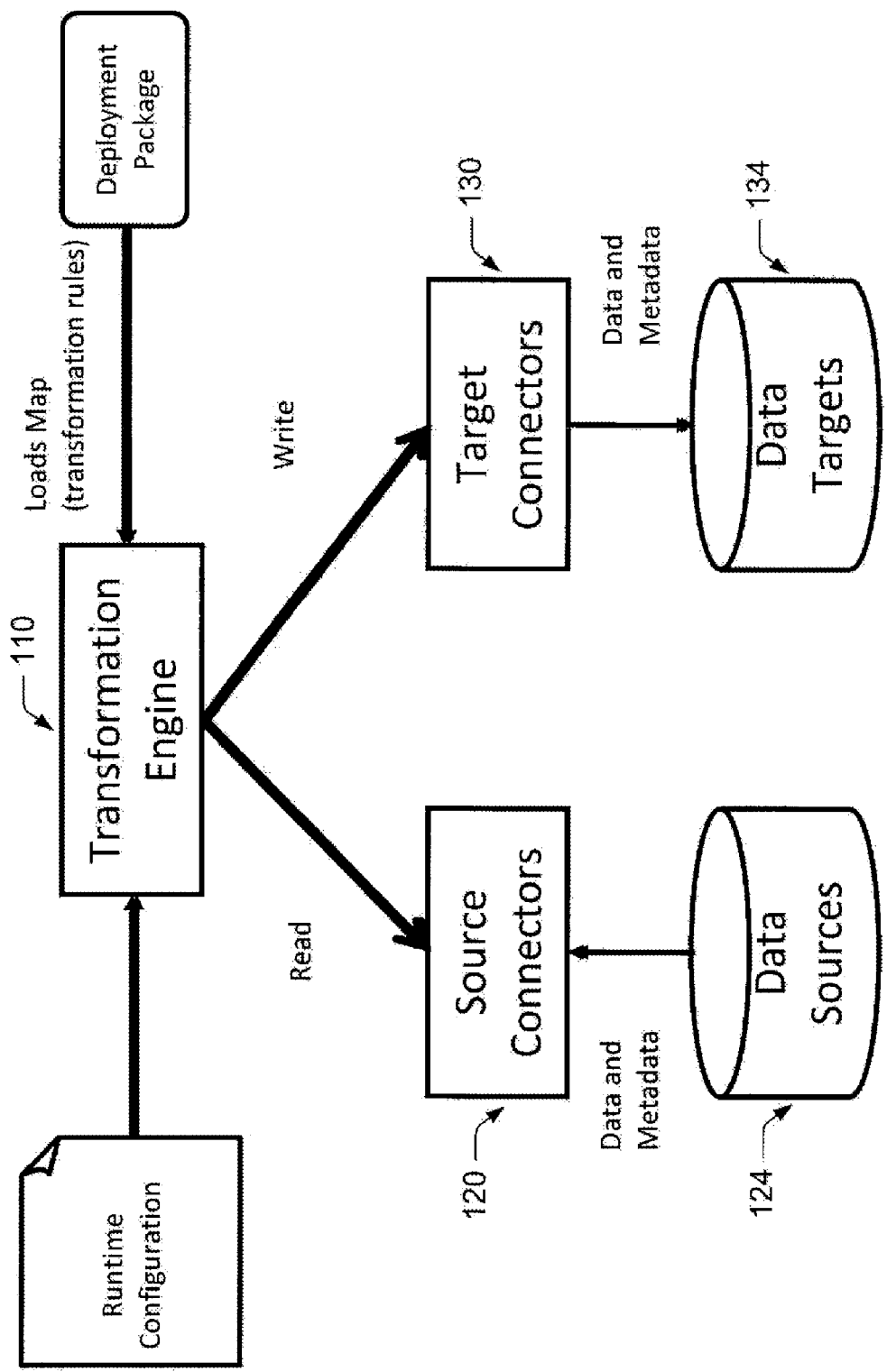

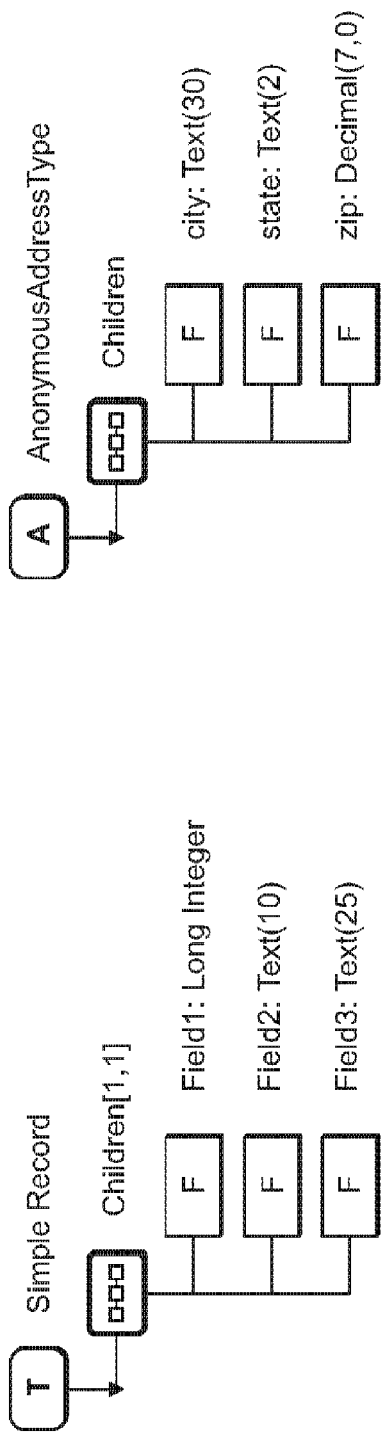
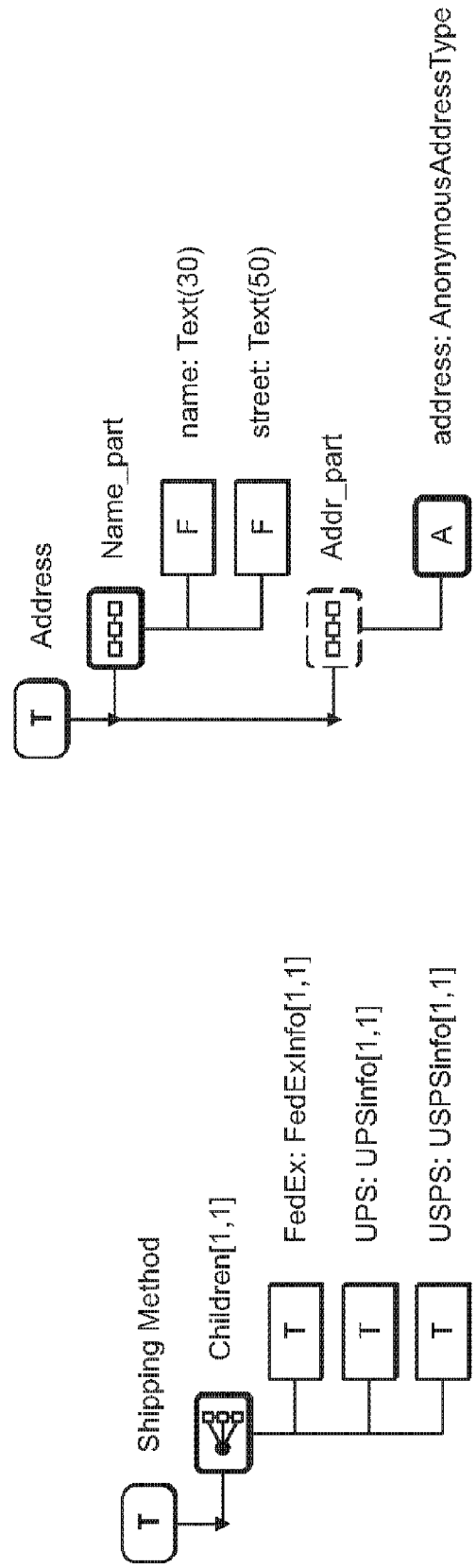
FIG. 4
FIG. 5
FIG. 6

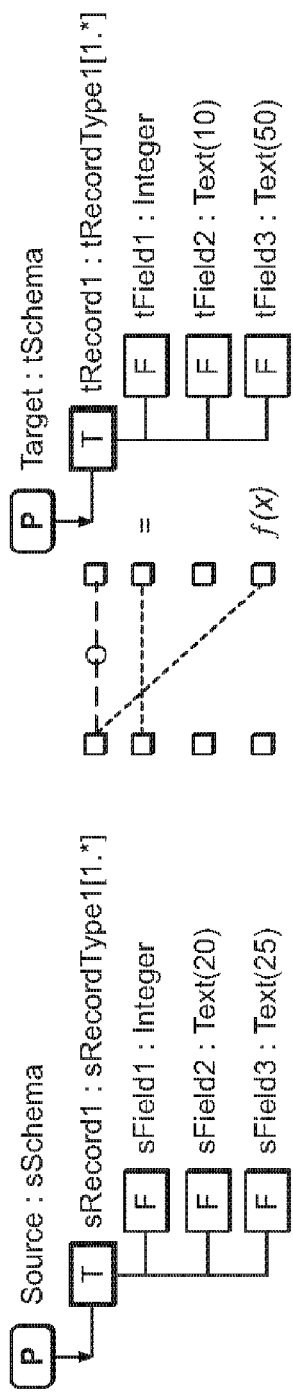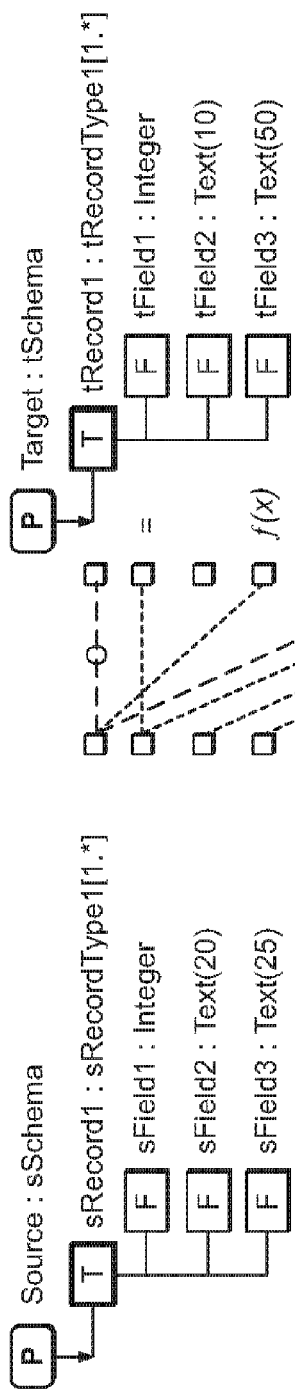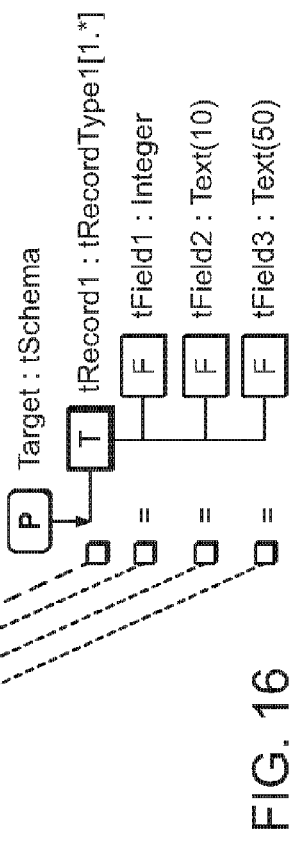
FIG. 15
FIG. 16

DATA TRANSFORMATION SYSTEM, GRAPHICAL MAPPING TOOL, AND METHOD FOR CREATING A SCHEMA MAP

BACKGROUND OF THE INVENTION

1. Field of the Invention

This invention relates to data transformation and, more particularly, to an improved schema mapping language and graphical mapping tool, which is suitable for use within an event-driven data transformation system.

2. Description of the Related Art

The following descriptions and examples are given as background only.

Databases play an integral role in the information systems of most major organizations, and may take many forms, such as mailing lists, accounting spreadsheets, and statistical sales projections. After using several generations of technology, an organization having data stored in many different systems and formats may wish to combine or integrate their disparate data into a common format, or one that meets their current needs. To achieve data integration between disparate data sources, it is often necessary to transform the content, format, and/or structure of the data in the data sources.

E-commerce is another area that relies upon data integration and transformation. For example, the explosive growth and wide-spread use of the Internet has encouraged more and more businesses to develop new ways to facilitate efficient and automated interactions between their own internal departments, as well as their customers, suppliers, and business partners. However, building successful e-commerce systems presents many challenges to the system architect, as each company may store data and documents in different formats. To be successful, a business may need to transform the content, format and/or structure of the data into a form used or preferred by its internal departments, customers, suppliers and business partners.

Data transformation generally refers to a sequence of operations that transforms a set of input data (i.e., a "data source") into a set of output data (i.e., a "data target"). More specifically, data transformation refers to the changing of the content, format, and/or structure of the data within a data source. Though the term "data conversion" has a slightly different technical connotation, it is often used synonymously with the term "data transformation."

Common content changes typically include adding, deleting, aggregating, concatenating, and otherwise modifying existing data. Common data formats include, but are not limited to, binary files, sequential files, embedded binary data, EBCDIC data from mainframes, ISAMs (Indexed Sequential Access Methods) and other record managers, PC-based databases, accounting applications (including Enterprise Resource Planning, ERP, or Customer Relationship Management, CRM), business-to-business applications (including those using EDI, XML, HIPAA, HL7, FIX or SWIFT) and Web-based data. Common data source structures include, but are not limited to, spreadsheets, contact managers, mail list software, and statistical packages. A data transformation, as used herein, may involve changing one or more of the above-mentioned characteristics of a data source.

Current data transformation techniques include custom-coded solutions, customized tools and off-the-shelf products. Custom-coded solutions and customized tools are generally expensive to implement, are not portable, and are difficult to adapt to new or changing circumstances. Off-the-shelf products also tend to be costly, have steep learning curves and usually require system developers to create code for mapping input data to output data. Regardless of the particular solution chosen, the process of transforming data becomes increasingly complicated with each increase in the number of data sources, the number of data targets, the content of the data sources/targets, the format of the data sources/targets, and the complexity of the corresponding data structures.

At the heart of every data transformation technique is the requirement to map data from a data source to a data target. This is commonly achieved, in both database management and e-commerce systems, by mapping the elements of a source schema to those of a target schema. In general, a "schema" defines the structure and, to some extent, the semantics of a source or target.

The eXtensible Markup Language (XML) provides a standardized format for document and data structure definition, and was developed by the World Wide Web Consortium (W3C) to provide an easier way to integrate data between applications and organizations over the Internet. In the past, when two organizations wanted to exchange or integrate information over the Internet, they would create schemas for their documents in XML. An XML schema is a description of a type of XML document, typically expressed in terms of constraints on the structure and content of documents of that type, above and beyond the basic syntactical constraints imposed by XML itself. Many XML-based schema languages exist, including but not limited to, the Document Type Definition (DTD) language, the XML Schema and RELAX NG.

Once source and target schemas were defined, system developers would create code for mapping the source schema elements to target schema elements using an XML-based transformation language. Although many transformation languages exist, the eXtensible Stylesheet Language (XSL) was often used to create mapping code by defining an XSL transformation style sheet. In general, the XSL style sheet is a form of mapping which includes a template of the desired target structure, and identifies data in the source document to insert into this template. This model of merging data and templates is referred to as the template-driven model and works well on regular and repetitive data. XSL also provides capabilities for handling highly irregular and recursive data, as is typical in documents.

However, defining an XSL style sheet can be difficult, especially for complex schemas and mappings. In addition, code must be written for mapping the relationships between each source and target set. Whether the mapping code is written in XSL or another transformation language, writing this code is difficult, time consuming and typically beyond the capabilities of ordinary business personnel.

One way to resolve this problem is to build a graphical representation of the mappings between the source and target schemas. There are currently several graphical mapping tools on the market, which allow a user to quickly create mappings between source and target schemas by drawing lines or "links" between elements of the source and target schemas. In one example, a graphical mapping tool may present a source schema on the left side, and a target schema on the right side of a user interface window. A mapping region arranged between the source and target schema representations may be used to graphically and functionally link the elements of the source and target schemas. Once the mappings are graphically defined, the mapping tool automatically generates an executable transformation program, e.g., by compiling an XSL transformation style sheet, to transform the data.

To control the transformation between source and target schemas, many graphical mapping tools allow "functoids," "function components," or "function blocks" (referred to collectively herein as "functoids") to be inserted within the links connecting the source and target schema elements. A "functoid" is a graphical representation of a functional operation used in the transformation of a source schema element to a target schema element. Each functoid has pre-defined script or program code associated with a single functional operation, such as a mathematical or logical operation. The graphical mapping tool provides a plurality of functoids for user selection and insertion into the graphical mapping area. The transformation between a source schema element and a target schema element is dictated by the combination of all links and functoids connecting the source and target elements together.

Graphical mapping tools, such as those described above, reduce the time and effort involved in the mapping process by providing a relatively simple, graphical method for defining schema mappings. These graphical mapping tools allow business personnel to generate mappings without extensive knowledge of programming languages or the assistance of programmers. However, graphical mapping tools of this sort have many limitations.

First of all, large schema mappings are difficult to represent graphically in functoid-based graphical mapping tools, as the use of functoids creates congestion in the mapping area. Furthermore, while functoids can have multiple inputs, they typically have only one output, which must be copied to link the functoid output to multiple target elements. This may further increase congestion by requiring various links and functoids to be replicated if a source element is to be mapped to multiple target elements, as is often the case when mapping hierarchical data structures. Moreover, the mapping region in functoid-based mapping tools does not specify relationships between source and target elements, making it difficult to relate any given target with its corresponding source. Finally, while functoids graphically represent the rules used to transform a source schema into a target schema, they cannot be used to initiate or control transformations, which are dependent on the occurrence of a particular event (i.e., event-driven transformations).

Therefore, a need exists for an improved schema mapping language and graphical mapping tool, which overcomes the disadvantages of conventional mapping languages and tools. An ideal schema mapping language and graphical mapping tool would require a minimum amount of custom programming on the part of the user, would be as simple possible and would be as visual as possible. In addition, an ideal schema mapping language and graphical mapping tool would support schema mappings between multiple sources/targets, intermediate targets, multi-mode targets and event-driven transformations. Furthermore, an ideal schema mapping language and graphical mapping tool would be able to generate and control mappings between hierarchical data structures (such as found, for example, in business-to-business applications) with the same efficiency and ease with which mappings are generated and controlled between relational data structures (e.g., flat file data structures).

SUMMARY OF THE INVENTION

The following description of various embodiments of a data transformation system, graphical mapping interface and method is not to be construed in any way as limiting the subject matter of the appended claims.

A graphical mapping interface is provided herein for creating and displaying a schema map, which may be used by a data transformation system to perform a data transformation between at least one source schema and at least one target schema. A "schema," as described herein, defines the structure of a data source or data target, including the various types of records and fields (sometimes referred to as schema elements or nodes) found within the data source or target. In many cases, schemas may be displayed as a tree comprising a root schema node followed by one or more record and/or field nodes. A "schema map," as described herein, is a data transformation map that specifies the "mappings" or relationships between the nodes of a source and target schema, including all expressions and rules necessary to transform data from a data source into a desired format before the transformed data is transferred to, or stored within, a data target.

According to one embodiment, the graphical mapping interface described herein may comprise a main map window including a source schema region, a target schema region and a mapping region. The source schema region may be adapted for displaying a graphical representation of at least a primary source schema, which defines a structure of a primary data source. The target schema region may be adapted for displaying a graphical representation of at least one target schema, which defines a structure of a data target. The mapping region may be adapted for creating and displaying a graphical representation of one or more links connecting one or more nodes of the primary source schema to one or more nodes of the at least one target schema.

In some embodiments, a schema map may include multiple sources in the source schema region of the main map window. For example, a schema map may include one or more "secondary sources" in addition to a primary source mentioned above. These secondary sources may include one or more constant variables and/or intermediate targets, such as a row set, a dynamic lookup table or a static lookup table. When an intermediate target is added to the source schema region of the main map window, a "mini-map" may be created for mapping one or more of the previously added sources (e.g., the primary source, a previously added secondary source or a constant variable) into the newly added intermediate target. Once mapping is complete and the mini-map is closed, the intermediate target becomes a secondary source in the source schema region. There is generally no limit to the number of intermediate targets that can be added to the source schema region as secondary sources. Each secondary source added to the source schema region is available for mapping into a primary target or a secondary target displayed in the target schema region of the main map window.

In some embodiments, mini-maps may be created to perform lookup operations or to temporarily store sets of records from the previously added primary or secondary sources. In addition, mini-maps may be created to facilitate other types of intermediate targets and advanced mapping features, such as aggregation, pivot/unpivot operations, and synthetic key generation. The use of mini-maps provides a mechanism to make complex schema maps modular, thus, simplifying the process of building complex schema maps. In some embodiments, mini-maps may be defined independently of a schema map, so that a mini-map can be reused in the same schema map or included within a library of mini-maps for use within other schema maps.

According to one embodiment, mini-maps may be implemented as pop-up map windows, which are accessible from the main map window. For example, a pop-up map window (i.e., a first mini-map window) may be displayed upon adding a first intermediate target schema to the schema map for creating a mapping between the primary source schema and the first intermediate target schema. In some embodiments, the mapping created in the pop-up map window may be used to perform a lookup operation on the primary source schema and to provide results of the lookup operation to the first intermediate target schema. In other embodiments, the mapping displayed in the pop-up map window may be used to transfer at least a subset of data from the primary source schema to the first intermediate target schema. As noted above, however, the mapping displayed in the pop-up window may be adapted to perform other operations, and thus, should not be restricted to the exemplary operations specifically recited herein.

Once mapping is complete and the pop-up map window is closed, a graphical representation of the first intermediate target schema may be displayed in the source schema region, and accessible for mapping within, the main map window. For example, the mapping region of the main map window may be adapted for creating and displaying a graphical representation of a link connecting a node of the first intermediate target schema displayed in the source schema region of the main map window to a node of the at least one target schema displayed in the target schema region of the main map window. In other words, the first intermediate target schema may act as a target in the pop-up map window and as a source in the main map window. This enables the intermediate target schema to be used, e.g., for performing a lookup operation on the primary data source or for temporarily storing a subset of the data from the primary data source.

Like the main map window, the pop-up map window may generally comprise a source schema region for displaying a graphical representation of the primary source schema, a target schema region for displaying a graphical representation of the first intermediate target schema, and a mapping region for creating and displaying a graphical representation of one or more links connecting one or more nodes of the primary source schema to one or more nodes of the first intermediate target schema. In some embodiments, the pop-up map window may further comprise an expression region for creating and displaying at least one target field expression for at least one node of the first intermediate target schema.

In some embodiments, the mapping region of the pop-up map window may be further adapted for displaying at least one control link connecting a source record node of the primary source schema to an intermediate record node of the first intermediate target schema. The at least one control link may comprise a rule (referred to herein as an Event-Condition-Action rule, or ECA rule), which specifies an event corresponding to the source record node, a conditional expression, and an action to be performed for the first intermediate target node if an occurrence of the event is detected in the primary data source and the conditional expression is met. In some embodiments, the rule may be created and displayed in a console panel region of the main map window when the pop-up map window is displayed.

In some embodiments, the graphical mapping interface described herein may comprise a second pop-up map window, which is accessible from the main map window and adapted for creating and displaying a mapping between a second intermediate target schema and at least one of the primary source schema and the first intermediate target schema. Like the first pop-up map window, the mapping displayed in the second pop-up map window may be adapted for performing a lookup operation on one or more of the previously added sources (e.g., the primary data source and/or the first intermediate target schema), or for temporarily storing a subset of the data from one or more of the previously added sources. Upon closing the second pop-up map window, a graphical representation of the second intermediate target schema may be displayed in the source schema region of, and accessible for mapping within, the main map window.

According to another embodiment, a method is provided herein for creating a mapping in a graphical mapping tool, such as the graphical mapping interface described above. In one exemplary embodiment, the method may comprise displaying a main map window comprising a source schema region, which is adapted for displaying a graphical representation of a primary source schema defining a structure of a primary data source, accessing a pop-up map window from the main map window, and creating a mapping between the primary source schema and an intermediate target schema within a mapping region of the pop-up map window.

In some embodiments, the step of creating a mapping between the primary source schema and the intermediate target schema may comprise displaying a graphical representation of the primary source schema within a source schema region of the pop-up map window, displaying a graphical representation of the intermediate target schema within a target schema region of the pop-up map window. As noted above, the primary source schema may generally comprise a plurality of source nodes, whereas the intermediate target schema may generally comprise a plurality of intermediate target nodes. In addition, the step of creating a mapping between the primary source schema and the intermediate target schema may comprise creating a mapping between the primary source schema and the intermediate target schema by drawing a plurality of links between the source nodes and the intermediate target nodes. In general, the plurality of links may comprise at least one control link and at least one data link. Graphical representations of the control and data links may displayed in a mapping region of the pop-up map window.

In some embodiments, the step of creating a mapping between the primary source schema and the intermediate target schema may further comprise specifying a rule associated with the at least one control link, wherein the at least one control link connects a particular source node to a particular intermediate target node, and wherein the rule specifies an event corresponding to the particular source node, a conditional expression, and an action to be performed for the particular intermediate target node if an occurrence of the event is detected in the primary data source and the conditional expression is met.

In some embodiments, the step of creating a mapping between the primary source schema and the intermediate target schema may further comprise specifying at least one target field expression within an expression region of the pop-up map window for at least one intermediate target node displayed in the target schema region of the pop-up map window. In such embodiments, a textual representation of the at least one target field expression may be displayed in the expression region of the pop-up map window.

Upon closing the pop-up map window, a graphical representation of the intermediate target schema may be displayed in the source schema region of the main map window, so that the intermediate target schema is accessible for mapping within the mapping region of the main map window. In some embodiments, the method may further comprise creating, within the mapping region of the main map window, a mapping between the intermediate target schema displayed in the source schema region and a primary target schema displayed in a target schema region of the main map window.

In some embodiments, the method may further comprise accessing a second pop-up window from the main map window, wherein the second pop-up window is associated with the graphical representation of the intermediate target schema displayed in the source schema region of the main map window, and creating a mapping within the second pop-up map window between a second intermediate target schema and at least one of the primary source schema and the intermediate target schema. Upon closing the second pop-up map window, a graphical representation of the second intermediate target schema may be displayed in the source schema region of the main map window, so that the second intermediate target schema is accessible for mapping within the mapping region of the main map window.

According to another embodiment, a graphical mapping interface is provided herein for creating and displaying a schema map. In general, the graphical mapping interface may generally comprise a source schema region, a target schema region and a mapping regions. The source schema region may adapted for displaying a graphical representation of at least one source schema. The target schema region may be adapted for displaying a graphical representation of at least one target schema. The mapping region adapted for creating and displaying a graphical representation of links connecting nodes of the at least one source schema to nodes of the at least one target schema.

In some embodiments, the graphical mapping interface may be configured for creating a schema map, which includes one or more multi-mode targets. Unlike single-mode targets, which support only one output operation on a target object, multi-mode targets support multiple types of output operations on one or more target objects. To provide support for multi-mode targets, target schema region described herein may be adapted for displaying a graphical representation of at least one target schema comprising at least one target record node having multiple output operations associated therewith. In general, the multiple output operations may be selected from a group comprising an insert operation, a delete operation, an update operation and an upsert operation. In some embodiments, the at least one target schema may comprise a plurality of record types, and wherein an output operation and a target reference name is defined for each record type.

In some embodiments, the graphical mapping interface may be configured for creating a schema map, which supports mappings between a plurality of source schemas and a plurality of target schemas. In some embodiments, the plurality of source schemas and the plurality of target schemas may comprise one or more different types of schemas. Examples of the different types of schemas that may be included within the source and/or target schema regions include single mode, multi-mode, multi-record, flat and hierarchical schema types. The ability to support all schema types within a single graphical mapping interface provides a significant advantage over conventional mapping tools.

According to another embodiment, a data transformation system is provided herein for performing a data transformation between at least one source schema and at least one target schema. In a preferred embodiment, the data transformation system may be an event-driven data transformation system and may be specifically configured for executing event-driven data transformations.

The data transformation system described herein may generally comprise a plurality of transformation system components, which are divided amongst two environments: a design environment and a runtime environment. Design components are typically used to design, build and manage projects and project artifacts (including schema maps), and thus, are primarily deployed in the design environment. Once a project is complete, the runtime components may be used to load and run a project in the runtime environment. It is noted, however, that some of the transformation system components described herein may function during both design and runtime. Thus, the division of components amongst environments is not to be considered restrictive.

In one embodiment, the design components may comprise a graphical mapping interface, a design repository, a design repository service and a package builder, among other components. In preferred embodiments, the data transformation system may comprise one or more embodiments of the graphical mapping interface described herein. It is noted, however, that the data transformation system may be capable of performing data transformations in accordance with schema maps generated and received from alternative mapping tools, and thus, should not be restricted in all embodiments to the graphical mapping interface embodiments described herein.

The design repository may be configured for storing a schema map and other artifacts associated with a project. The design repository service may be configured for accessing the schema map and artifacts stored within the design repository. In one embodiment, the design repository service may be implemented as web-service, such as a RESTful Web service. Implementing the design repository service as a web service allows multiple users to access the design repository from various locations via any internet browser using HTTP or HTTPS protocols. The design repository service thereby provides an easy method for accessing and sharing designs, such as schema maps. The package builder may be coupled for extracting the schema map from the design repository and configured for packaging the schema map, along with other project artifacts, into a deployment package. In addition to providing a single container for all project artifacts, the package builder described herein allows moving/sharing of entire projects via a file system, and in some embodiments, enables deployment packages to be distributed to remote processing nodes.

In one embodiment, the runtime components may comprise a read spoke configured for retrieving data from a data source, and a target spoke configured for storing transformed data to a data target. In addition, the runtime components may comprise a transformation engine, which is coupled to the read spoke for receiving the data from the data source, coupled to the target spoke for storing the transformed data in the data target, and coupled to the package builder for receiving the deployment package. As such, the transformation engine may be configured for transforming the received data into the transformed data using the schema map included within the deployment package.

BRIEF DESCRIPTION OF THE DRAWINGS

Other objects and advantages of the invention will become apparent upon reading the following detailed description and upon reference to the accompanying drawings in which:

FIGS. 2A-2B are block diagrams illustrating exemplary components of the event-driven transformation system of FIG. 1;

FIG. 4 illustrates an example of a sequence group node;

FIG. 5 illustrates an example of a Choice group node;

FIG. 6 illustrates examples of an inherited group node;

FIG. 15 illustrates an example of a record type reference to field link;

FIG. 16 illustrates an example of control links;

FIG. 26 is a screen shot illustrating an exemplary embodiment of a multi-mode target;

FIG. 27 is a screen shot illustrating an exemplary embodiment of the graphical mapping interface after primary source and target schemas have been defined for the schema map;

FIGS. 39-40 are screen shots illustrating an exemplary embodiment for adding control and data links to the mini-map of FIG. 22-38 and for specifying ECA rule(s) for any control links of the mini-map via the console panel of the graphical mapping interface;

Figure 1:
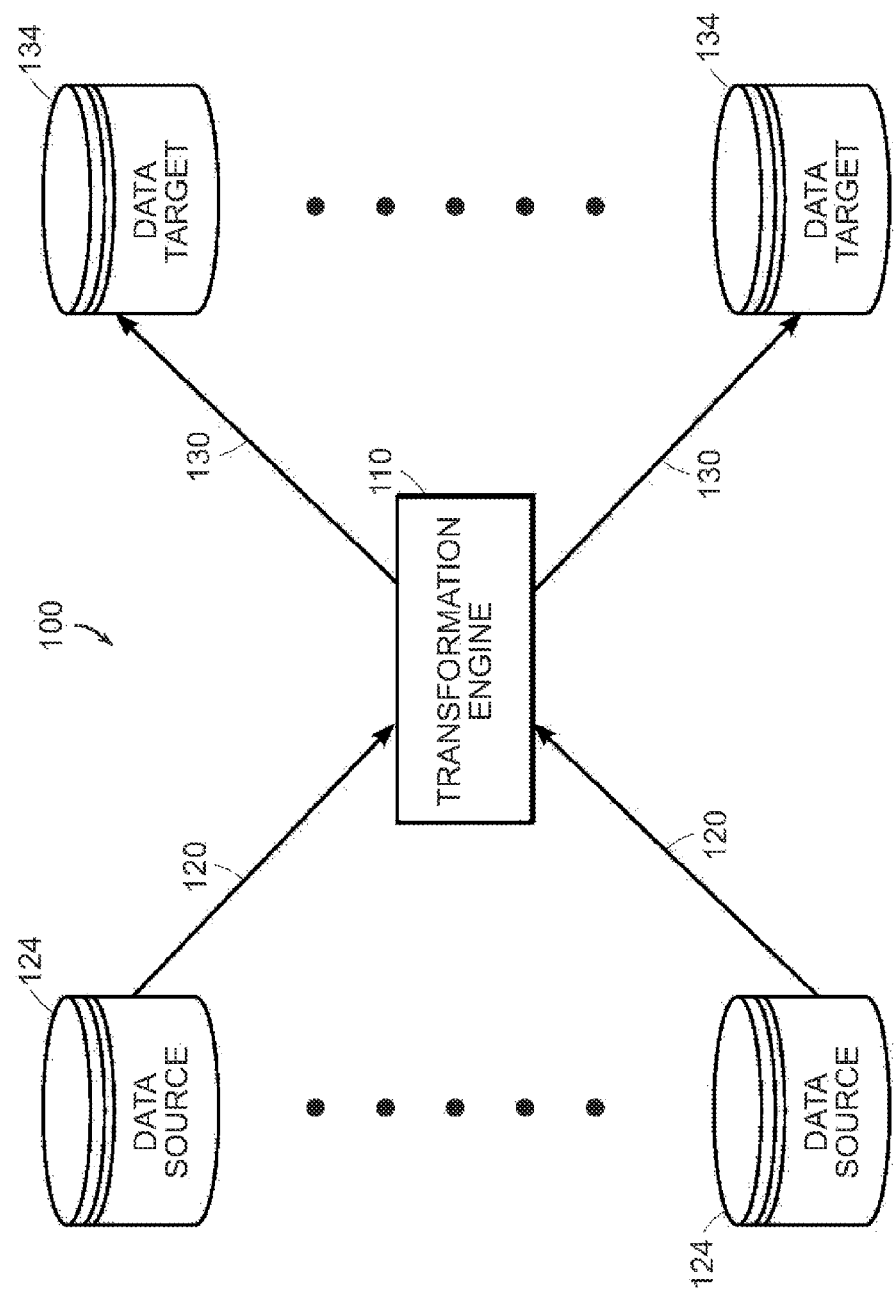
FIG. 1 is a block diagram illustrating one embodiment of an event-driven transformation system.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF PREFERRED EMBODIMENTS

The present invention addresses the shortcomings of conventional mapping tools with an improved schema mapping language and an improved graphical mapping tool, which is suitable for use within an event-driven data transformation system. One embodiment of an event-driven data transformation system and method is described in detail below. However, a skilled artisan would understand how the inventive concepts described herein may be incorporated within other transformation systems and methods without departing from the scope of the invention.

I. A Preferred Embodiment of an Event-Driven Transformation System and Method for Transforming Data FIG. 1 illustrates one embodiment of an event-driven transformation system 100 in accordance with the present invention. As shown, transformation system 100 employs a modular hub and spoke architecture. A hub and spoke architecture is well-suited for data transformation because it permits infinite extensibility, both in the power of the central transformation engine, as well as the richness of formats supported by the spokes. The "hub" is a data transformation engine 110, which functions generally to read and transform various types of structured data. Read spokes 120 and write spokes 130 are operatively coupled to transformation engine 110, serving as the interface between transformation engine 110, data sources 124 and data targets 134, respectively. In some cases, a "spoke" may also be referred to herein as a "connector" or an "adapter."

As used herein, a "spoke" is a data access adapter for one or more specific types of data. The spoke objects provide the necessary information to allow transformation engine 110 to retrieve and write data to the data structures in a source or target. The specific information that a spoke requires depends on the type of data and the data structure. In most cases, transformation system 100 may include a plurality of preprogrammed spokes for many of the commonly known data formats and database management systems (DMBSs), including, but not limited to, Oracle Database, IBM DB2, Microsoft SQL Server, dBase, XML, EDI, HIPAA, HL7, FIX, SWIFT, delimited ASCII, and fixed ASCII. In addition, spokes may be implemented for providing access to data through various middleware products, such as ODBC, JDBC or ADO.Net, and through a variety of application programming interfaces, such as Remedy ARS. It is noted that the event driven transformation system 100 is not limited to the use of any one or set of specific data types. Spokes can be preprogrammed or developed for any data type and structure, thereby allowing transformation engine 110 to interface with any data type and structure.

In many applications, data sources 124 and data targets 134 may be database objects, with records and fields. However, the transformation engine 110 is compatible with any store of is data, that incorporates any type of data structures, including without limitation data stored in random access memory, data in a data stream, a result of a query against a DBMS, an electronic message, and an application programming interface.

Preferably, transformation engine 110 streams data from source to target, meaning that it is capable of connecting to, and passing records to and from sources 124 and targets 134 without using an intermediately stored file. Thus, while data passes through the transformation engine 110, it can be massaged "on the fly" into the exact output format required.

In one embodiment, transformation system 100 may be written in C++. In particular, the elements (e.g., transformation engine 110, read spokes 120 and write spokes 130) may be C++ code wrapped as shared libraries (e.g., UNIX, Linux) and/or dynamically link libraries (e.g., Windows DLLs). Consequently, transformation system 100 may be a portable, cross-platform, expandable data transformation solution that may be incorporated into complementary products. However, transformation system 100 is not limited to the C++ programming language in all embodiments of the invention. In some embodiments, the transformation system may be implemented in part or in whole using other platform-independent programming languages (such as Java, for example).

Figure 2A:
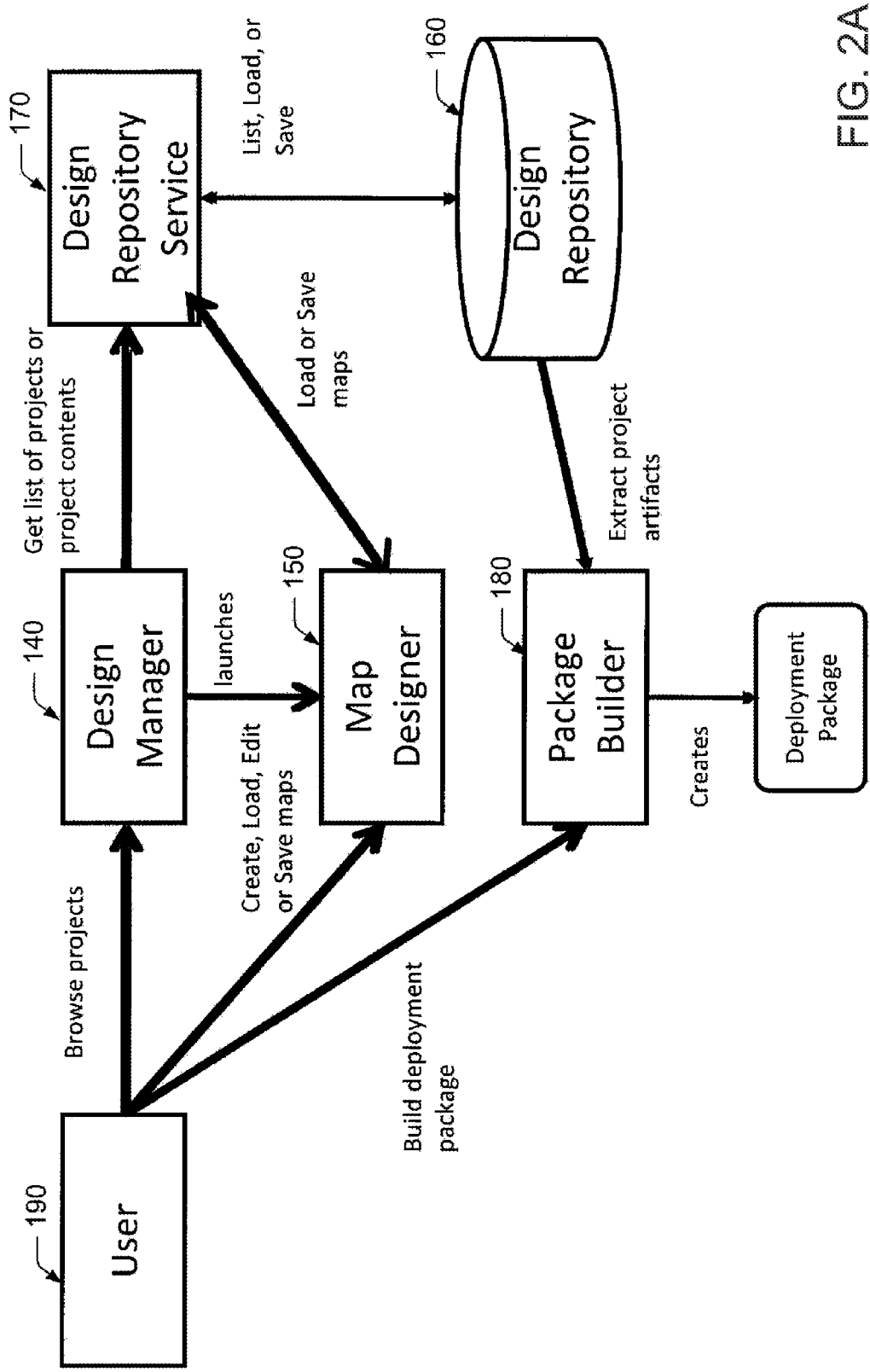

FIGS. 2A and 2B are block diagrams illustrating one embodiment of the event-driven data transformation system 100 in more detail. The components of transformation system 100 are divided amongst two environments: a design environment (FIG. 2A) and a runtime environment (FIG. 2B). The transformation system components shown in FIG. 2A are typically used to design, build and manage projects and artifacts (e.g., transformation maps, schemas, etc.), and thus, are primarily deployed in the design environment. Once a project is complete, the transformation system components shown in FIG. 2B may be used to load and run the project in the runtime environment. It is noted, however, that some of the transformation system components may function during both design and runtime. Thus, the division of components amongst environments is not to be considered restrictive.

As shown in FIG. 2A, transformation system 100 may include a design manager 140, a map designer 150, a design repository 160, a design repository service 170, and a package builder 180. Design manager 140 allows a user 190 to browse the projects and the project contents (e.g., design artifacts contained within a project, such as transformation maps, schemas, etc.) stored within the design repository 160. The design manager 140 is also used to launch the designers, which are used to create and edit the projects and design artifacts. Map designer 150 is one example of a designer that may be launched from the design manager 140. Other designers not specifically mentioned herein may also be included within the transformation system 100. However, only map designer 150 will be described in detail herein for the sake of brevity.

Map designer 150 provides a graphical user interface that permits a user 190 to create, load, edit and save transformation maps and their associated schemas. In particular, map designer 150 permits the user to view the data and metadata retrieved from sources 124 and written to targets 134, and to specify the relationships between the data (called "mappings"). When viewing the source and target data, the data is presented as "schemas," and mappings are generated by specifying relationships between the source and target schema elements. In some embodiments, the mappings may include one or more expressions for transforming the schema elements from sources 124 to targets 134. In addition, the mappings may include one or more rules for initiating or controlling transformations, which are dependent on the occurrence of a particular event (i.e., event-driven transformation rules). A "schema map" includes all the mappings, expressions and rules needed to transform the schema elements from sources 124 to targets 134.

As noted above, some of the transformation system components may function during both design and runtime. For example, the read spokes 120 and write spokes 130 mentioned above and shown in the runtime environment of FIG. 2B may function in the design environment to retrieve data from the data source(s) 124 and data target(s) 134 specified in a project. In many instances, spokes 120 and 130 may retrieve information about the data source 124 and data target 134, along with the data. This information is generally referred to as "metadata," is broadly defined as "data about data," and among other things, may inform the user how the data arrived in the data store, where it came from, and how the data is laid out in the data structures of the data sources 124 and data targets 134. Exemplary types of metadata retrieved from the data sources/targets may include, but are certainly not limited to, data type, length, number of decimal places, and whether or not a field is an ID field, is creatable, updatable or allows null values. There are many different types of metadata. The type of metadata retrieved by spokes 120 and 130 varies depending on its origin and the object that it describes.

As shown in FIG. 2A, map designer 150 receives the data and metadata retrieved by spokes 120 and 130 from data source(s) 124 and data target(s) 134, and presents the data and metadata to the user 190 in a graphical user interface as source and target schemas. As described in more detail below, presenting the data and metadata to the user in the graphical mapping interface allows the user to link source and target schema elements, and to specify transformation rules and expressions between the linked elements. In one embodiment, the graphical mapping interface may allow the user to link source and target schema elements by drawing a graphical line between the linked elements, and to include expressions by creating expressions at the target end of the linked elements. As such, map designer 150 may be alternatively referred to herein as a "graphical mapping tool" or a "graphical mapping interface."

The design repository 160 is a data store for storing and managing projects and design artifacts. For example, the schema maps generated by the map designer 150 are one example of a design artifact that may be stored in and loaded from the design repository 160. In some cases, metadata generated by the map designer 150 may be stored within the design repository 160 along with its corresponding schema map. The metadata generated by the map designer 150 may include, without limitation, the specifications of a transformation; schemas; run time configurations; data set definitions; scripts; SQL query statements; information regarding system changes and the accomplishment of transformation goals. Storing schema maps and metadata within the design repository 160 is often desirable as it allows user 190 to reuse, adapt, and/or improve upon previously specified mappings.

The design repository service 170 provides an interface through which the map designer 150 may load or save schema maps to the design repository 160. In addition, the design manager 140 may obtain a list of projects or design artifacts from the design repository 160 through the design repository service 170. In one embodiment, the design repository service 170 is implemented as web-service, such as a RESTful Web service. Implementing the design repository service as a web service allows multiple users to access the same repository from various locations via any internet browser using HTTP or HTTPS protocols. The design repository service 170 thereby provides an easy method for accessing and sharing designs, such as schema maps.

The package builder 180 provides an interface through which the user 190 can build a deployment package, which contains the code and/or metadata used by the transformation engine 110 to run a data transformation during runtime. To create the deployment package, the package builder 180 extracts a set of project artifacts (including the schema map) from the design repository 160 and bundles the set of artifacts into a single container. In some embodiments, creating the deployment package may involve some translation or compilation of the original artifacts. Once created, the deployment package may be stored within a deployment repository (not shown) for later use, or loaded into the transformation engine 110 for execution of a schema map during runtime. In some embodiments, a deployment service (not shown) may be included for managing the deployment packages stored within the deployment repository. In addition to providing a single container for all project artifacts, packaging: (a) allows moving/sharing of entire projects via a file system, (b) allows projects to be distributed to remote processing nodes, and (c) allows users to run schema maps via a transformation command line.

FIG. 2B illustrates components of the transformation system 100 that operate primarily, but not exclusively, in the runtime environment. When a transformation is to be executed, transformation engine 110 receives a deployment package containing the packaged project artifacts and a runtime configuration containing the parameters needed to perform a desired transformation. In most cases, the transformation engine 110 loads the schema map from the deployment package, which is specified by the runtime configuration. In some embodiments, the schema map may be generated by the map designer 150. In other embodiments, a schema map may be additionally or alternatively generated via other sources (such as text editors, code generators, other mapping user interfaces or tools, etc.).

In some embodiments, the transformation engine 110 receives the deployment package from an execution service (not shown). In general, the execution service may be configured for retrieving a copy of a deployment package from the deployment repository (not shown) and storing the copy in a local cache. Next, the execution service may start the transformation engine 110 and pass a copy of the runtime configuration thereto. The runtime configuration specifies the package name, the schema map to execute in the package and any execution parameters (e.g., names of input and output files, variable definitions, etc.) needed to perform the transformation. Using this information, the transformation engine 110 is able to retrieve the specified deployment package from the local cache and run the transformation using the schema map included within the package. In some embodiments (see, FIG. 28), the runtime configuration may be defined from within the map designer 150, e.g., when building and testing a schema map design. In other embodiments, however, the runtime configuration may be scheduled within a management console (not shown), which is used for scheduling a transformation to run at some time in the future.

As noted above, spokes 120 and 130 are responsible for providing access and connection to the source or target data and metadata. During runtime, however, the spokes 120 and 130 perform additional functions. For example, transformation engine 110 may direct the source spoke 120 to retrieve the data from source 124, read records and evaluate record recognition rules to determine the record types included within the retrieved data, perform the functions on the data specified in the schema map and then send the data to the target spoke 130. Target spoke 130 is responsible for updating data target 134 with the transformation results as specified by the transformation rules in the schema map. In some embodiments (not shown), the transformation system 100 may include a real-time source/target monitor that displays the contents of both source 124 and target 134. Advantageously, user 190 could monitor the display to ensure that the transformation is correct.

In general, the transformation system components described herein are implemented as computer-readable instructions, which are stored on a computer-readable storage medium and executed on a processor of a computer system. In some embodiments, such a computer system may comprise a single-processor or multi-processor computer system, a mainframe computer, a personal computer, or a hand-held computing device. In some embodiments, aspects of the invention may be practiced in a distributed computing environment where tasks are performed by remote processing devices linked through a communications network. In the distributed programming environment, program modules corresponding to the system components may be located in local and/or remote memory storage devices.

According to one embodiment, the transformation system 100 described herein may be specifically configured for a cloud-based computing environment. For example, the design time components of the transformation system 100 (FIG. 2A) may be built on a web-service based platform with all public interfaces backed, e.g., by RESTful Web services, and all user interfaces built, e.g., as rich internet applications (RIAs). A web-service based platform would enable users to access data integration services, which may reside on servers located at one or more remote locations, via a web browser, desktop or mobile app using the HTTP or HTTPS protocol. These data integration services may include, but are not limited to, a service (e.g., design repository service 170) for accessing the design repository 160, a service (not shown) for packaging and deploying integration projects, and a service (not shown) for executing and scheduling data integration jobs. In addition, the runtime components of the transformation system 100 (FIG. 2B) may be built on top of services hosted by an Enterprise Service Bus (ESB). These runtime services may include, but are not limited to, the execution service (not shown), the design repository service 170 and the deployment service (not shown). By hosting these services on an ESB, the runtime services may be deployed to one or more cluster groups of server class compute nodes. In addition to load balancing and failover, the user of an ESB provides a scalable execution environment, wherein clusters can be easily expanded by simply adding extra compute nodes. The use of deployment packages is particularly useful in such an environment, as these packages enable the work to be distributed amongst one or more compute nodes.

Figure 3:
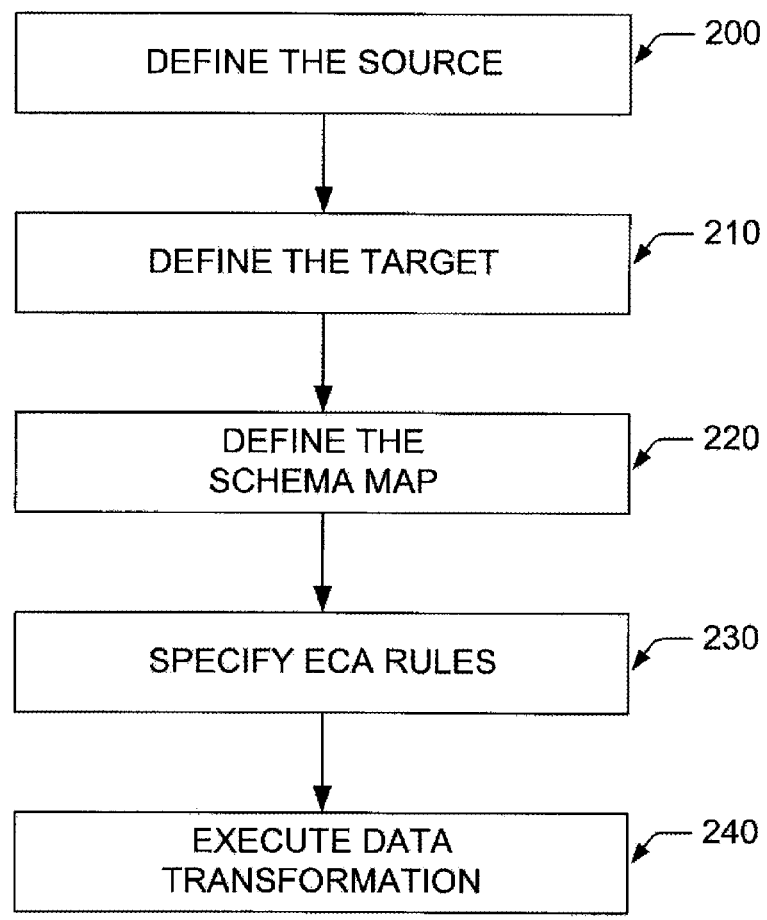
FIG. 3 is a flow chart diagram illustrating an exemplary method that may be used by the transformation engine shown in FIGS. 1 and 2B to generate and execute a data transformation using a schema map.

FIG. 3 is a high level flow chart depicting an exemplary method that may be used by the transformation engine 110 shown in FIGS. 2A and 2B to generate and execute a data transformation using a schema map. In particular, FIG. 3 illustrates a data transformation method wherein said transformations are dependent on the occurrence of one or more specified "events." As such, the method shown in FIG. 3 may be generally referred to as an "event-driven data transformation method." Before a data transformation can be performed, in most cases, a source must be defined 200, a target must defined 210, a schema map must be defined 220, and event-condition-actions (if applicable) must be specified 230. However, the order of steps 200, 210, 220, and 230 is generally not relevant.

Defining the source 200 provides the transformation engine 110 with the information needed to retrieve data from the data source. The specific parameters that may be supplied to define a particular source varies on several factors including, without limitation, the type of data structures used in the source, and whether the source is of a commonly used type. In one embodiment, the user may specify the source type, file name, and location. In some embodiments, it may be necessary to specify additional information to allow the spoke to connect to a source, such as a server IP address, User ID or Password. The spoke objects are preferably implemented to work with a specific data format. In some embodiments, an interface may be included to determine what is required by the spoke for connecting to an instance of data. Thus, the spoke objects either contain all of the necessary parameter information, or are operable to prompt the user to supply the necessary parameters.

Defining the target 210 is similar to defining the source 200. The transformation engine must be provided with the information it needs regarding the target to which the data will be converted. In one embodiment, the user may specify the target type, name, and file location. In other embodiments, a default predefined data target may be used. In yet other embodiments, the target may be automatically defined to mirror the source.

The user may define the schema map 220 by specifying transformation rules, which tell the transformation engine where the data from the source should appear in the data target, as well as the relationship between the source data and the target data. In other words, the transformation rules tell the transformation engine exactly what to write to the target data file. When defining the schema map, the user can: match source field names to target field names; associate source fields with target fields with different field names and in a different order than they appear in the data source; parse (split) a field; concatenate (merge) fields; perform mathematical calculations; remove unwanted characters; validate date fields; and much more. In addition, the user can create numeric or logical expressions within the transformation rules to massage the data into the desired target format.

Expressions allow users to modify the data from its source format to the desired target format; select records meeting a certain criteria for the data target (filtering); specify actions to be taken when an error occurs; and perform many other functions. If the user wants the result of one expression to be used as a parameter or argument in another expression, the user may also "nest" expressions within expressions to produce the desired results. The only limit to the number of expression iterations that may be used is available system memory.

When the user specifies an expression in a schema map, the result of that expression is usually data that is written into the target data file. For example, a simple expression may set a target field equal to a value of a source field, e.g., Field1=FieldAt("/Source/R!/Field1"). This simple expression instructs the transformation engine to write the data from Field1 in the data source to Field1 in the data target. However, an expression may include any combination of the following elements:

Operands—values or text that the expression operates on. These could be an actual value, such as "4", a field name, or any text string.

Operators—mathematical symbols, text characters or logical statements that tell the transformation engine what to do with the operands in an expression.

Numeric operators—perform calculations with values. Examples include +, −, *, /, and ^ for addition, subtraction, multiplication, division, and exponentiation, respectively. Numeric operators generally return a numeric value.

Logical operators—evaluate a condition. Logical operators include AND, OR and NOT. Logical operators join conditions. The conditions generally return true or false.

Comparison operators—compare two values to determine their relationship. Comparison operators include =, >, <=, >= and < > as well as LIKE, and ~ (contains) and !~ (does not contain). Comparison operators generally return true or false.

String concatenation operator—combines two strings into a larger string using an & operator.

Separators—for combining various operations and nested expressions. The user may use parentheses (or some other indicator) in complex expressions to tell the transformation engine the order in which the user wants the expression executed. Expressions inside parentheses are always executed first. For example, in the following expression—
GSub(Chr$(13)," ",FieldAt("/Source/R1/Field1"))
the Chr$ function would be executed first.

Functions—for operations that require more complex, automated processing than the user interface can specify. Functions may use the syntax of existing programming languages or may use a syntax or language specific to a transformation system of the present invention. In one embodiment, a scripting language may be used in expressions for several purposes including, but not limited to, specifying source and target node positions, manipulating data, handling errors, and filtering records. For example, the FieldAt function shown above provides a mechanism for precisely defining the position of a field within a source or target schema. Similar, a RecordAt function is provided for precisely defining the position of a record within a source or target schema.

Statements—for operations that require more complex, automated processing than the user interface can specify. Similar to functions, statements may use the syntax of existing programming languages or may use a syntax or language specific to a transformation system of the present invention. Statements are usually associated with Flow Control and complex expressions.

Literal values (constants)—an exact value, alphabetic or numeric. Examples include, without limitation, 100 or "John Smith". Literal text may be enclosed in quotation marks (" ").

Special characters—allow the user to specify more complex and flexible conditions for matching character strings than simply "Is it the same string, or isn't it?" in an expression. Special characters may include:
| ( and ) * + ? [ and ] - . \ ^ $ { and }.

Arithmetic operators—used to perform arithmetical calculations on numeric data in a field or fields. They may be used alone or in combination with other operators and Functions in all sorts of expressions. Numeric operands may be promoted to double precision values before performing the operation. If both operands are integer values and the result can be represented as an integer, then the operator will return an integer value. If one or both operands are Null, then the result is Null. All other values may be treated as a numeric value of zero.
+ add
− subtract
* multiply
/ divide two floating point operands
^ exponentiate
\ divide two integers In some embodiments, an expression builder interface may be included within the map designer 150 to help the user generate expressions. The expression builder interface is not limited to any particular programming language or syntax. Accordingly, the expression builder interface is not limited to the syntax of the sample expressions, functions, etc.

Unlike conventional mapping tools, map designer 150 also enables the user to initiate and control transformations by specifying Event-Condition-Action (ECA) rules 230. A basic ECA rule has the general form of: on event if condition do action(s). The event is used to determine when the transformation rule is triggered. The condition provides an optional mechanism for filtering the actions. The actions tell the transformation engine what to do with the records that match the specified condition. In most cases, the target record will be the subject of the action(s). ECA rules, event types, conditions and actions will be described in more detail below.

In general, an "event" is an occurrence of something that happens in a transformation system that may be of interest. Put another way, events are opportunities that can be exploited within the transformation cycle. "Event actions" are actions that the user wishes to be executed at a specific moment or moments in the transformation. An event action's associated triggering event determines when the event action will be executed. Most actions can be triggered by any event that the transformation system is capable of detecting. In some embodiments, conditions may be added to the events to provide a simple way to filter actions or select between two different sets of actions. When coupled with transformation rules, events can be used to develop highly reactive transformation systems.

After the necessary transformation information is specified (e.g., in steps 200, 210, 220 and 230), the actual data transformation 240 is initialized and executed by the transformation engine 110. For example, the data transformation may be initialized by establishing connections to the source and target and initializing the event handlers. Once the initialization routine is complete, a transformation loop may be entered for iterating through the source data. More specifically, the transformation engine 110 may retrieve a single piece of source data (e.g., a field, a record or other data structure) at a time, and perform the necessary transformations while detecting the occurrence of triggering events. The loop continues until all of the source data has been retrieved and transformed into the desired target data. Such an iterative process provides the advantage of not requiring the transformation engine to load all of the source data into memory all at once.

One advantage of the transformation system described herein is that the event handling capabilities of the system allow tremendous flexibility in the handling of data. Different actions can be triggered at virtually any point in the transformation process. Messages can be logged, expressions can be executed, possible errors can be traced, normal data manipulation and memory clearing can be done, and the transformation itself can be ended or aborted. The user has complete control over when these actions occur, what actions occur, and how many actions occur. The user may specify a series of one or more trigger events, and their associated conditions and/or actions, in what is collectively referred to as an "event action list." In some embodiments, a default event action list may be used. In yet other embodiments, a previously stored event action list may be used. Regardless, the event handling described herein allows the user much of the flexibility and customizability that the user would get from a custom coded solution, without the hassle of building a custom program every time the user wishes to convert data.

Another advantage of the event handling described herein is that it enables far more complex transformations than prior art techniques. Examples of complex transformations that may be performed by the transformation system 100 may include, but are not limited to, record aggregation, unrolling of data, transposing of data, and restructuring. In addition, and as described in more detail below, transformation system 100 enables complex transformations to be performed between multiple sources and multiple targets, multiple record types on both source and target, multi-mode targets, intermediate mini-maps, and hierarchical data structures.

Further, the transformation system 100 described herein allows these complex transformations to be accomplished with very little difficulty. In particular, event handling is made easy by incorporating such handling within the map designer 150. Within the map designer interface, the user may choose an event the user wishes to have trigger an action, choose the action or actions the user wishes to be performed upon occurrence of the triggering event, and define the action parameters and conditions. Screen interfaces may be used to help the user define the parameters and conditions of each action as it is chosen. The user can choose to have more than one action occur during a particular event, or choose to have the same action occur during more than one event. The interface imparts no restrictions on the number or type of event actions or triggering events that may be used.

II. An Embodiment of a Conventional Event-Driven Transformation System and Method One embodiment of a conventional event-driven data transformation system and method is described in U.S. Pat. No. 6,795,868 (hereinafter "the '868 patent") assigned to the present inventors, and incorporated herein in its entirety. The event-driven data transformation system and method described in the '868 patent differs from other commercially available mapping tools, in at least one respect, by allowing the user to specify event-driven transformation rules that enable one or more actions to be performed based on triggering events. As noted above, event-driven transformation is desirable as it provides much of the flexibility and customizability that the user would get from a custom coded solution, without the hassle of building a custom data transformation program every time the user wishes to convert data.

However, the present inventors recognized various deficiencies, which could only be overcome be redesigning many of the transformation system components described in the '868 patent. Although many system changes were made, specific attention was given to the map designer described in the '868 patent, as the present inventors felt that features of the map designer could be greatly improved. Examples of such improvements are discussed in more detail below.

One of the improvements made to the map designer of the '868 patent was to provide support for full event-condition-action (ECA) rules. The map designer disclosed in the '868 patent used simpler event-action (EA) rules, which represent only a subset of what can be expressed using the full event-condition-action (ECA) rules disclosed herein. Unlike the previous map designer, map designer 150 adds explicit support for conditions, which provide a simple way to filter actions or select between two different sets of actions. If a user wanted to add a condition to an EA rule using the map designer of the '868 patent, the user was required to write extensive code or scripts describing the condition within the event action. The map designer 150 disclosed herein eliminates such code generation, so that even business personnel with limited programming experience may generate and run transformations.

Although the map designer disclosed in the '868 patent is described as a graphical mapping interface, it did not allow EA rules to be visualized graphically (e.g., with control links as described below). Instead, the map designer disclosed in the '868 patent presented EA rules in a grid or a tree view, which listed all available events, even if a user did not wish to specify actions for one or more of the listed events. This created a lot of clutter in the previously disclosed map designer and did not scale for many record types or for hierarchical mapping. In addition, the EA rules utilized within the previous map designer were not optimized to control transformations between multiple sources and multiple targets. Furthermore, the previous map designer was not designed to support nested EA rules, and thus, could not be used to generate intermediate "mini-maps," which could be used to perform lookup operations and/or temporarily store subsets of data (such as the case when staging or chaining outputs). Moreover, the previous map designer failed to provide events and actions specifically pertaining to document and hierarchical mapping.

The differences between the map designer utilized in the '868 patent and the one described herein do not end with the improvements made to the previously disclosed EA rules. For instance, the previous map designer failed to include visual indication of possible mapping problems while mapping (such as a caution sign icon in the map with tool tips warning a user of potential validation issues), or a means for listing the validation problems that may occur. As such, the previous map designer failed to include a very helpful mapping feature.

Thus, the present inventors contemplated an improved map designer for use within an event-driven transformation system. Unlike the previous map designer utilized in the '868 patent, the improved map designer described herein allows all links, including data links and control links comprising ECA rules, between the source and target elements to be implemented graphically, e.g., by drawing lines between the source and target elements in a mapping region of the map designer. As described in more detail below, data links describe the relationships between of the source and target schema elements involved in the transformation. A data link to a target element may define a list of inputs for a target field expression. A control link, on the other hand, is a visual representation of a set of one or more ECA rules. All maps will have one or more control links to control the transformation process.

In addition to the visual representation of links, the map designer described herein provides explicit support for multiple sources and multiple targets, multiple record types on both source and target, multi-mode targets, intermediate mini-maps, hierarchical mapping, complex functions (such as aggregations) and many other features lacking in the old map designer and other conventional mapping tools. As set forth in more detail below, a new schema mapping language was developed to support the features lacking in the old map designer and other conventional mapping tools. Additional details of the new map designer and the new schema mapping language are discussed below.

III. An Embodiment of an Improved Schema Mapping Language

The schema mapping language described herein is designed for use with a transformation engine, which is capable of streaming records of data from multiple data sources and outputting streams of records to multiple data targets. FIGS. 1-2 provide an example of one such transformation system. However, one skilled in the art would readily understand that the schema mapping language described herein may be utilized within other transformation system architectures without departing from the scope of the invention.

Schemas are used to describe the structure of the record stream, including all of the record types one might find in a stream. In some cases, schemas may provide additional connector specific metadata, which is needed to properly read and write the streaming data. In an effort to provide a thorough understanding of the present invention, the schema mapping language will be described in the form of a visual representation, specifically, one which uses symbols or icons (see, Table 1) to represent the elements used to define a schema. It is noted, however, that the illustrated symbols are merely representative of the schema elements described herein and should not be considered restrictive to the present claims.

| Symbol | Name | Description |
|---|---|---|
| S | Schema | Represents the root of a schema definition |
| A | Abstract Type Definition | Defines an abstract complex type |
| T | Type Definition | Defines a complex type |
| F | Leaf Node | Represents an atomic field based on one of the primitive data types |
| A | Abstract Type Reference | Represents a reference to a record type based on a complex type definition. |
| T | Record Type Reference | Represents a reference to a record type based on a complex type definition. |
| St | Structure Type Reference | Represents a composite field based on a complex type. |
| | Inherit | Defines a group of fields derived from an abstract type |
| | Sequence | Defines a group of fields which occur in a specific sequence |
| | Choice | Defines a group of a mutually exclusive set of fields |
| | All | Defines an unordered set of fields | definition specifies the data type of each field, its position in the record, and an identifier (name or label) by which it can be accessed. Type definitions will be discussed in more detail below.

Fields

A Field is defined as the smallest addressable piece of a record, and is the basic building block for all record types. Fields are named objects based on a simple data type. In the visual representation of the schema mapping language described herein, an exemplary field may look like:

| F | Addressline1:Text(25) [1,1]

Following the field icon, AddressLine1 is the field name, Text(25) specifies the data type (i.e., a text field) and key data type parameters of the field (i.e., a character length of 25), and [1,1] specifies the cardinality constraint imposed upon the field. Most fields will have a cardinality of [1,1]. In this case, the cardinality may be omitted from the visual representation to reduce clutter. The schema mapping language described herein supports many data types for defining simple fields. Exemplary data types are shown in Table 2.

TABLE 2

| Data Type | Description | Ordered | Numeric | Bounded | Parameters |
|---|---|---|---|---|---|
| string | Type for strings of character values. | No | No | No | length |
| short | 16-bit signed integer type with a range of values. | Yes | Yes | Yes | |
| int | 32-bit signed integer type with a range of values. | Yes | Yes | Yes | |
| double | 64-bit double precision floating point type. | Partial | Yes | Yes | |
| decimal | Fixed point data type. | Yes | Yes | No | total_digits and fraction_digits |
| date | Generic date data type. | Partial | No | No | |
| time | Generic time data type. | Partial | No | No | |
| datetime | Generic date/time data type. | Partial | No | No | |
| boolean | Type for true/false values. | No | No | No | |
| long | 64-bit signed integer type with a range of values. | Yes | Yes | Yes | |
| float | 32-bit double precision floating point type. | Partial | Yes | Yes | |
| byte | 8-bit signed integer type with a range of values. | Yes | Yes | Yes | |
| bytes | Type for a string of byte values. | No | No | No | length |
| char | A single character. | No | No | No | |

Records

A Record is a data structure comprising one or more addressable values or variables. A file or data set will usually contain multiple records, each of which can be of fixed or variable length. A record type is a data type that describes the values or variables included within the record. A type The field name and type must be specified for each field. In some cases, other core properties of the field may be specified, depending on data type. A non-exclusive list of field core properties is provided in Table 3. However, not every field will use all properties. The usage of each property depends on the field data type.

TABLE 3

| Field Property Name | Required | Description |
|---|---|---|
| name | required | The name of the field. The name must be unique in within the type definition. |
| description | optional | Description of the field. |
| type | required | Base data type name (see table below). |

TABLE 3-continued

| Field Property Name | Required | Description |
| --- | --- | --- |
| external | optional | Complex structure describing additional data type information for an external type system. External type definitions are used to describe data types for a specific data source. |
| nulls | optional | Boolean property indicating whether NULL values are allowed for this field. (default is true) |
| length | required for some data types | The maximum number of units of length, where units of length vary depending on the type that is being derived from. The value of length must be a non-negative integer or 'unbounded'. For text-related type, it is character-based length. Fixed length fields are fields where min_length = max_length. (default is 'unbounded') |
| enumeration | optional | Defines a specific set of values for the value space of the type. |
| pattern | optional | Defines a regular expression used to constrain the value space for the type to literals that match the pattern. |
| total_digits | required for some numeric data types | Maximum number of digits. Used for data types derived from decimal. The value of total_digits must be a positive integer. |
| fraction_digits | required for some numeric data types | Maximum number of digits for the fractional part of decimal values. The value of total_digits must be a positive integer. fraction_digits >= 0 and fraction_digits <= total_digits |
| min_inclusive | optional | The inclusive lower bound of the value space for a data type with an ordered value space. The value must be in the value space for the base type. Mutually exclusive with min_exclusive. |
| max_inclusive | optional | The inclusive upper bound of the value space for a data type with n ordered value space. The value must be in the value space for the base type. Mutually exclusive with max_exclusive. |
| min_exclusive | optional | The exclusive lower bound of the value space for a data type with n ordered value space. The value must be in the value space for the base type. Mutually exclusive with min_inclusive. |
| max_exclusive | optional | The exclusive upper bound of the value space for a data type with n ordered value space. The value must be in the value space for the base type. Mutually exclusive with min_inclusive. |
| unique | optional | Boolean property indicating whether values for this field must be unique. (default is false) |

Cardinality

In some contexts, it may be possible for elements of a schema to be optional or to repeat multiple times. For example, a flat file may contain many records. While a record type can describe the structure of each record instance, it does nothing to describe the overall structure of the file. To support repeating or optional elements, the schema mapping language described herein uses cardinality constraints in some contexts. Cardinality for an element is expressed by using a range of non-negative integer values to specify the minimum and maximum number of times the element may occur. The one exception is when the upper bound is unlimited. In the example shown above, the field called AddressLine1 can occur a minimum of one time and a maximum of one time.

In the visual schema notation, cardinality is described as [m, n] where m is the lower bound and n is the upper bound. When no cardinality is shown, a cardinality of [1,1] is assumed. Table 4 shows some examples of cardinality constraints.

TABLE 4

| Cardinality | Description |
| --- | --- |
| 0,1 | The element may occur once (optional) |
| 1,1 | The element must occur once (mandatory) |
| 0,* | The optional element can occur many times |
| 1,* | The element will occur at least once |
| 1,2 | The element can occur once or twice |
| 5,* | The element can occur many times, but must occur at least 5 times. |

The three most common cases for field cardinality are the mandatory single instance field ([1,1]), the array field ([1,n] where n>1), and the optional field ([0,1]). Array fields may be either fixed or variable size. In the case of variable size arrays, the field will typically reference another field in the record type which will be used to indicate the number of elements in the array field.

Multi-dimensional arrays can be modeled using nested lists. A two dimensional array can be represented using a one dimensional array of structures, where each structure contains an array of fields. Cardinality constraints can only describe one dimension of an array. Multi-dimensional arrays can be expressed using arrays of structures containing arrays. Structures will be described below.

Grouping

A group in the visual schema language acts as a container for other types of schema elements. The grouping node defines how given members of the group relate to siblings in the same group. There are generally four types of groups. These are sequence, choice, inherited and all. The contents of a group are constrained by the context in which the group is defined. In type definitions, groups can only contain fields or record type references. The groups in schema definitions can only contain record type references. Groups cannot directly contain other group nodes.

A sequence group node is used to group schema elements where the order of each of the elements is important. FIG. 4 is an example called a Simple Record illustrating a record layout with three fields (Field1, Field2 and Field3). Field1 is a long integer field, Field2 is a 10-character text field, and Field3 is a 25-character text field. The record type occurs only once and in the order specified below.

A Choice group node is used to describe sets of mutually exclusive schema elements. Generally, these elements will be complex structures. For example, as shown in FIG. 5, choice could be used to describe one of a number of different shipping methods for orders in an order system. The type references in a choice group must not have a minimum or maximum cardinality greater than 1.

The inherited group node defines a group of fields derived from an abstract type. The inherited node indicates that all of the fields or record references contained within the node have a common base type, and thus, can be substituted for one another. For example, FIG. 6 defines an abstract record type called AnonymousAddressType. Another record type is defined, called Address, which inherits the structure of AnonymousAddressType, including the sequence of fields specifying the city, state and zip of the AnonymousAddressType record type. An anonymous address of this sort may be used in applications where you need to compute local tax rates or determine local policies.

Figure 7:
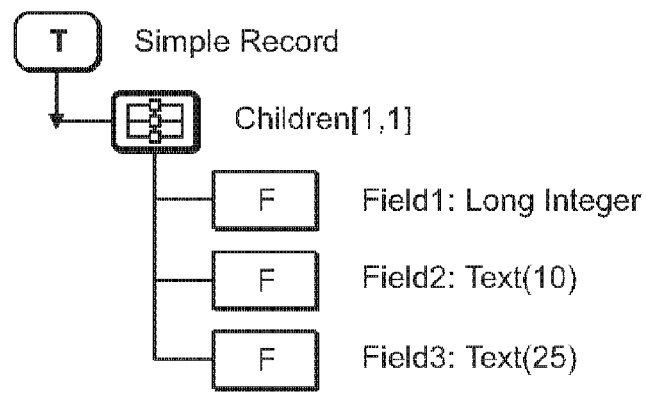
FIG. 7 illustrates an example of an All group node.

The All group node is used to group schema elements where the order of each of the elements does not matter. The All group node would be most commonly used in data formats which use tag-value pairs to represent the data, such as XML or JSON. There must be a way to distinguish one type of element from another in order to determine the element types when the order can vary. The fields in the Simple Record shown in FIG. 7 (Field1, Field2, Field3) can appear in any order in each record of that type. For example, Field2 may appear first, followed by Field3 and Field1. The type references in an all group must not have a minimum or maximum cardinality greater than 1.

Structure References

Structures are composite fields based on a type definition. They are generally used in cases where a field's values are a composition of sub-field values (e.g. composite fields in EDI), or in cases where the same field can hold values of different types (variant type). The following example shows a type definition for a structure (called fielded_date_structure), specifically, showing the declaration of a structure field using reference to the type fielded_date_structure.

| St | date:fielded_date_structure [1,1]

Figure 8:
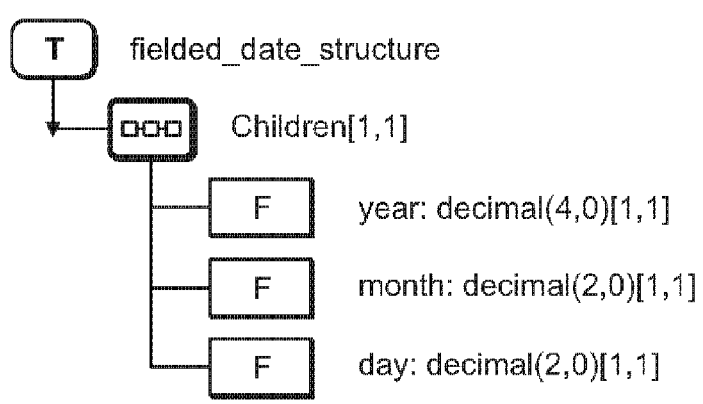
FIG. 8 illustrates an example of a structure reference.

As shown in FIG. 8, the type for the structure reference is defined using a sequence group, so field date is a composite field containing the subfields year, month and day.

Structures are used to define complex fields where the elements of the complex field are treated as elements of the record type containing the structure. Any given record of that type will also include the data for each of the structures. Structure type reference fields are appropriate to use in cases where the data for the structured field is logically part of the parent record and where the type defining the structure has no recursion. Structure type references are also used to define multi-dimensional arrays inside of record definitions.

Record Type References

Record type references allow one to create hierarchical types from other complex types, or to define a schema that describes the structure of data in a data source. Like fields, record type references are named objects. In the visual representation of the schema mapping language described herein, an exemplary record type reference (purchaseOrder) may look something like:

| T | purchaseOrder:PurchaseOrderType[1,1]

When record type references are used in a type definition it looks like a field, however, the element representing the reference will never contain any values. Instead, the values for the referenced type will be in the records of the referenced type. These records will typically be children of the parent or records that follow the parent in the data set. Record type references are appropriate where there are different types of related records and the relationship between records needs to be expressed. Record type references can be used to define hierarchical structures with recursive sub-trees (see, example below) or multi-mode targets (see, example below).

Type Definitions

Type definitions are used to define structure references (i.e., composite fields), record type hierarchies and schemas. Type definitions must follow these rules: (a) types are defined using a series of one or more groups; (b) groups in types cannot be directly nested, so no groups within groups; (c) a group can have a cardinality of [1,1] if it is a mandatory group or [0,1] for if it is an optional group; (d) groups can contain only fields, structure type references and record type references; and (e) names for all groups and group elements of the type must be unique.

Schema Definitions

A schema definition describes the valid record compositions for a particular set of data. In a given schema definition, there will be one schema object and one or more type definitions. The elements of a type definition can consist of uniquely named fields or record type references. Grouping nodes are used to specify ordering or optionality of the various elements. For each element in the record type, we show the name of the element and its type. The external type (connector specific) is displayed if it is available, otherwise, the generic type will be displayed. Since a schema defines the composition of the record stream for a data source, the cardinality must also be specified.

Schema definitions must follow these rules: (a) schemas are defined using a single record type reference or with a series of groups; (b) groups in schemas cannot be directly nested, so no groups within groups; (c) a group can have a cardinality of [1,1] if it is a mandatory group, or [0,1] if it is an optional group; (d) groups can contain only type references; and (e) names for all groups and group elements of the schema must be unique. There are generally three types of schema definitions: single record schemas, multi-record schemas and hierarchical schemas.

Single Record Schema

Figure 9:
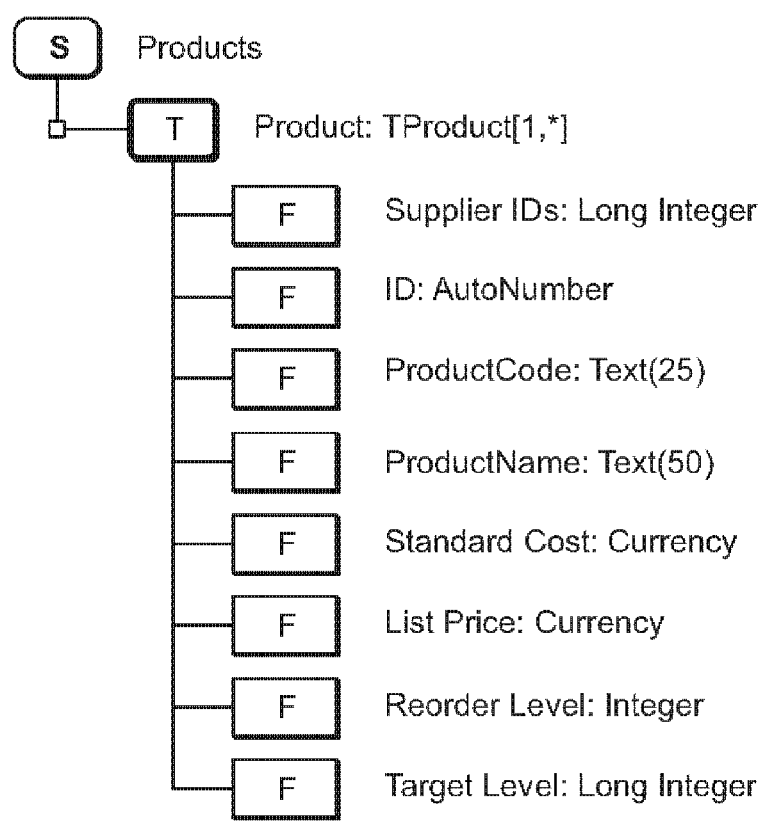
FIG. 9 illustrates an example of a single record schema.

A single record schema is a schema comprising a single record having one or more fields. FIG. 9 shows a single record type, called TProduct, and a schema that references TProduct, called Products. The record type and schema objects are top level objects. They are depicted as root nodes and are named. In the following example, the schema Products describes a set of one-to-many records of type TProduct, where each record contains a supplier ID field, an ID field, a Product Code field, a Product Name field, a Standard Cost field, a List Price field, a Reorder Level field, and a Target Level field. The data type and properties are also specified for each field.

Multi-Record Schema

Figure 10A:
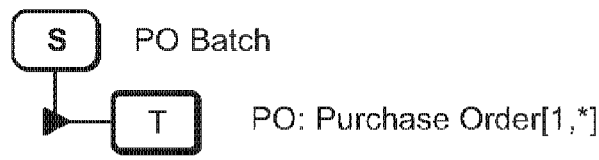
FIGS. 10A-10C illustrate examples of a multi-record schema.
Figure 10B:
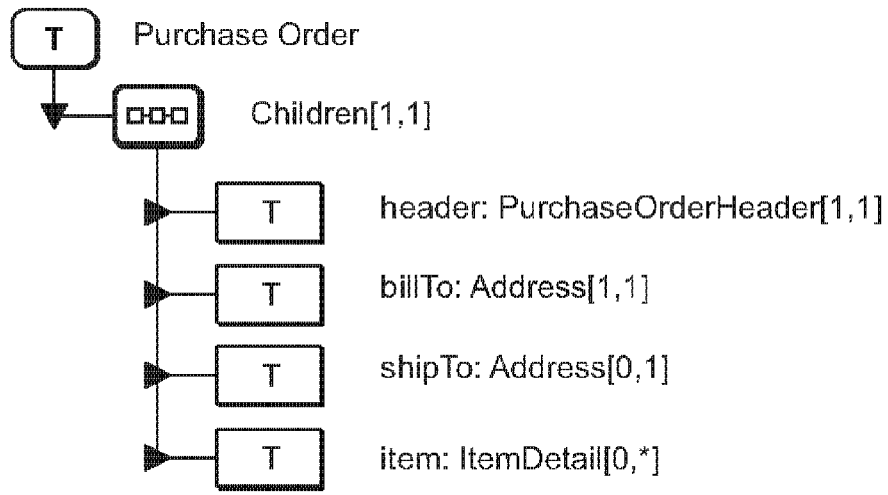
Figure 10C:
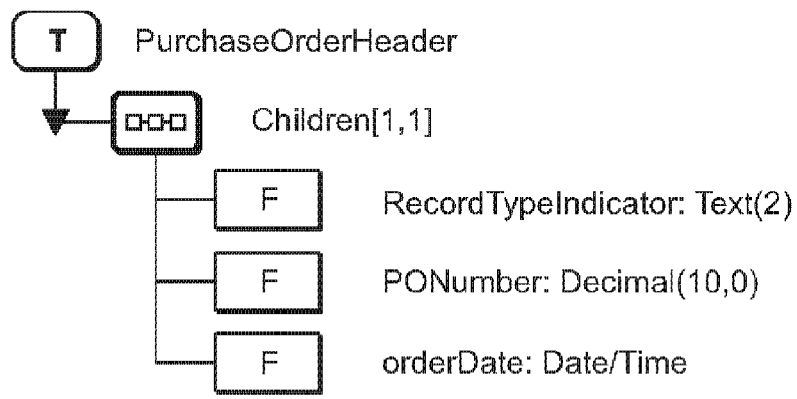

A multi-record schema is a schema comprising a plurality of records, each having one or more fields. FIG. 10A shows a multi-record type, called PurchaseOrder, and a schema that references PurchaseOrder, called POBatch. The schema POBatch can occur many times, but must occur at least once. Thus, the example depicts a schema that could be used for a flat file format to hold possibly many purchase orders, where the data for each purchase order is spread across a group of several different records. Each purchase order in the PurchaseOrder type record will have a header record (PurchaseOrderHeader), one or two address records (billTo, shipTo) and one or more line item detail records (item), as shown in FIG. 10B. The record type reference PurchaseOrderHeader may contain a sequence group of fields, such as shown in FIG. 10C. It is noted that the group nodes for the record type references are generally not shown in the expanded view of the schema. While necessary for parsing or validation, the group nodes at the record type level tend to clutter things. However, they always appear in the type definitions.

Hierarchical Schemas

A hierarchical schema is another schema comprising a plurality of records. Unlike the flat, multi-record schema described above, however, the record types within a hierarchical schema may include record references to child records. On the contrary, the record types within the flat, multi-record schema may contain only fields.

Figure 11:
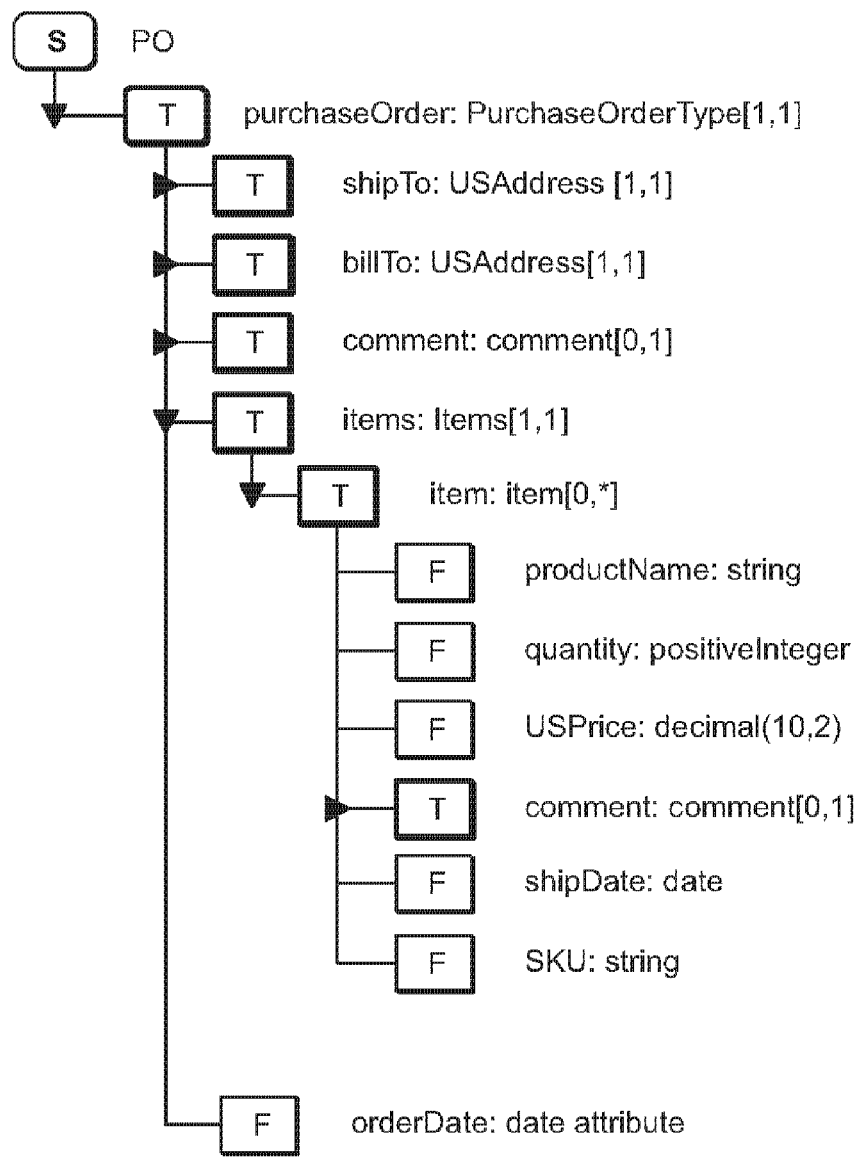
FIG. 11 illustrates an example of a hierarchical schema.

An example of a partially expanded hierarchical schema representation is shown in FIG. 11. This example illustrates a purchase order schema defining the structure of a single document having a number of record types, some of which are nested within other record types.

In the illustrated example, the items type is a complex record type reference comprising the item type, which defines the line item details for the purchase order. The nested item type contains a plurality of fields (productName, quantity, USPrice, shipDate, SKU) and a record type reference (comment).

Mapping

A mapping is a set of rules for transforming data from one or more inputs (or "sources") to one or more outputs (or "targets"). In the schema mapping language described herein, the relationships between sources and targets are described visually in the map designer 150 using "links." However, there is more to describing the transformation process than just linking fields. Transformation is a very iterative process and often times requires either complex rules and/or recursion.

The schema mapping language described herein is suitable for both relational mapping and hierarchical mapping. Although the previous map designer described in the '868 patent handled hierarchical data, it did so by flattening the hierarchical data structure into something that looked a lot more like relational data. Flattening inevitably results in some information loss about the original hierarchical structure, and in some cases, makes it impossible to recreate the hierarchy on the target side. The schema mapping language described herein overcomes this problem by defining each field using its entire hierarchical path, providing new expression functions (e.g., FieldAt and RecordAt) for addressing fields and records that are arbitrarily deep in the hierarchy, creating new events (e.g., SubTreeStarted and SubTreeEnded) for handling hierarchical schemas, and giving reference names to a single record type used differently under two or more parent records (in the schema representation shown above, e.g., the record type named USAddress can be mapped differently to the billTo and shipTo records by using different ECA rules).

Schema Mapping Language Elements

Figure 12:
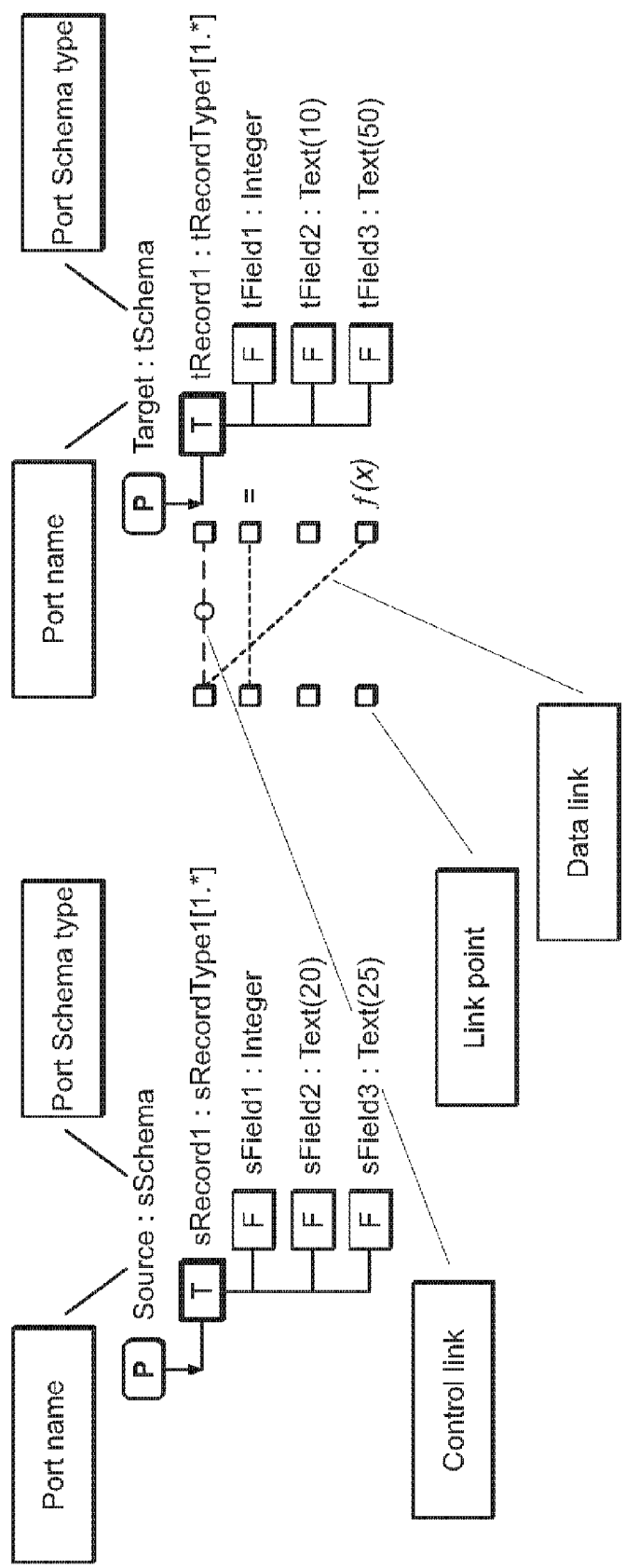
FIG. 12 illustrates an example of schema mapping language elements.

FIG. 12 shows some of the basic elements of a schema map, which transforms input data from a single source port (called Source) and outputs it to a single target port (called Target). The source and target ports are each described with schemas. Links are used to describe the relationships between the nodes in the source and target schemas (data links) and to control the transformation process (control links). As noted above and described in more detail below, schema maps may be generated for transforming data between multiple sources and/or multiple targets.

Data Sources and Targets

A schema map may generally include one or more data sources and one or more data targets. In some cases, a map may include a variety of different data sources and data targets. Each of the sources and targets must have a unique port name, as these names will be used as part of the map addressing scheme. There is no theoretical limit to the number of sources/targets that could be included within a map, although resource and performance concerns may place practical limits on the number used.

Data Ports

The data inputs and outputs for a schema map are declared using data ports. This includes the primary source, optional secondary sources and constants, and all targets. Each port will have a unique port name and schema. Maps will always have a primary source port and at least one target port. Additional (i.e., secondary) source ports may be used for nested maps. In these maps, the data coming in on the primary source port is used to drive the transformation process, while the secondary source(s) are used, e.g., as lookup tables or temporary targets. Additional target ports may also be defined for outputs, such as a reject file.

Constants

The constants container is a special source port used for defining and referencing constant variables. The container will have a flat list of variables. Each of these can be linked as a source for data values using a data link. Constant variables will have a data type and an initialization expression. The expression will be evaluated as part of the initialization process of the map at execution time, and the result will be assigned to the variable as the constant value. From that point on, all references to the variable will be read-only. The name Constants is a reserved name for sources and targets.

Intermediate Targets

Intermediate Targets are special temporary targets used to perform staging of data or lookup operations. Intermediate targets play the role of both a source and a target. As described in more detail below, the schema mapping language described herein creates "mini-maps" for mapping data into an intermediate target. Once the mini-map is populated with data, it can be used as a source to transfer the data to other intermediate targets or to a final target. The schema mapping language described herein supports many types of intermediate targets including, but not limited to, row sets, dynamic lookup tables, and static lookup tables.

Row Sets

Row Sets (i.e., temporary targets) are named in-memory containers for sets of zero or more records. These containers are used primarily for the temporary staging of output data and are considered intermediate targets. As such, row set objects will be used as a data target by parts of the map, and as a data source by other parts of the map. Row set objects are local to the map, so these objects are not data ports. Each of these objects will have a schema associated therewith. The schema can define multiple record types; however, each record type will be flat.

Dynamic Lookup Tables

A dynamic lookup table is a special source data port used to query data based on one or more key values. It is also considered an intermediate target, since the lookup operation is performed by using the lookup table as a target and outputting a record containing the key field values. When used as a data source, the lookup table will appear as a set of records where each record matches the current lookup key. Dynamic lookup tables are typically used for tables that are either too large to load into memory all at once, or where the results of queries may change over time.

Static Lookup Tables

A static lookup table is a special source data port used to look up values in a data source based on one or more key values. Static lookup tables use in memory tables and are considerably faster than dynamic lookups. The source data for the lookup table is loaded into memory at the beginning of the map execution. Queries to the in-memory table are simple searches that return the first occurrence of the key values.

Static lookup tables are considered intermediate targets, since the lookup operation is performed by using the lookup table as a target and outputting a record containing the key field values. When used as a data source, the lookup table will appear as a set of records where each record matches the current lookup key. Unlike dynamic lookup tables, however, static lookup tables should only be used in cases where there is enough memory to load the contents of the table at run time and where the data is not subject to change during the transformation process.

Multi-Mode Targets

Unlike single-mode targets, which support only one output operation on a target object, multi-mode targets support multiple types of output operations on one or more target objects. These operations include insert (default), delete, update and upsert. In multi-mode, each output record is assigned an output operation and a target name. This is achieved, in one embodiment, by binding each record type in the target schema to a specific output operation and target object. To select an operation other than the default insert, keys must be defined for matching the records to be deleted, updated or upserted.

Link Points

Link points are "map state" icons used on linkable elements of the source and target schemas to show which elements are candidates for linking. Linkable elements include type references, structure fields and simple fields.

Links

Links are created via mapping. In the visual representation of the schema mapping language (discussed below, e.g., in reference to FIGS. 5-28), links are created by drawing lines between the source and target schema elements. In the actual implementation of the language, a simple path expression, similar to those used for folders and files in modern file systems, is used to precisely address the source and target schema elements. This represents a significant improvement over conventional mapping tools (including the previously disclosed map designer), which do not utilize a precise addressing scheme for defining the position of schema elements.

Path expressions are built using the port name and the element names for all elements between the root node and the addressed element. Each element name in the path is delimited using a forward slash ('/'). Some path expressions may also include a FieldAt or RecordAt function to precisely define the position of a field or record within the schema. For example, a path expression such as FieldAt(/Source/sRecord1/sField3) may be used to address the sField3 in the source schema shown above. A leading forward slash is used to indicate that the path is relative to the root of the map or an absolute path. Group names are not used for addressing schema elements.

The schema mapping language supports two types of links: data links, and control links. Data links and control links are discussed in more detail below.

Data Links

Data links are created by linking a source field to a target field, a source structured field to a target field, or a source record to a target field. A source element may be linked to one or more target elements. Similarly, a target element may have data links from one or more source elements. In the visual representation of the schema mapping language described herein, a solid line is used to denote data links.

A data link to a target element defines the list of inputs for the target field expression. Single data links between a source field and a target field indicate a move operation, in which case there is no need for the target field to have an expression. Expressions are written using a scripting language. In one embodiment, the EZscript scripting language may be used to write target field expressions. However, the present invention is not limited to the use of any particular scripting language. In some embodiments (discussed in more detail below), an expression builder interface may be provided within the map designer to assist a user in generating target field expressions.

The schema mapping language described herein supports the following data links: field to field links, many source fields linked to a single target field, and a record type reference linked to a single target field. Field to record type reference links do not make sense and are not allowed. In some cases, a map may contain one or more target fields without links. These fields either have no data mapping operation associated therewith, or they have an operation, such as constant value or independent expression with no source field dependencies.

Field to Field Link

The simplest data link is the field to field link. This link connects a target field to a field from the source schema, or a field in a temporary target. The most common data operation with the field to field link is the move operation, which simply transfers the contents from a source field to a target field. In this case, the source and target fields need to be compatible and require nothing more than simple type casting to perform the operation. Moves can be performed for two scalar fields, two fields with the same structure or two array fields with the same dimensions. Other common data operations with field to field linking include, but are not limited to, the simple expression, aggregate, and the complex expression.

Figure 13:
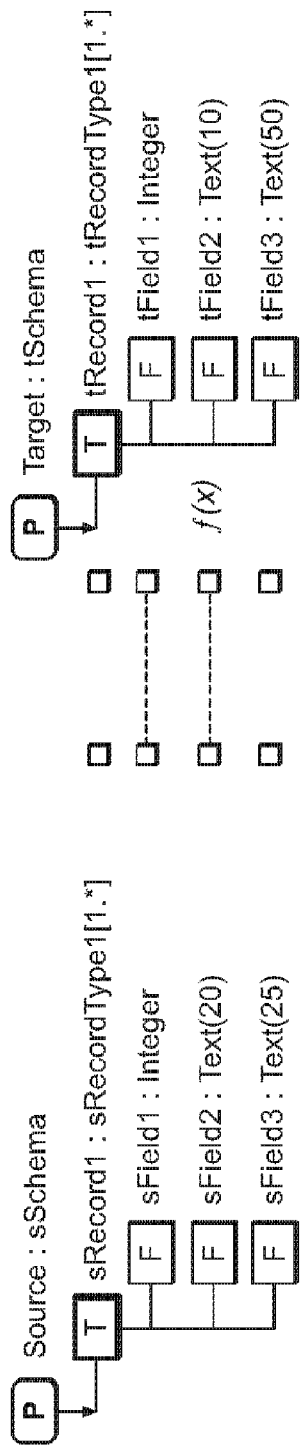
FIG. 13 illustrates an example of a field to field link.
Figure 14:
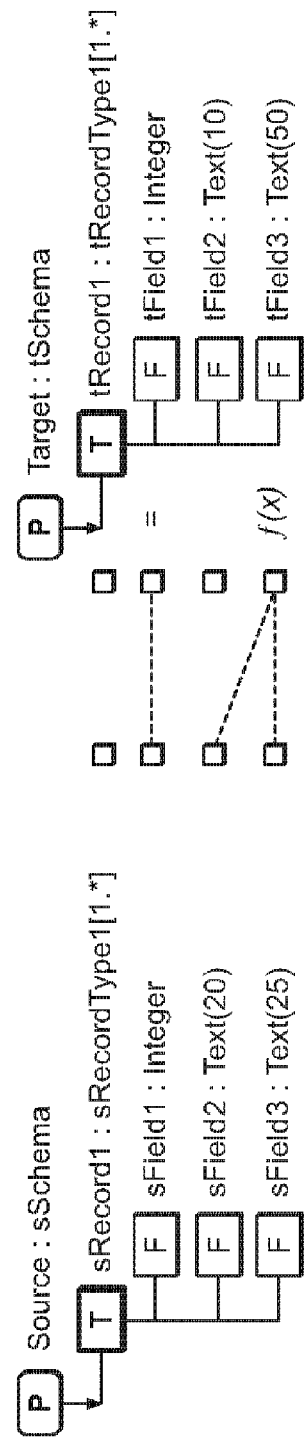
FIG. 14 illustrates an example of many source fields linked to a single target field.

In the example of FIG. 13, the source sField1 (/Source/sRecord1/sField1) is linked to the target tField1 (/Target/tRecord1/tField1) using a simple value transfer. In addition, the source sField2 (/Source/sRecord1/sField2) is mapped to the target tField2 (/Target/tRecord1/tField2) using an expression. In this example, the target tField2 is smaller than the source sField2, so the target expression could be truncating the source value, if necessary. In one embodiment, such a target expression may look like:

Left(FieldAt("/Source/sRecord1/sField2"), 10)

This expression takes the leftmost 10 characters from the source sField2.

Many Source Fields Linked to a Single Target Field

Multiple source fields may be mapped to a single target field, for example, when the values in the source fields are to be used as parameters for an expression that will compute the value for the target field. The example of FIG. 14 maps two source fields (/Source/sRecord1/sField2 and /Source/sRecord1/sField3) to a single target field (/Target/tRecord1/tField3). If the user wishes to concatenate the two source field values to get the target field value, the target field expression to achieve such concatenation may look something like:

Trim$(Left$(FieldAt("/Source/sRecord1/sField2") & FieldAt("/Source/sRecord1/sField2"), 50))

Record Type Reference to Field Link

A record type reference may be mapped to a field when the fields in the referenced source record type are to be used to compute a value for the target field. In effect, the source record is an input parameter to the target field expression. In the example of FIG. 15, a source record type (/Source/sRecord1) is mapped to a target field (/Target/tRecord1/tField3). Assuming the user wants to concatenate the field values for sField2 and sField3 to get the target field value, the target field expression might look something like:

Trim$(Left$(RecordAt("/Source/sRecord1").Fields(2) & RecordAt("/Source/sRecord1").Fields(3), 50))

In the above example, the target expression uses the record address from the data link to get a reference to the DJRecord object. This object is used to reference the field values for sField2 and sField3 using the ordinal indices for the two fields.

Control Links

A control link is a visual artifact for showing how transformation events triggered from reading a particular record type from a source relate to actions for a particular record type on a target. Control links are created by linking a source record to a target record, and have Event-Condition-Action (ECA) rules associated with them to control the transformation behavior for any given record type. All maps will include one or more control links to control the transformation process. In the visual representation of the schema mapping language described herein, a solid line adorned with a circular arrow may be used to denote a control link.

The control link defines the source record and target record context for a set of one or more ECA rules. The basic ECA rule has the general form of: on event if condition do action(s). The event is used to determine when the rule is triggered. The condition provides an optional mechanism for filtering the actions. The actions tell the transformation engine what to do with the records that match the specified condition. In most cases, the target record will be the subject of the action(s). ECA rules, event types, conditions and actions are described in more detail below.

The example of FIG. 16 illustrates a mapping between a single source schema (called Source) and two target schemas, called Target and Reject. For every instance of the source record sRecord1, the mapping sends all records where the value in field sField1 is >1000 to the Target schema, and all other records to the Reject schema. This is expressed in the map using two separate control links, as shown in FIG. 16.

In the first control link, an ECA rule is triggered for every instance of sRecord1 using the RecordStarted event type (described in Table 6 below). The condition for this rule is FieldAt("/Source/sRecord1/sField1")>1000. Whenever the condition is true, the link functions to output the record as an instance of tRecord1, and whenever the condition is false the record is output to the Reject target. The second control link defines an ECA rule that is triggered for rejects. This rule uses the RecordRejected event type (described in Table 6 below) and unconditionally writes each rejected instance of sRecord1 to the Reject target.

ECA Rules

An event is an occurrence of something that happens in a system that may be of interest. When coupled with event-condition-action (ECA) rules, events can be used to develop highly reactive transformation systems.

In the transformation system described herein, ECA rules are used to direct the transformation process. For example, a stream of source records may trigger a variety of events. The ECA rules react to the events and perform the desired actions to produce target records. As indicated earlier, the basic ECA rule has the general form of: on event if condition do action(s). Whenever the specified event is triggered in this type of rule, the specified action(s) are performed if the condition specified by the rule is met.

In addition to the basic ECA rule, the schema mapping language supports other rule types, such as the unconditional ECA or simple event-action (EA) rule, and the ECAA rule. The EA rule performs a list of one or more actions whenever the specified event is triggered. The ECAA rule is similar to an if-then-else statement of rules, and has two sets of actions. An ECAA rule can be represented as two ECA rules, where the second rule uses the negated condition of the first rule. In some embodiments, the schema mapping language described herein may support additional, more complex types of ECA rules, such as variants that support else if and switch-case semantics. However, different combinations of EA, ECA and ECAA variants are usually sufficient for developing more complex rules.

Events

In general, the transformation process may respond to two types of events. "Transformation events" are generated when the transformation starts or terminates. These events are typically used with map level ECA rules to initialize, allocate or free resources used in the transformation process. "Record events" are generated by the processing of source records. The ECA rules defined in the control links are based on these types of events.

Transformation Events

Table 5 provides a list of exemplary transformation events, which may be generated at the beginning or end of the transformation process.

TABLE 5

| Event Name | Description |
| --- | --- |
| Transfor-mationAborted | This event is fired after the transformation process is aborted, but before the TransformationEnded event is triggered. This event provides a map with the ability to perform actions to compensate for any updates made before the abnormal termination of the transformation. This event can only be trapped using the trans-formation level ECA rules. |

TABLE 5-continued

| Event Name | Description |
| --- | --- |
| Transfor-mationEnded | This is the last event triggered for the top level transformation process. This event provides a map with an opportunity to cleanup any allocated resources. The event fires after the execution all of the source records have been processed, but before the targets are closed. This event can only be trapped using the transformation level ECA rules. |
| Transfor-mationStarted | This is the very first event triggered for a top level transformation. It gives a map the opportunity to allocate resources needed for the map. This event can only be trapped using the transformation level ECA rules. |
| ErrorFound | The ErrorFound event is triggered if an error condition is detected during the execution of the transformation process.<br>Error events can be trapped with the ECA rules for a control link or with the transformation level ECA rules. |

Record Events

Record events are triggered during the processing of source records. The context of these events is defined by the end points of the control link. A list of exemplary record events is provided in Table 6.

TABLE 6

| Event Name | Description |
| --- | --- |
| RecordStarted | Triggered for each instance of the source record. |
| RecordEnded | This event is triggered when there is a new instance of the source record in the input stream, but just before it is used to replace the values from the previous instance. This event is helpful when working with grouped sets of records where there are no distinct boundaries between the different groups. |
| GroupEnded(groupby_type, field_list | expression) | Triggered when the end of a group of records is detected on the input stream and before the next group starts. This event is also triggered when the input stream ends. The method for determining the group boundary is specified with the groupby_type parameter. The allowed values are:<br>FIELD_LIST -- The group boundary is determined by watching the values for the specified list of fields from the source record.<br>EXPRESSION -- The group boundary is determined by watching the value computed by an expression. |
| GroupStarted(groupbytype, field list | expression) | Triggered when the start of a group of records is detected on the input stream. The method for determining the group boundary is specified with the groupbytype parameter. The allowed values are:<br>FIELD_LIST -- The group boundary is determined by watching the values for the specified list of fields from the source record.<br>EXPRESSION -- The group boundary is determined by watching the value computed by an expression. |
| ErrorFound | Triggered if an error condition is detected during execution of the transformation process. Error events can be trapped with the ECA rules for a control link, or with the transformation level ECA rules. |

TABLE 6-continued

| Event Name | Description |
| --- | --- |
| RecordRejected | Triggered when a source record rejected target using the reject() function or the Reject action. |
| SourceEnded | Triggered when there are no more source records in an input stream. |
| SourceStarted | Triggered just before records are read on an input stream. |
| SubTreeEnded | Triggered after all records representing a complete sub-tree of a hierarchical structure have been read from the input stream. This event is triggered just before the source transitions to the parent node, or to a sibling of the current tree. This event is also triggered when the input stream ends. |
| SubTreeStarted | Triggered when the start of a new instance of a sub-tree is detected on the input stream. |
| UserDefinedEventDetected (user_defined event_name) | Triggered when a user-defined event is raised using the RaiseUserDefinedEvent action or the RaiseUserDefinedEventQfunction. |

Actions

The schema mapping language described herein supports control actions, record generated actions and command actions in the action lists for ECA rules. In most cases, these actions may be used to control the generation of output records or the state of the transformation engine. Generally, actions may be processed in a predetermined order, which is dependent on the triggering event. If multiple actions are associated with a single event handler, the actions may be executed in the order in which they are defined. In some embodiments, the user may modify the order of execution.

Control Actions

Control actions are used to terminate processing of a control link, source record or the transformation process itself. An exemplary list of control actions is provided in Table 7.

TABLE 7

| Action Name | Description |
| --- | --- |
| Abort([reason_code]) | Aborts the transformation and causes the engine to return the integer reason_code (default is B_ABORTED) as the return code. |
| Break | Causes a break in the processing of the current control link. Execution resumes with the next control link on the current source record. |
| Discard | Signals the transformation engine that the current input record should be rejected. This action causes a break in the processing of the current control link. Execution resumes with the next control link on the current source record. |
| RaiseUserDefinedEvent(user_defined_event_name[, event_parameter_string]) | Raise a user-defined event named user_defined_event_name and optionally pass a string containing event parameter data. |
| Reject([reason_code]) | Signals the transformation engine that the current input record/ should be rejected. The reason_code parameter allows the user to associate the reject with an integer value that can be |

TABLE 7-continued

| | |
|---|---|
| | mapped to the reason for the reject. This action causes a break in the processing of the current control link. Execution resumes with the next control link on the current source record. |
| Terminate | Terminates the transformation and causes the engine to return a successful return code (B_OK). |

Record-Oriented Actions

Record-oriented actions are used to perform output operations and are used to generate output records. They are only used in ECA rules for control links. An exemplary list of record-oriented actions is provided in Table 8.

TABLE 8

| Action Name | Description |
|---|---|
| Aggregate | Evaluates the aggregation functions for aggregate fields in the target record of the control link. |
| ClearRecord([record_address, cascade]) | Clears the data values from the fields for the target record of the control link (default) or optionally for the record specified by record_address. The optional cascade option is used to specify whether or not the clear operation should cascade to child records as well. |
| ClearRecordSet(intermediate_target_port_name) | Deletes all of the rows in the intermediate target. |
| Discard | Signals the transformation engine that the current input record should be discarded. This action causes a break in the processing of control links for the current source record. Execution resumes with the next source record. |
| OutputRecord([count_expression, preserve]) | Evaluates the target field expressions for a record and writes it to the target of the control link count_expr times (default = 1). This action does not evaluate aggregate fields. The values in the target record will be cleared after the output operation unless the preserve parameter is true. |

Command Actions

Command actions are used to execute scripts, commands or nested transformations. They can be used with any ECA rule. An exemplary list of command actions is provided in Table 9.

TABLE 9

| Action Name | Description |
|---|---|
| ExecuteCommand(target_port_name, string, string_type) | Emits a command string (e.g., SQL statement) to be executed by the target specified by target_port_name. The string_type parameter indicates how the string is processed before it is passed to the connector. Allowed values for string_type are<br>PLAIN TEXT - no additional processing of string required<br>EXPRESSION - string is evaluated as an expression and the result is passed to the connector.<br>PREPROCESSOR - string is preprocessed using the SQL statement preprocessor and the result is passed to the connector. |

TABLE 9-continued

| Action Name | Description |
|---|---|
| ExecuteExpression(expression) | Executes the expression |
| OutputRecordSet(alternate_source_port_name [,preserve, max_record_count_expression]) | Use a secondary source or an intermediate target as a source for a downstream target. The values in the row set will be cleared after the output operation unless preserve parameter is true. The max_record count_expr parameter can be used to limit output to the number of records computed in max_record_count_expr expression. |
| TableOperation(operation_type, multimode_record_address) | Perform a table operation on a multi-mode output port. The table or entity name and the table definition are specified using the address of a record, multimode_record_address, from the schema for a multi-mode target port. Allowed values for operation_type are<br>CREATE - Create a new table using the record type information for record_address to define the column names and data types.<br>DROP - Drop the table associated with record_address if the table exists.<br>TRUNCATE - Delete all of the records from the table associated with record_address. This is typically done by performing a truncate operation on the back-end system. |

Aggregation

Values mapped to target fields can be aggregated by using special aggregation operations assigned to the target field. The aggregation operations for these aggregate fields are evaluated using the Aggregate action in ECA rules (see, Table 8). The transformation engine manages all of the internal counters and accumulators needed to compute the aggregate values. Aggregation operations have the basic form of:

aggregation_operation(aggregation_junction, distinct_values_flag, scalar_expression)

Table 10 provides a description for the aggregation parameters shown above.

TABLE 10

| Aggregation Parameter | Description |
|---|---|
| aggregation_function | One of the supported aggregation function types from Table 11 shown below. |
| distinct_values_flag | A boolean value used to indicate whether the aggregation is performed over distinct values or all values of the expression. |
| scalar_expression | Scalar expression used to compute the values that are aggregated. |

The aggregation functions shown in Table 11 are supported in the schema mapping language. The aggregated value is computed over the set of all non-NULL values returned by the parameter scalar_expression.

TABLE 11

| Aggregation Function | Expression Type | Distinct Values Supported | Description |
|---|---|---|---|
| Average | numeric | yes | Returns the average value of the set of values computed by the expression each time target field is mapped |
| Concat | string | yes | Returns a string of concatenated values from the mapping expression. |
| Count | any | yes | Returns the number of non-NULL values for the set of values computed by the expression. If the expression is omitted the result is the count of how many times the Count function is evaluated. |
| First | any | no | Returns the first value computed by the expression |
| Last | any | no | Returns the last value computed by the expression |
| Max | string, datetime or numeric | no | Returns the maximum value of the set of values computed by the expression each time target field is mapped |
| Min | string, datetime or numeric | no | Returns the minimum value of the set of values computed by the expression each time target field is mapped |
| Sum | numeric | yes | Returns the sum of the set of values computed by the expression each time target field is mapped |

Transformation Processing Metadata

During the transformation process, the transformation engine 110 has access to the runtime configuration and to engine statistics that are sometimes useful for the map. These are available through a Transformation object and can be used in mapping expressions or ECA rule conditions. For example, you might use a mapping expression like:

Transformation.RecordCount("SOURCE")

to generate a column in a reject target to relate the rejected record to the original source record. The Transformation object is useful in that it allows the user to query different types of information about the transformation state while the transformation is executing.

Table 12 provides a listing of the read-only properties supported by the Transformation object:

TABLE 12

| Property Name | Data Type | Description |
|---|---|---|
| CurrentSourceName | String | Name of the currently active source port. |
| CurrentTargetName | String | Name of the target based on the context of the action. When the action is executed during the evaluation of ECA rules on a control link the name will be the name of the port referenced by the target side of the control link. In cases where the action is executed outside of a control link the property will return an empty string. |
| EventParameterString | String | The parameter string for the last event. Used primarily for handling user-defined events. |
| IterationCount | Integer | The number of iterations specified for the last OutputRecord action. |
| IterationNumber | Integer | The current iteration number while processing an OutputRecord action. IterationNumber >= 1 and IterationNumber <= IterationCount |
| LastAbortReasonCode | Integer | Returns the reason code for the last call to the Abort( ) function. |
| LastRejectReasonCode | Integer | Returns the reason code for the last call to the Reject( ) function. |
| LastErrorCode ([target_port_name]) | Integer | Error code from last OutputRecord or ExecuteCommand action on the current target port target port or on an optionally specified target port. |
| LastErrorMessage ([target_port_name]) | String | Error message from last OutputRecord or ExecuteCommand action on the current target port target port or on an optionally specified target port. |
| LastRecordAddress ([source_port_name]) | String | The record address for the last source record from the current source port target port or on an optionally specified target port. |
| LastRecordState ([source_port_name]) | Integer | The state (active/discarded/rejected) for the last source record from the current source port target port or on an optionally specified target port. |
| LastRecordType ([source_port_name]) | String | The record type for the last source record from the current source port target port or on an optionally specified target port. |
| LastScriptingErrorCode | Integer | The numeric code for the last scripting error. |
| LastScriptingErrorMessage | String | The message text for the last scripting error. |
| MapName | String | Name of the transformation map. |
| RecordCount(port_name) | Integer | The number of records read from a named input port or the number of records written to a named output port. |
| TotalErrorCount | Integer | Total number of transformation errors counted. |
| TotalRecordsDiscarded ([source_port_name]) | Integer | Total number of records discarded from all sources for the transformation process or total number of records discarded from a specific source port. |
| TotalRecordsRead ([source_port_name]) | Integer | Total number of records read from all sources for the transformation process or total number of records read from a specific source port. |
| TotalRecordsRejected ([source_port_name]) | Integer | Total number of records rejected from all sources for the transformation process or total number of records rejected from a specific source port. |
| TotalRecordsWritten ([target_port_name]) | Integer | Total number of records written to all targets for the transformation process or total number of records written to a specific target port. |
| TransformationState | Integer | Transformation state (active/aborted/terminated) |

Map Execution Model

Figure 17A:
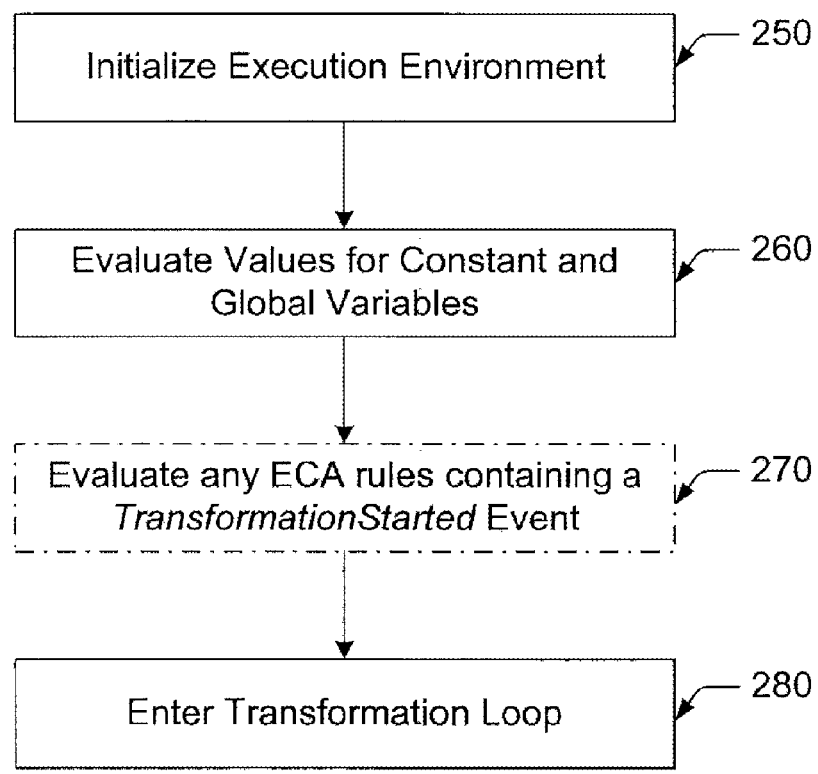
FIGS. 17A-17B are flow chart diagrams illustrating an exemplary method for executing a schema map.
Figure 17B:
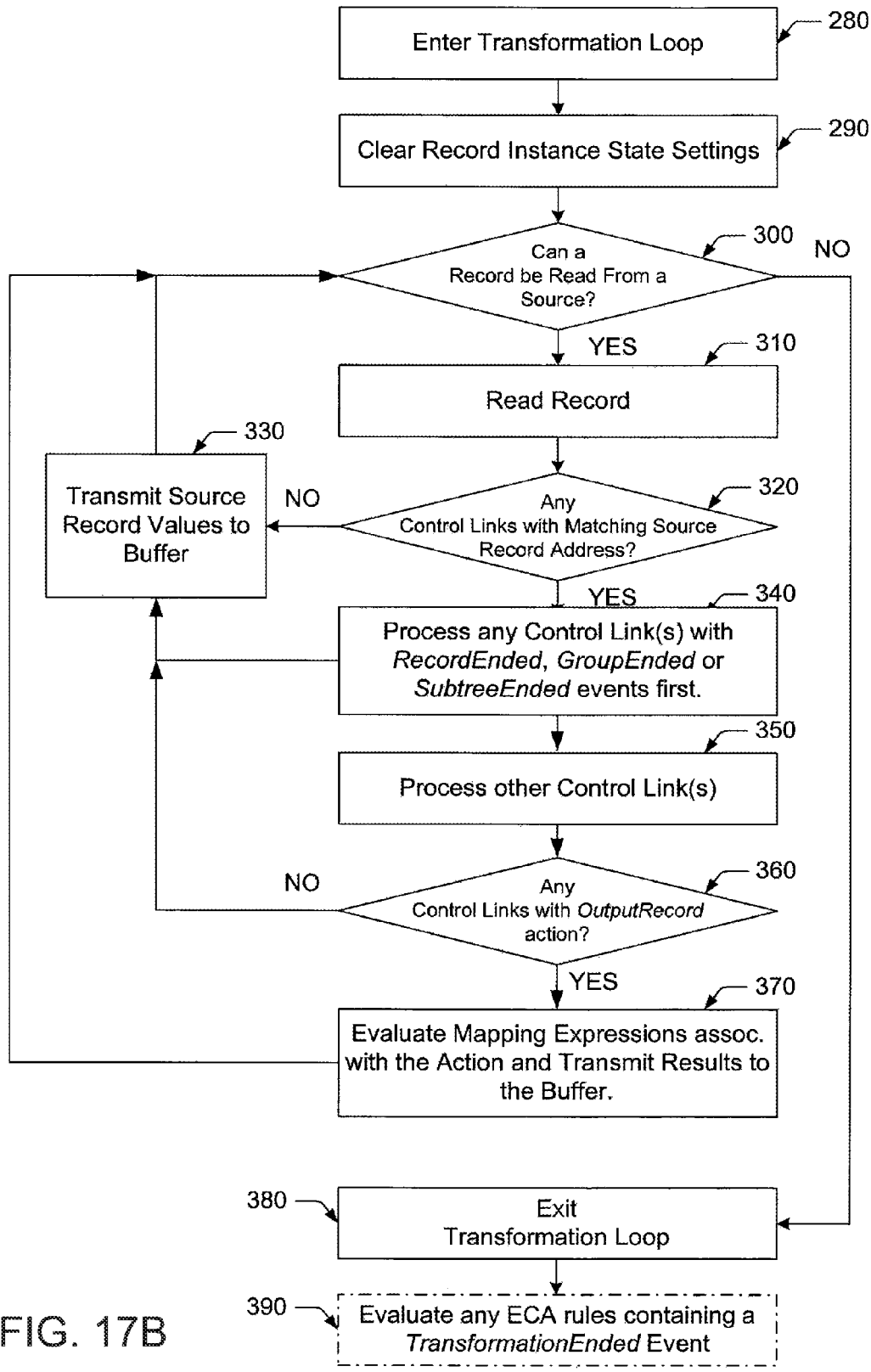

The schema mapping language described herein uses a simple execution model for schema maps. An exemplary embodiment of such a model is shown in FIGS. 17A and 17B. The method shown in FIGS. 17A and 17B is performed during run-time (e.g., in step 240 of FIG. 3), which may occur sometime after the necessary transformation information has been specified (e.g., in steps 200, 210, 220 and 230 of FIG. 3).

Before execution of the map begins, the transformation engine must prepare or initialize the execution environment using a run-time configuration (in step 250 of FIG. 17A). The run-time configuration defines all of the data sets that must be attached to the source and target data ports for the map. The engine must establish connections to each of these data sets and setup all of the objects needed to support the connections during execution. The run-time configuration may also define macros or provide initial values for some global variables.

After the execution environment has been established, the transformation engine evaluates the values for the constant variables used in the map (in step 260 of FIG. 17A). The expressions used to define the constants should be able to reference any of the metadata for the source and target data ports. Once the constant variables have been initialized, the values for any global variables used in the map are evaluated by the transformation engine (in step 260 of FIG. 17A).

If the map contains any ECA rules for the TransformationStarted event, these are evaluated (in step 270 of FIG. 17A) before the transformation loop is entered (in step 280 of FIG. 17A). As noted above, the TransformationStarted event allows the opportunity to allocate the resources needed for the mapping operation. However, not every map may include an ECA rule having a TransformationStarted event. As such, step 270 is shown in FIG. 17A as an optional step.

Once the transformation loop has been entered (in step 280 of FIGS. 17A and 17B), the transformation engine may clear the record instance state settings (e.g. error, rejected or discarded) in step 290 of FIG. 17B and attempt to read a record from the source in step 300 of FIG. 17B. If a record cannot be read (e.g., due to an end of file), the method exits the transformation loop (in step 380 of FIG. 17B).

If a record can be read from a source (in step 300 of FIG. 17B), the transformation engine reads the new record (in step 310 of FIG. 17B) and checks to see if there are any control links having a source record address matching the new record (in step 320 of FIG. 17B). If there are no control links associated with the record, the values for the source record are transferred to the target buffer (in step 330 of FIG. 17B) and the method continues to the top of the loop (step 300 of FIG. 17B) to read the next record.

If the transformation engine determines that one or more control links are associated with the record (in step 320 of FIG. 17B), the ECA rules for each control link are evaluated. As shown in FIG. 17B, any control links comprising an ECA rule associated with a RecordEnded, GroupEnded, or SubtreeEnded type event are evaluated first (in step 340 of FIG. 17B), and the values for the source record are transferred to the target buffer (in step 330 of FIG. 17B) after the control link is processed. Next, all remaining control links are evaluated (in step 350 of FIG. 17B). If a control link comprises an ECA rule comprising an OutputRecord action (in step 360 of FIG. 17B), the data links/mapping expressions associated with the action are evaluated and the results are transmitted to the target buffer (in step 370 of FIG. 17B). Otherwise, the method continues to the top of the loop (step 300 of FIG. 17B) to read the next record.

After the completion of a transformation loop (in step 380 of FIG. 17B), the transformation engine may need to process one or more TransformationEnded event actions (in step 390 of FIG. 17B) to take care of any dangling groups of records. As noted above, the TransformationEnded event enables the transformation engine an opportunity to cleanup any allocated resources. If included, the event is processed after the execution of all source records, but before the targets are closed. However, not every map may include an ECA rule having a TransformationEnded event. As such, step 390 is shown in FIG. 17B as an optional step.

Error Event Processing

Error events are triggered whenever the transformation engine encounters an error during the transformation process. ECA rules can be defined for the ErrorFound event on individual control links and for the top level transformation. When an error occurs during the processing of control link rules, the transformation engine will execute all ErrorFound ECA rules defined for the control link, if any exist. If there are no ErrorFound ECA rules defined for the control link, the engine will execute the ErrorFound ECA rules defined for the transformation, if any exist. If no ErrorFound ECA rules are defined for the transformation, the engine will terminate execution with an unhandled exception error.

Example Schema Mapping Scenarios

The schema mapping language described herein may be used to map between substantially any number of source and target data sets having substantially any schema format. The following examples illustrate three common schema mapping scenarios, including a simple copy, a simple aggregation and a multi-mode case. The examples are provided for illustrative purposes only and should not be considered to limit the scope of the claims.

Example 1

A Simple Copy Operation

A common case with data integration is where data is copied between similar types of systems. For example, product information may be periodically copied from an accounting system to a CRM system. In these cases, the objects in the source and target schemas will often have similar structures and the mappings between the objects will be fairly simple.

Figure 18:
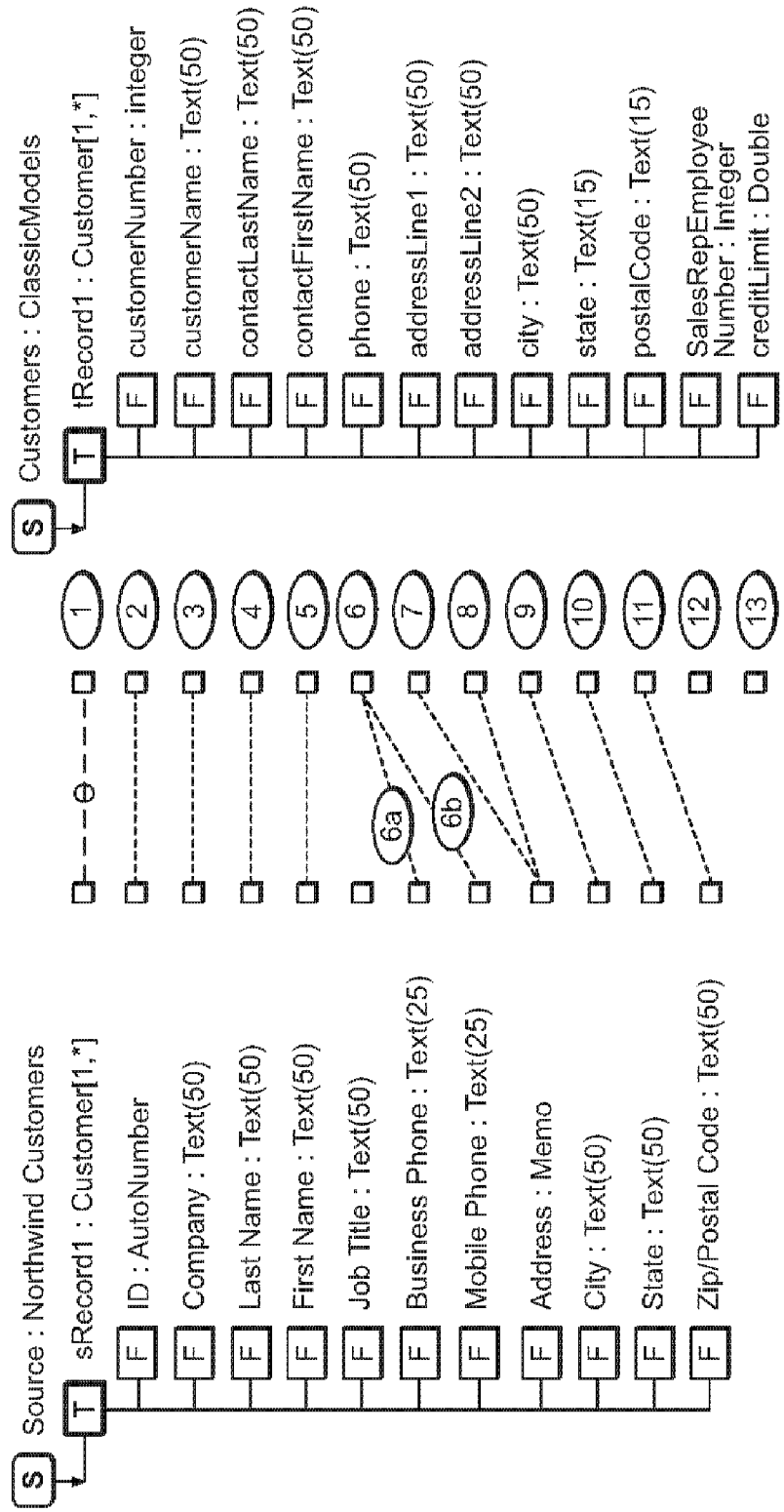
FIG. 18 illustrates an example schema mapping scenario, wherein a plurality of data links and at least one control link are used to perform a copy operation.
Figure 19:
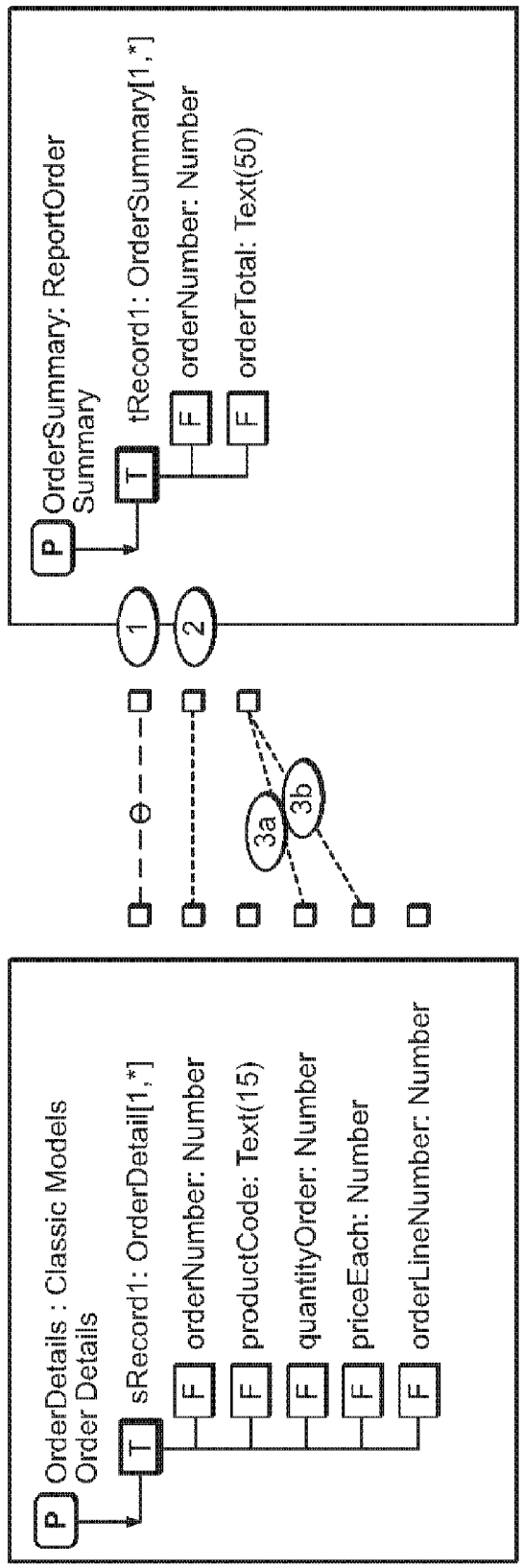
FIG. 19 illustrates another example schema mapping scenario, wherein a plurality of data links and at least one control link are used to perform an aggregate operation.

In the example map shown in FIG. 18, we use sample company databases from two products. The first is the Northwind Traders database shipped with the Microsoft SQL Server and Microsoft Access products. The second is the Classic Model Corporation database, which is used as a sample database for the Eclipse Business Intelligence and Reporting Tool (BIRT).

The map is very simple. There is one control link (Link 1), which is used to control the iteration over the records in the source data set and to control the generation of output records to the target data set. All other links (Links 2-11) are used for mapping the source fields to the target fields. There is one target field (phone) where the value is derived from the values in two source fields (Business Phone and Mobile Phone) and one case where the value of a single source field (Address) is split across two target fields (addressLine1 and addressLine2).

Link1 is the only control link in the map and includes one event-condition-action (ECA) rule and one event-action (EA) rule. The ECA rule defines how the Customer records from the source are processed and how Customer records for the target are generated. For example, the ECA rule may specify: on RecordStarted if FieldAt("/Source/sRecord1/State").value="TX" do OutputRecord( ). In other words, at the start of each record, if the value of the text string in the /Source/sRecord1/State source field is "TX", an instance of the source record will be output to the target /Target/tRecord1. The second EA rule may tell the map engine to abort the transformation process on any error, and thus, may have the form of: on ErrorFound do Abort.

Link 2 maps a key value from the /Source/sRecord1/ID source field to a key value in the /Customers/tRecord1/customerNumber target field. This is a simple copy, so the move operation is used to transfer the source identity value to the target identity field. Links 3-5 and 9-11 also use simple move operations to map the values of the source fields to the appropriate target fields. In Link 11, however, the source field name (Zip/Postal Code) contains the '/' character and must be replaced with the URL encoding of %2F.

Link 6a and Link 6b both map to the same target field, such that the value in the /Customers/tRecord1/phone target field is computed from two separate source values (/Source/sRecord1/Business Phone and /Source/sRecord1/Mobile Phone). In this case, the value of the target field may be determined by expression, the inputs to which are defined by the links (Links 6a and 6b) connected to the target field. In one example, the target expression may be in the form of an if . . . then . . . else statement:

if (Len(FieldAt("/Source/sRecord1/Business Phone"))> 0) then
   return FieldAt("/Source/sRecord1/Business Phone")
else
   return FieldAt("/Source/sRecord1/Mobile Phone")
end if Such an expression may transfer the Business Phone number, if one exists in the /Source/sRecord1/Business Phone source field; otherwise, the Mobile Phone number is transferred to the target field.

In Links 7 and 8, the value of the /Source/sRecord1/Address source field is split across two target fields (/Customers/tRecord1/addressLine1 and /Customers/tRecord1/addressLine2). The values for the addressLine1 field and the addressLine2 field in the target are extracted from the Address field in the source using two target field expressions. For example, the value for the addressLine1 field may be extracted with the expression: Parse(1, FieldAt("/Source/sRecord1/Address"), Chr$(13)), which transfers the first carriage return separated part of the Address field to the addressLine1 field. The next carriage return separated part of the Address field may be extracted to the addressLine2 field using the expression: Parse(2, FieldAt("/Source/sRecord1/Address"), Chr$(13)).

In some cases, one or more target fields may have missing links. In the map shown above, for example, the SalesRepEmployeeNumber and creditLimit fields in the target schema have no direct mappings from the source, so they end up with default values. The schema mapping language described herein contemplates numerous ways of treating missing link type situations. The best approach will be determined by the integration needs and the capabilities of the target system.

In a first embodiment, unmapped target fields may be assigned NULL values. In cases where NULL values are not supported by the target, or where the schema has non-NULL constraints, a type appropriate default value may be assigned (e.g. '0' for numeric fields or an empty string for text fields) to the unmapped target fields. In a second embodiment, the map may explicitly define and assign default values (e.g., constant values or simple expressions) to the unmapped target fields. In a third embodiment, the backend system may define and assign default values to the unmapped target fields. For example, many data management systems support the definition of default values for elements of a schema. Default values are generally used when values are omitted from insert operations. The easiest way to omit values from target records is to omit the fields for those values from the target schema. In a fourth embodiment, the target schema may disallow or restrict assigning a value to one or more target fields. In this case, the target fields will be unmapped, because it is disallowed. This is typically done for fields that are read-only, or fields where the target application automatically generates a value (e.g. ID fields).

Example 2

A Simple Aggregate Operation

A common operation in data warehousing projects is the aggregation of source data. The scenario shown in FIG. 19 looks at a simple aggregation use case. In this case, Order Detail information from a source database is used to compute records wherein the total order amount is calculated for each order. The assumption is that the source data is sorted by order number.

This map is also very simple and includes only one control link (Link 1) to control the iteration over the records in the source data set and to control the generation of output records to the target data set. All other links (Links 2, 3a and 3b) are for mapping the source fields to the target fields. There is one target field (orderTotal) where the value is derived from values in two source fields (quantityOrder and priceEach).

Link 1 is the only control link in the map. To perform the aggregation, two EA (unconditional ECA) rules are used, one EA rule for aggregating values and one EA rule for grouping the results by order number. The first EA rule determines when there is a transition from one order to another by watching for value changes in the orderNumber field. The first EA rule may be of the form: on GroupEnded (FIELD_LIST, "orderNumber") do OuputRecord( ) When a new order number is encountered, the aggregated values from the previous order are output to the target schema and the accumulators (temporary variables) are reinitialized to start the aggregation of the next order. The second EA rule aggregates the values for each record by specifying: on RecordStarted do Aggregate.

Link 2 maps a key value from the /OrderDetails/sRecord1/orderNumber source field to a key value in the /Customers/tRecord1/customerNumber target field. This is a simple copy, so the move operation is used to transfer the source identity value to the target identity field.

Links 3a and 3b map the quantityOrder and priceEach inputs to be aggregated into the orderTotal target field using the target expression: FieldAt ("/OrderDetails/sRecord1/quantityOrder").value*FieldAt("/OrderDetails/sRecord1/priceEach").value. The aggregate function type Sum is used to perform the aggregation operation over all values. This means that the result of the expression for the target field is added to the previous value instead of replacing it, such that: orderTotal=orderTotal+newvalue.

Example 3

A Multi-Mode Operation

Multi-mode targets support multiple types of output operations on one or more target objects. These operations include insert (default), delete, update and upsert. In multi-mode, each output record is assigned an output operation and a target name. This is achieved, in one embodiment, by binding each record type in the target schema to a specific output operation and target object. To select an operation other than the default insert, keys must be defined for matching the records to be deleted, updated or upserted.

Figure 20:
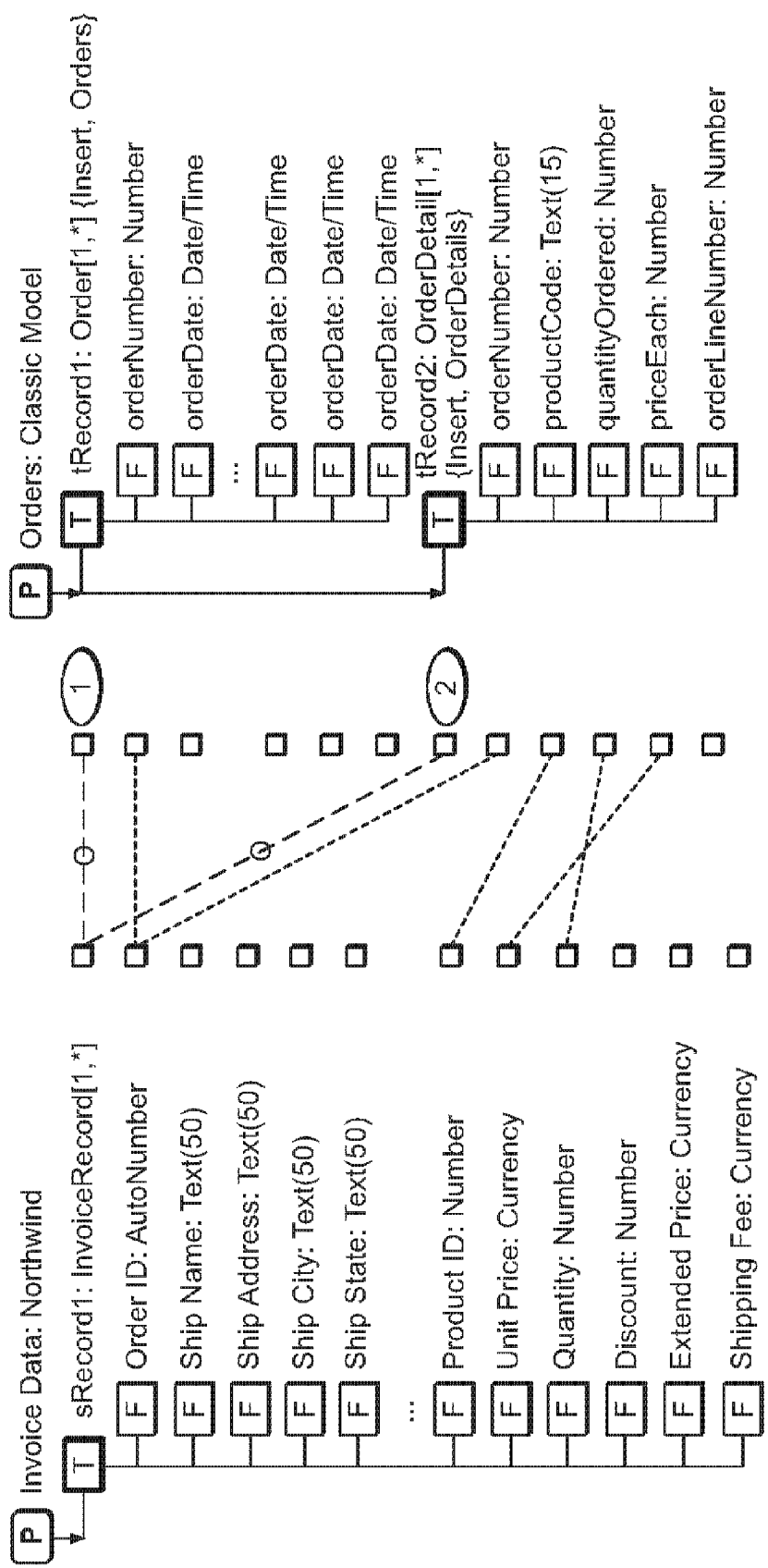
FIG. 20 illustrates another example schema mapping scenario, wherein a target schema is configured for supporting multiple types of output operations on one or more target objects.

The schema map of FIG. 20 demonstrates an exemplary multi-mode output operation for a source schema representing the structure of the Invoice Data query. We assume that the input data is sorted by Order ID. For any given Order ID, the source dataset includes one or more records determined by the number of order details. The schema map of FIG. 20 generates output for two different tables in the target data set: one Order record for each unique Order ID and one Order Detail for each input record.

This map is designed to work with multi-mode targets, so the target schema must define the structure of each output table as a record type. For each record type, the output operation (e.g., insert, delete, update or upsert) and the target object name (e.g., Orders or OrderDetails) must be defined. In the exemplary schema map of FIG. 20, the /Orders/tRecord1 record type is used to insert records into the Orders target table using the insert operation. Similarly, the /Orders/tRecord2 record type is used to insert records into the OrderDetails target table. Although the schema map of FIG. 20 uses the same operation (i.e., insert) for outputting records to both record types, different output operations may be used setting the appropriate keys in one or more of the record types.

The map has two control links, one for each output record type. The first control link (link 1) controls the output of the Order records to the target. In order to output one record for every unique Order ID, the first link may comprise an EA rule of the form: on GroupStarted (FIELD_LIST, "Order ID") do OuputRecord( ). Alternatively, the first control link could use a GroupStarted(EXPRESSION, . . . ) EA rule if we need to use an expression to compute the group key or just clean up the values. Such an EA rule may be in the form of GroupStarted (EXPRESSION, "Trim(FieldAt("/OrderDetails/sRecord1/Order ID"").value)") do OuputRecord( ).

The second control link (link 2) generates an Order Detail for each input record by using an RecordStarted EA rule and setting the conditional expression to always return true. Such an EA rule may be in the form of on RecordStarted (FIELD_LIST, "Order ID") if true do OuputRecord( ).

IV. An Embodiment of an Improved Graphical Mapping Tool

Preferred embodiments of an event-driven transformation system and methods for generating and executing event-driven transformations have been described above in reference to FIGS. 1-3, 17A, and 17B. As noted above, the transformation system (100, FIGS. 1-2) comprises a map designer (150, FIG. 2A) that improves upon conventional graphical mapping tools by providing many features lacking in those tools. For instance, the map designer 150 provides support for full event-condition-action (ECA) rules, which increases rule flexibility while eliminating excessive code generation on the part of the user, so that even business personnel with limited programming experience may generate and run transformations. In addition, the relationships between linked source and target elements in map designer 150 are described by expressions, instead of the "functoids" used by conventional tools which are limiting and create unnecessary and often times overwhelming congestion in the tool's mapping region. Furthermore, the map designer 150 described herein provides support for both simple and complex mapping scenarios within a single graphical user interface. Examples of complex mapping scenarios include, but are not limited to, mappings between multiple sources and multiple targets, multiple record types on both source and target, multi-mode targets, intermediate targets and mini-maps, and hierarchical schemas. In order to provide these features, the map designer 150 utilizes the schema mapping language described above in Section III.

As noted above, the map designer 150 receives the data and metadata retrieved from the data source(s) and data target(s), and presents the data and metadata to a user in a graphical mapping interface as source and target schemas. The graphical mapping interface allows the user to create links between source and target schema elements, and to specify transformation rules and expressions between the linked elements. In preferred embodiments, the graphical mapping interface improves upon the user interfaces of conventional mapping tools by providing the user access to the additional features supported by the improved map designer.

Preferred embodiments of the graphical mapping interface are described below in reference to FIGS. 21-44. In particular, FIGS. 21-44 provide screen shots illustrating various properties and functionalities of the graphical mapping interface described herein. It is noted, however, that while the graphical mapping interface is illustrated as having a particular "look," certain visual attributes of the mapping interface may change without departing from the intended functionality of the mapping interface, and thus, the scope of the present invention.

Figure 21A:
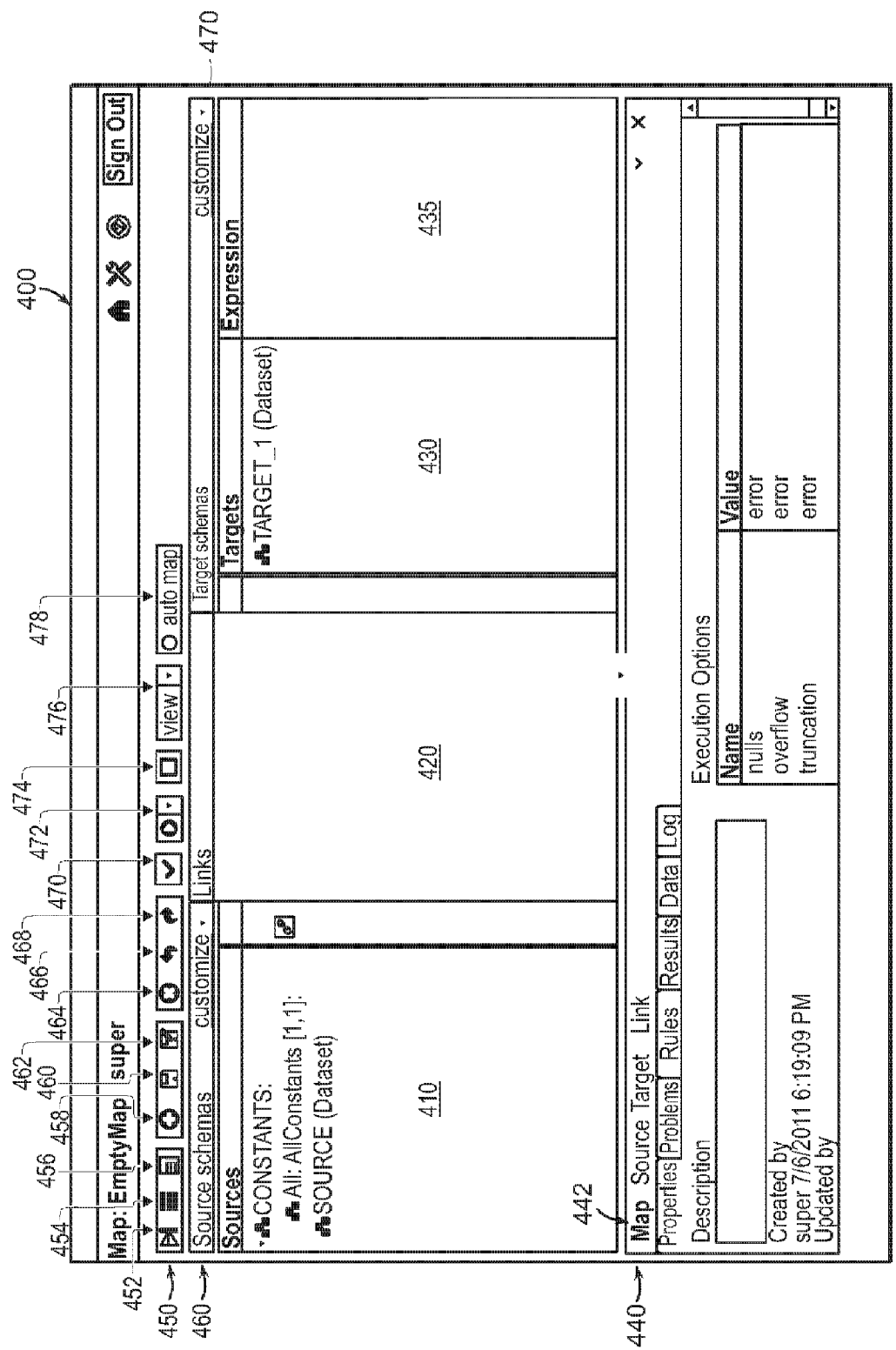
FIGS. 21A-21D are screen shots illustrating an exemplary embodiment of a graphical user interface for a graphical mapping tool (referred to herein as a graphical mapping interface) comprising a source schema region, a mapping region, a target schema region, an expression region and a console panel, wherein the console panel comprises a Map pane, a Source pane, a Target pane and a Link pane.
Figure 21B:
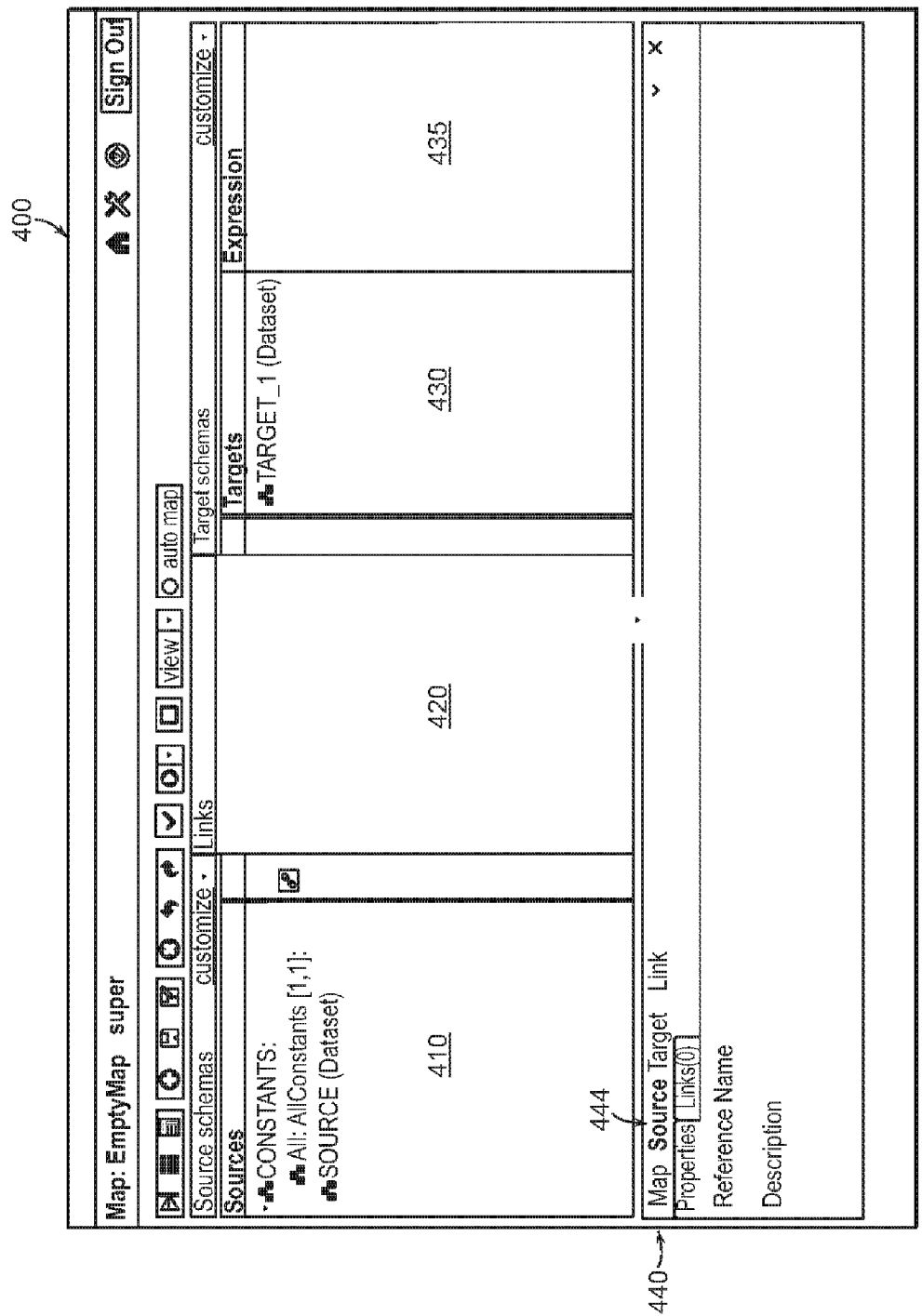
Figure 21C:
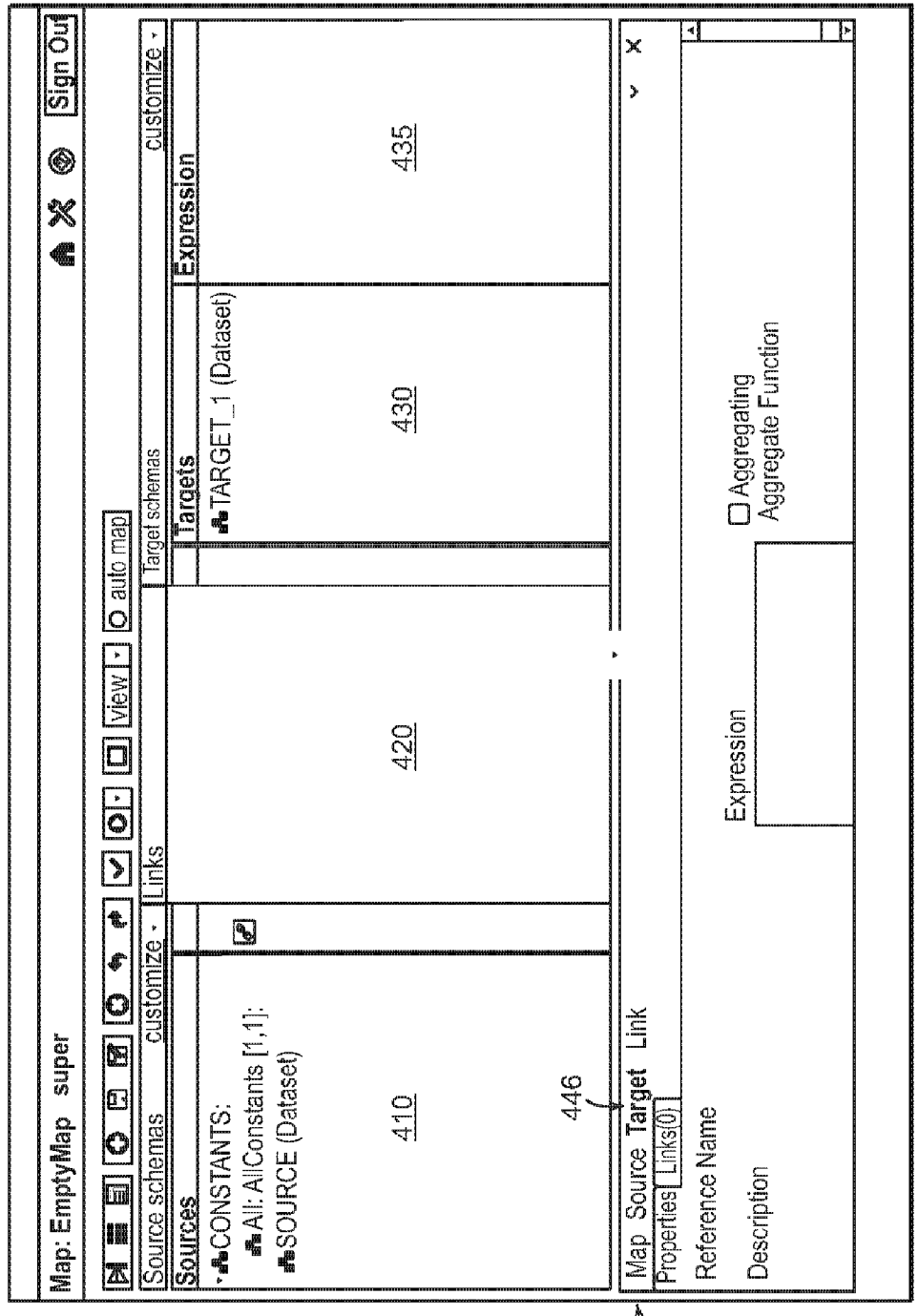

FIG. 21A illustrates a graphical mapping interface 400 in accordance with one embodiment of the present invention. In particular, FIG. 21A illustrates the graphical mapping interface 400 displayed in a "map editor view," which is the main view used for creating a schema map. When configured in the map editor view, the graphical mapping interface 400 comprises a Map Canvas, which in one embodiment, includes three horizontally resizable panels. These panels include a source schema region 410 for displaying a graphical representation of one or more source schemas, a target schema region 430 for displaying a graphical representation of one or more target schemas, and a mapping region 420 for creating and displaying a graphical representation of mappings or links between elements of the source and target schemas.

The graphical mapping interface 400 shown in FIG. 21A represents an empty map, or a map that has not yet been populated with source and target schemas. Once the source and target schema regions 410 of the map are populated with one or more source and target schemas, mapping is accomplished by drawing graphical links between elements of the source and target schemas in the mapping region 420. As shown in FIG. 21A and described in more detail below, the target schema region 430 includes an expression region 435 for creating expressions between linked source and target schema elements, and in some cases, for creating expressions for unlinked target elements.

When configured in the map editor view (FIG. 21A), the schemas included within the source and target schema regions 410, 430 can be displayed in collapsed, partially expanded or fully expanded forms. In many cases, a user may wish to display the schemas in a partially or fully expanded form to allow for easy mapping between the schema elements.

Below the Map Canvas, a console panel 440 is provided for setting properties for the schema map as a whole (in the "Map" pane), setting properties for a single source schema element (in the "Source" pane), setting properties for a single target schema element (in the "Target" pane) and/or setting properties for a link between a source and target schema element (in the "Link" pane). The graphical mapping interface 400 also includes a plurality of toolbar buttons 450 for performing various functions in the graphical mapping interface 400. Each of the elements of the graphical mapping interface 400 will be described in more detail below.

Toolbar Buttons

As noted above, the graphical mapping interface 400 includes a plurality of toolbar buttons 450 for performing various functions in the graphical mapping interface 400. Toolbar buttons 452, 454 and 456, for example, may be used to switch between different views of the graphical mapping interface 400. In some cases, view button 452 may be selected to present the "map editor view" shown in FIG. 21A and described briefly above. When configured in the map editor view, the graphical mapping interface 400 allows the user to create, edit, load, save, validate and run schema maps. In some cases, the user may click on view button 454 or view button 456 to change the view of the graphical mapping interface 400. For instance, the user may click on view button 454 to display an "all fields view," which is a flattened view of the source and target schemas showing only the field elements of the source and target schemas. In some embodiments, mapping can be performed and target field expressions can be edited in this view. On the other hand, the user may click on view button 456 to display a "summary view," which shows a power view of the map design. This view is useful in that it provides a Find and Highlight control feature for easily searching different parts of the schema map.

In addition to view buttons (452, 454 and 456), the graphical mapping interface 400 includes a plurality of design repository buttons (458, 460, and 462) for creating new maps and saving map designs, a plurality of map design buttons (464, 466, 468, 470 and 472) for deleting a link, undoing/redoing a map design change, validating a map and running a map, an abort button (474) to abort a running map, a view drop-down menu (476) for controlling parts of the map editor view, and an auto map button (478) for automatically mapping between source and target schemas. Each of these buttons will be described in more detail below.

The new button 458 allows a user to create a new map and launch a new instance of the map designer/graphical mapping interface in a new browser window or tab. The save button 460 is used for saving map design changes, and the save as button 462 is used for saving the current map design under a new name, thereby duplicating the map design.

The delete button 464 is used for deleting one or more links. The delete button 464 is disabled until a particular link is selected, either by clicking on the link or clicking on the source or target schema node that contains the link. Once a link is selected, it can be deleted by pressing the delete button 464 or the delete key on the computer keyboard. Undo button 466 is used to undo a map design change, while redo button 468 is used for re-doing a map design change. In some embodiments, every map design change is undo-able/re-doable.

At any given time in the map design process, a user can validate the map design by clicking on the validate button 470. The validation results are displayed under the Problems tab in the Map pane (discussed below) of console panel 440. Each validation issue will be listed on a separate row in the problems grid (see, e.g., FIG. 42).

The run button 472 is a drop down menu that allows the user to define one or more runtime configurations for a current map design. If a runtime configuration has not yet been defined for a map, clicking on the run button 472 launches a runtime configuration dialog box (see, e.g., FIG. 44) through which the user can define one or more runtime configurations for the current map design. As noted above, runtime configurations are used by the transformation engine (110, FIG. 2B) during runtime to perform a data transformation using the schema map design. If one or more runtime configurations have already been defined for a map, clicking on the run button 472 displays a drop down list of the runtime configurations available to run the map. Clicking directly on one of these will run the map using the selected runtime configuration. If a user wishes to abort a map that is currently running, the user may click on the Abort button (474) to do so.

While a map is running, a user may view the status of the map execution under the Results tab in the Map pane (discussed below) of console panel 440. After execution of the map is complete, the user may view a log file of the map execution under the Log tab in the Map pane (discussed below) of console panel 440. In addition, the user may view a list of all datasets that were defined in the selected runtime configuration under the Data tab in the Map pane (discussed below) of console panel 440. By clicking on any one of these datasets, the user may view the source data or the target data that was produced by successful execution of the schema map.

The view menu button 476 is used to control parts of the map editor view, e.g., by showing/hiding the mapping region 420, the map console 440, or both. In addition, the view menu button 476 can be used to view a pop-up dialog box for adding global variables and/or user-defined scripting functions to mapping expressions, or for adding macros that a user intends to use in a map.

Map Canvas

As noted above, the Map Canvas includes three panels or regions: a source schema region 410, a mapping region 420 and a target schema region 430. In one embodiment, the three panels 410, 420 and 430 are horizontally-resizable and arranged adjacent to one another in a side-by-side configuration as shown, for example, in FIG. 21. However, the Map Canvas is not limited to such a configuration and may be alternatively arranged in other embodiments of the invention. In one alternative embodiment, for example, the graphical mapping interface 400 may allow the user to rearrange or move one or more of the panels 410, 420 and 430 to another area of the screen. The graphical mapping interface 400 may also allow the user to hide one or more of the panels (such as, e.g., the mapping region 420). Thus, the present invention contemplates and provides a graphical mapping interface 400 having a customizable layout.

In order to be valid, a schema map must include at least one source schema (i.e., a primary source) in the source schema region 410 and at least one target schema (i.e., a primary target) in the target schema region 430. Exemplary embodiments for adding a primary source and a primary target to a schema map will be described in more detail below in reference to FIGS. 22-26.

However, a schema map is not limited to only one source and target, and may include multiple sources and/or multiple targets in the source and target schema regions 410, 430 of the graphical mapping interface 400. For example, in addition to the primary source, a schema map may optionally include one or more secondary sources and/or a constants container in the source schema region 410. Likewise, a schema map may optionally include one or more secondary targets in the target schema region 430 in addition to the primary target. Types of secondary sources and secondary targets that may be included within the source and target schema regions 410, 430 will be discussed in more detail below. In some cases, a schema map may include a variety of different data sources and targets in the source and target schema regions 410, 430. While there is no theoretical limit to the number of sources/targets that can be included within a schema map, resource and performance concerns may place practical limits on the number used. In addition, each of the source and target schemas included within a schema map must have a unique port name, as these names are used as part of the map addressing scheme.

As noted above, source and target schemas may be single record schemas comprising a single record having one or more fields, multi-record schemas comprising a plurality of records, each having one or more fields, or hierarchical schemas comprising a plurality of records, wherein the records of a hierarchical schema may include a hierarchical arrangement of records and fields. All schema types will be depicted in the source and target schema regions 410, 430 as having a root (schema) node followed by 1-N record nodes. Depending on the type of schema displayed, the 1-N record nodes may contain structure field nodes, field nodes and/or additional record nodes. Schemas are typically displayed in full hierarchical expansion in the source and target schema regions 410, 430 with the exception of grouping elements, which are mainly used for validation purposes and are not needed for mapping.

Directly above the source and target schema regions 410, 430, drop down menus (460, 470, respectively) are provided for performing various operations within the source and target schema regions. For example, drop down menu 460 provides options for adding a secondary source (such as a constant variable or an intermediate target), deleting a constant, changing a schema or refreshing a schema in the source schema region 410. Similarly, drop down menu 470 provides options for adding a secondary target (such as an additional final target), deleting a target, changing a schema or refreshing a schema, and duplicating a mapping in the target schema region 430. In some cases, one or more of the menu items in drop down menus 460, 470 may be enabled/disabled depending on the currently selected source/target tree node. The options provided in drop down menus 460, 470 are discussed in more detail below.

Adding/Deleting a Constant

In some embodiments, a user may wish to add a constant variable to the source schema region 410 by selecting the "Add a Constant" option in drop down menu 460. Exemplary embodiments for adding a constant variable to a schema map will be described in more detail below in reference to FIG. 34. Similar to adding a constant, a constant can be deleted by selecting the "Delete a Constant" option in drop down menu 460.

Adding a constant will add a field level node to the Contants/AllConstants node in the source schema region 410. As noted above in Section III, the AllConstants node (i.e., the constants container) is a special source port used for defining and referencing constant variables. The container may contain a flat list of one or more variables. Once defined, the constant variables can be linked to a target field using a data link. Constant variables will have a data type and an initialization expression. The expression will be evaluated as part of the initialization process of the map at execution time, and the result will be assigned to the variable as the constant value. From that point on, all references to the variable will be read-only.

Adding/Deleting an Intermediate Target

In some embodiments, a user may wish to add an intermediate target to the source schema region 410. As noted above in Section III, intermediate targets are special in-memory targets used, e.g., to perform lookup operations or staging of data. Although intermediate targets play the role of both a source and a target, intermediate targets are added to the source schema region 410 via drop down menu 460. An intermediate target may be added by selecting the "Add" option followed by the "Lookup file or table" option or the "Temporary target" option in drop down menu 460. There are many types of intermediate targets that may be added to the source schema region 410 including, but not limited to, row sets, dynamic lookup tables, and static lookup tables. These are discussed in more detail above. Adding an intermediate target creates a "mini-map" for mapping data into an intermediate target. Exemplary embodiments for adding intermediate targets and creating mini-maps will be described in more detail below in reference to FIGS. 35-41.

Once the mini-map is populated with data and closed, the intermediate target corresponding to the mini-map becomes a source on the Map Canvas that can be used to transfer data to other intermediate targets or to a final target. The intermediate target is displayed in the source schema region 410 as a schema root node having a schema name (e.g., field_list_._item) followed by two buttons to the right of the schema name (see, FIG. 19). One button (minus button) is used for deleting the intermediate target and mini-map, while the other (linking button) is used for re-launching the mini-map (e.g., for editing the mini-map). In some embodiments, the color of the linking button may indicate whether or not links have been drawn on the mini-map.

Adding/Deleting Additional Targets

In some embodiments, a user may wish to add an additional final target to the target schema region 430. The target schema region 430 defines all of the final targets in the schema map. There may be any number of final targets and a target can be added at any time during the map design process. An additional target may be added by selecting the "Add a Target" option in drop down menu 470. Likewise, a target can be deleted by selecting the "Delete a Target" option in drop down menu 470. Exemplary embodiments for adding additional final targets will be described in more detail below in reference to FIG. 41.

Changing a Schema

In some cases, a user may want to change a current schema to a new schema. In one embodiment, the schema for a source or intermediate target may be changed by clicking on the root schema node for the source or intermediate target in the source schema region 410 and selecting the "Change Schema" option in the drop down menu 460. Likewise, a target schema can be changed by clicking on the root schema node for the target in the target schema region 430 and selecting the "Change Schema" option in the drop down menu 470.

Changing a schema is one of the few operations that cannot be undone, as it clears the undo stack. In addition, changing a schema will affect every place the schema is used, e.g., as a source on the main map canvas, or as a target for a mini-map. Before a schema is changed, a user may wish to run a report to show what (if any) types of problems may occur in the map based on the new schema. The results of running a change schema report can be displayed on the Map Problems pane (discussed below) of console panel 440.

Refreshing a Schema

In some cases, a user may want to refresh a schema currently used for a source, target or intermediate target. A schema for a source or intermediate target may be refreshed by clicking on the root schema node for the source or intermediate target in the source schema region 410 and selecting the "Refresh Schema" option in the drop down menu 460. Likewise, a target schema can be refreshed by clicking on the root schema node for the target in the target schema region 430 and selecting the "Refresh Schema" option in the drop down menu 470.

When a schema is refreshed, the map designer/graphical mapping interface rereads the currently selected schema and updates the schema based on any changes that have been made to the schema since it was added or last refreshed. In one embodiment, the map designer stores a snap shot of the schema at the time the schema is added to the map, and replaces that snap shot with a new snap shot of the schema at the time the schema is refreshed.

Refreshing a schema will affect every place the schema is used, e.g., as a source on the main map canvas, or as a target for a mini-map. Before a schema is refreshed, a user may wish to run a report to show what (if any) types of problems may occur in the map based on the refreshed schema. The results of running a refresh schema report can be displayed on the Map Problems pane (discussed below) of console panel 440.

Duplicate Mapping

In some cases, a user may want to duplicate a mapping by copying map links and expressions froth one target record to another. A mapping may be duplicated by clicking on the target record to be duplicated and selecting the "Duplicate mapping" option in drop down menu 470. This causes a dialog box (not shown) to be displayed, which prompts the user to choose a destination record to which the map links and expressions from the selected target record should be copied. After a destination record is selected, the user may press the Duplicate button (not shown) to copy the map links and expressions from the selected target record to the selected destination record.

Console Panel

As noted above, the console panel 440 may comprise a "Map" pane 442 for setting properties for the schema map as a whole, a "Source" pane 444 for setting properties for a single source schema element, a "Target" pane 446 for setting properties for a single target schema element and a "Link" pane 448 for setting properties for a link between a source and target schema element. Each of these panes (or "property areas") will be described in more detail below in reference to FIGS. 21A-21D.

However, the console panel 440 is not limited to providing a Map pane, a Source pane, a Target pane and a Link pane, as shown in FIGS. 21A-21D and described herein. In some embodiments, the console panel 440 may comprise additional and/or alternative "panes" or "tabs" for setting properties and/or displaying data or metadata. In some embodiments, the console panel 440 may provide alternative means for setting properties and/or displaying data or metadata, other than the "panes" and "tabs" specifically illustrated and described herein.

As noted above, the console panel 440 may be arranged below the Map Canvas, as shown in the embodiments of FIGS. 21A-21D. It is noted, however, that the console panel 440 is not limited to the arrangement specifically illustrated and described herein. In some embodiments, the console panel 440 may be moved to a different area of the display screen, or hidden from the user's view.

Map Pane

The Map pane 442 of console panel 440 (FIG. 21A) is global to the entire schema map and includes a plurality of tabs for setting properties, creating ECA rules based on transformation events, and displaying various problems, results, data and log files. The Map pane 442 is otherwise referred to herein as a "map properties area."

For example, the map description and default execution properties may be set under the Properties tab in the Map pane 442. Execution properties determine how the transformation engine handles nulls, truncation and overflow conditions.

Under the Rules tab, a user may create ECA rules for performing pre-transformation processing (e.g., creating or clearing tables), performing post-transformation processing (e.g., writing summary records), or handling transformation errors or aborted transformations. The ECA rules created under the Rules tab are based on transformation events and are global to the entire map.

Under the Problems tab, the map designer may display a list of problems generated in response to pressing the validate button 470, or display a list of potential problems that may occur after running a change schema or refresh schema report. In some embodiments, selecting a particular problem from the displayed list may highlight the corresponding problem area in the schema map.

Under the Results tab, the map designer may display the results of the map execution performed in response to pressing the run button 472. In addition, a log file of the map execution may be displayed under the Log tab in the Map pane. Furthermore, a list of all datasets that were defined in the last executed runtime configuration may be displayed under the Data tab in the Map pane. By clicking on any one of these datasets, the user may view the source data or the target data that was produced by successful execution of the map.

Source Pane

The Source pane 444 of console panel 440 (FIG. 21B) displays information about a selected source node in the source schema region 410, or a selected source node in a mini-map, whichever map currently has focus. The Source pane 444 is otherwise referred to herein as a "source properties area." The Source pane 444 comprises a Properties tab for displaying the source reference name (i.e., the full path expression describing the hierarchical position of the source node in the source schema) and a source node description (if one exists) for all source node types.

As noted above, source reference names are built using the name of the root schema node, as well as the element names for all nodes arranged between the root schema node and the addressed node. Each element name in the path is delimited using a forward slash ('/'). The leading forward slash arranged ahead of the root schema node is used to indicate that the path is relative to the root of the map, or in other words, an absolute path. In addition, source path expressions may include a FieldAt or RecordAt function to precisely define the position of a source field or record node within the source schema. For example, a path expression such as FieldAt(/SOURCE/R1/State) may be used to address the State field in the SOURCE schema shown in FIG. 17 and described in more detail below.

In addition, a user may utilize the Properties tab for setting and/or displaying various properties for the selected source node. As noted above, there are different types of source nodes that may be included within the source schema region 410, such as root schema nodes (i.e., the primary source and any secondary sources defined for the schema), record reference/type nodes, structure filed nodes and field nodes. Different properties may be set for each of the different types of nodes. For example, the Properties tab may include a grid for setting a schema mismatch property for schema root node types. If the source node is a lookup, the Properties table may also contain a property for setting the lookup type (e.g., incore, flat file or dynamic).

The Source pane 444 also comprises a Links tab for displaying a list of all target nodes linked to the currently selected source node. Clicking on one of the target nodes in this list causes the corresponding source-target node link to be selected for deleting the link or displaying properties of the target node. If a target node is selected from the list displayed under the Links tab of the Source pane, and the user subsequently selects the Link pane (discussed below), the user can view the link properties associated with the corresponding source-target node link. If the link is a control link, the user can create ECA rules under the Rules tab of the Link pane (discussed below).

Target Pane

The Target pane 446 of console panel 440 (FIG. 21C) displays information about a selected target node in the target schema region 430, or a selected target node in a mini-map, whichever map currently has focus. The Target pane 446 is otherwise referred to herein as a "target properties area." Like the Source pane, the Target pane 446 comprises a Properties tab for displaying the target reference name (i.e., the full path expression describing the hierarchical position of the target node within the target schema) and a target node description (if one exists) for all target node types. Similar to source reference names, target reference names are built using the name of the root schema node, as well as the names for all nodes arranged between the root schema node and the addressed node. For example, a path expression such as /TARGET_1/R1/State may be used to address the State field in the TARGET_1 schema shown in FIG. 18 and described in more detail below In addition, a user may utilize the Properties tab for setting and/or displaying various properties for the selected target node. As noted above, there are different types of target nodes that may be included within the target schema region 430, such as root schema nodes (i.e., the primary target and any secondary targets defined for the schema), record reference/type nodes, structure field nodes and field nodes. Different properties may be set for each of the different types of nodes.

For example, the Properties tab may include a grid for setting a schema mismatch property for schema root node types. In addition, the Properties tab also provides means for setting and/or displaying target field expression(s), as well as means for setting up an aggregation. For example, the Properties tab may include an Expression box for setting and/or displaying one or more target field expressions for a currently selected target node. In addition, the Properties tab may include an Aggregate Functions box for selecting an aggregate function (see, Table 11) to be used for aggregating values mapped to the currently selected target node, and an Aggregate Parameters box for specifying one or more aggregation parameters (see, Table 10).

Another one of the properties that may be set for a target record node is whether or not the target record node is a multi-mode target. Unlike single-mode targets, which support only one output operation on a target object, multi-mode targets support multiple types of output operations on one or more target objects. These operations include insert (default), delete, update and upsert. In multi-mode, each output record type is assigned a specific output operation and a target reference name. To select an operation other than the default insert, keys must be defined for matching the records to be deleted, updated or upserted. When a target record node is defined as a multi-mode target, an additional grid is displayed under the Properties tab of the Target pane for setting the multi-mode properties (e.g., output operation, target object and/or keys) for each record type in the target schema.

The Target pane 446 also comprises a Links tab for displaying a list of all source nodes linked to the currently selected target node. Clicking on one of the source nodes in this list causes the corresponding source-target node link to be selected for deleting the link and/or displaying properties of the source node. If a source node is selected from the list displayed under the Links tab in the Target pane, and the user subsequently selects the Link pane (discussed below), the user can view the link properties associated with the corresponding source-target node link. If the link is a control link, the user can create ECA rules under the Rules tab of the Link pane (discussed below).

Link Pane

The Link pane 448 of console panel 440 (FIG. 21D) displays information about a selected source-target link. The Link pane 448 is otherwise referred to herein as a "link properties area". The Link pane 448 comprises a Properties tab for displaying the source link node reference, the target link node reference and the type of link (e.g., data link or control link). If the selected link is a control link, the Properties tab provides a map children button to automatically map child field nodes.

As noted above in Section III, a control link is a visual artifact for showing how events triggered from reading a particular record type from a source relate to actions for a particular record type on a target. Control links are created by linking a source record to a target record, and have Event-Condition-Action (ECA) rules associated with them to control the transformation behavior for any given record type.

Figure 21D:
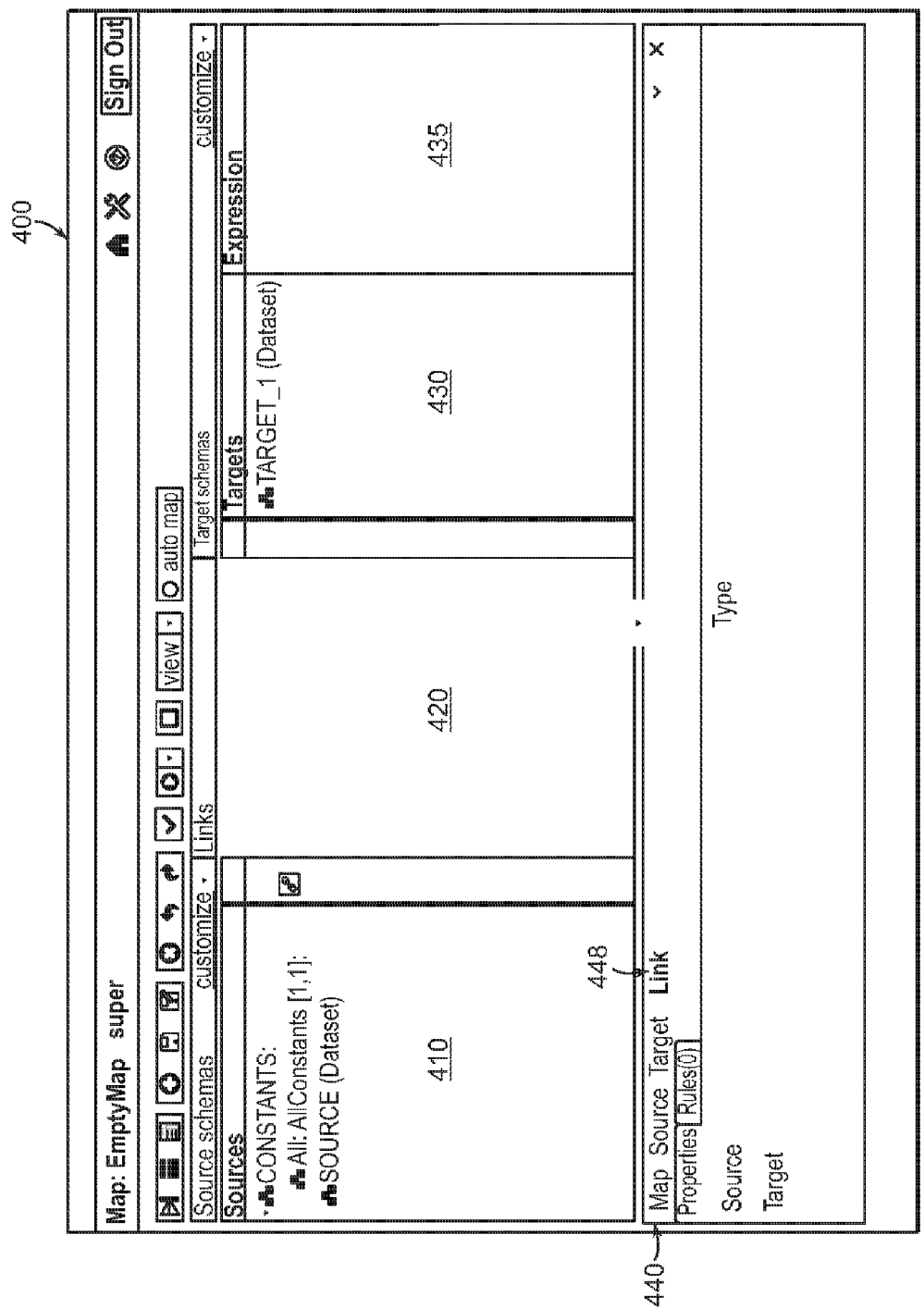

As shown in FIG. 21D and described in more detail below with reference to FIGS. 30-31, the Link pane 448 comprises a Rules tab for creating the ECA rule(s) associated with a control link. The Rules tab includes a plurality of user input boxes for enabling a user to specify one or more ECA rules for each control link included within the schema map. In one embodiment, the Rules tab may include an Events box for specifying one or more events for a given control link. Events may be added to the Events box by clicking on the "+" drop down menu, which provides a list of all events available for a selected control link. Events may be removed from the Events box by clicking on the "−" button when an event is selected. For each event included within the Events box, the user may define event parameters (e.g., name and value) in an Event parameters box, optional conditional expressions (e.g., FieldAt(/SOURCE/R1/Balance)>= 1000.00) in a Conditional expression box, actions to be performed for the event if the optional condition is met in a Condition true (or blank) actions box or not met in a Condition false (or blank) actions box, and action parameters (e.g., name and value) in an Action parameters box. Like events, actions may be added to the Actions boxes by clicking on the "+" drop down menu, and removed by clicking on the "−" button when an action is selected. Exemplary events and actions are discussed in detail above.

Mapping

In the graphical mapping interface 400 described herein, a schema map contains a set of rules for transforming data from one or more sources to one or more targets, and is created in two phases: design time and runtime. The separation between design and run-time enables artifacts created during the design phase to be reused in other maps or within other operations. The design phase of the mapping process comprises three main steps: defining the source and target schemas, using the schemas to create mappings between data records and fields, and setting the expressions and ECA rules needed to control one or more of such mappings. The runtime phase generally involves the last two steps of the mapping process, which include creating a runtime configuration and running the map. The basic steps employed for designing and running a schema map will now be described in more detail below.

Designing a Schema Map

The first step of designing a schema map is to define the source and target schemas. As noted above, a schema map must include at least one source schema (i.e., a primary source) in the source schema region 410, and at least one target schema (i.e., a primary target) in the target schema region 430. However, a schema map is not limited to only one source and target, and may include multiple sources and/or multiple targets in the source and target schema regions 410, 430 of the graphical mapping interface 400. Exemplary embodiments for adding a primary source and a primary target to a schema map will now be described in reference to FIGS. 22-27. Exemplary embodiments for adding secondary sources and secondary targets will be discussed later with respect to FIGS. 35-41.

To create a new schema map, a user must first define the primary source and primary target to be included in the new schema map. When defining a primary source or a primary target, the user may specify where the source/target structure is coming from, the connector (or "spoke") used to connect to the source/target structure, and the connection information needed to connect to the source/target structure. This may be achieved, in some embodiments, with the help of a wizard such as the New Source Wizard 480 and New Target Wizard 490 shown in FIGS. 22-25.

Figure 22:
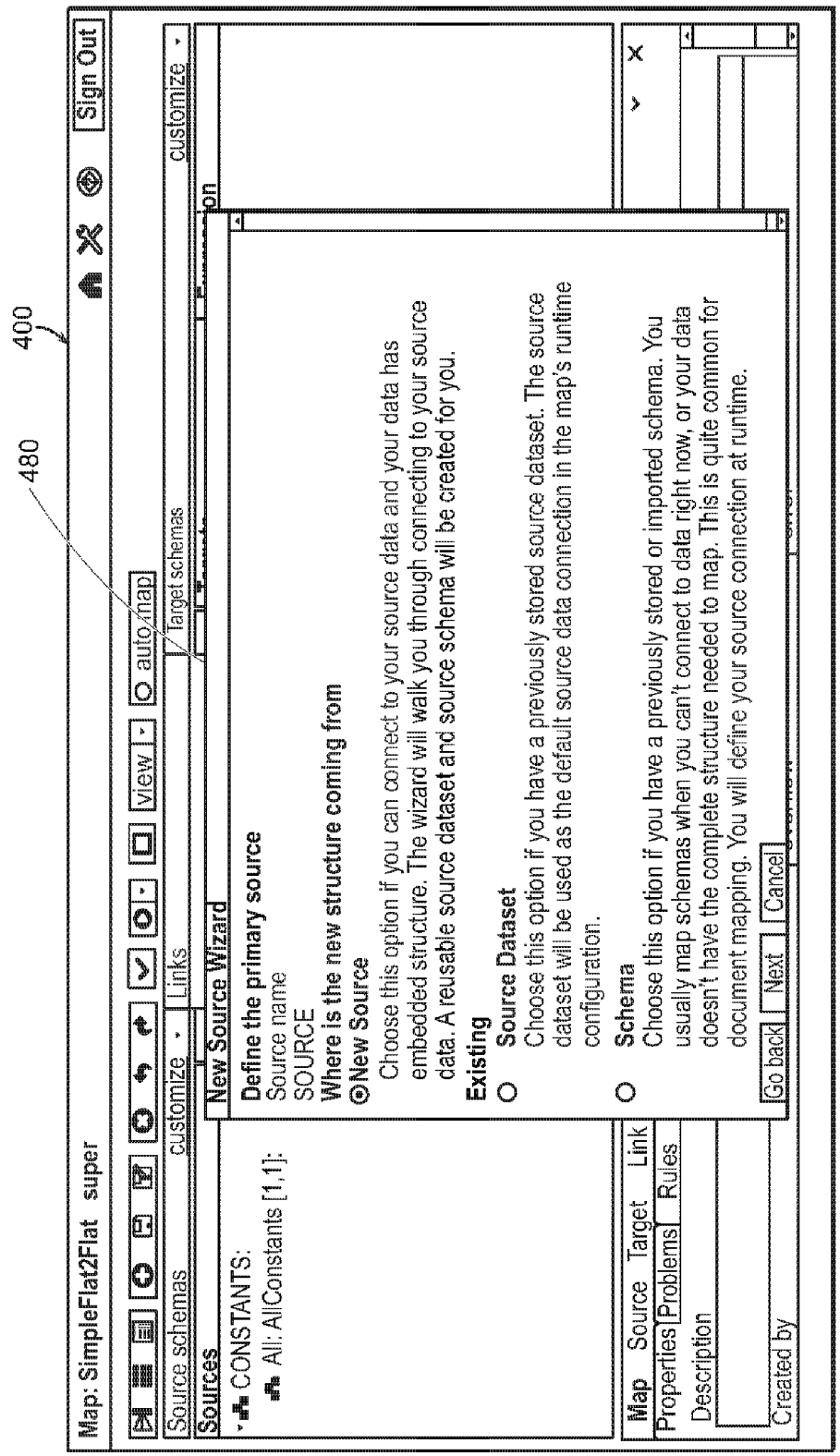
FIGS. 22-24 are screen shots illustrating an exemplary embodiment of a New Source Wizard that may be used to define a primary source for a schema map within the source schema region of the graphical mapping interface.
Figure 23:
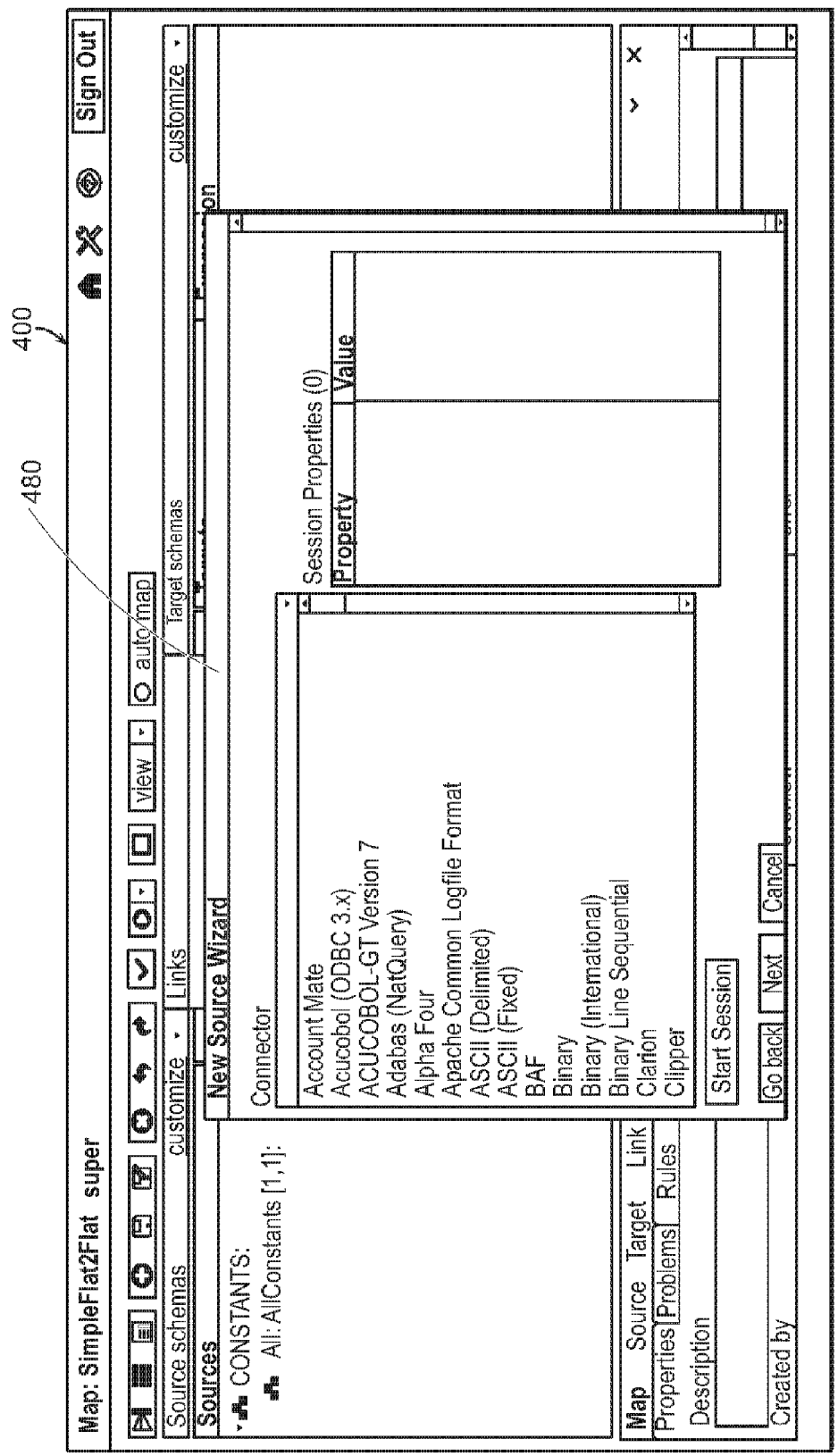
Figure 24:
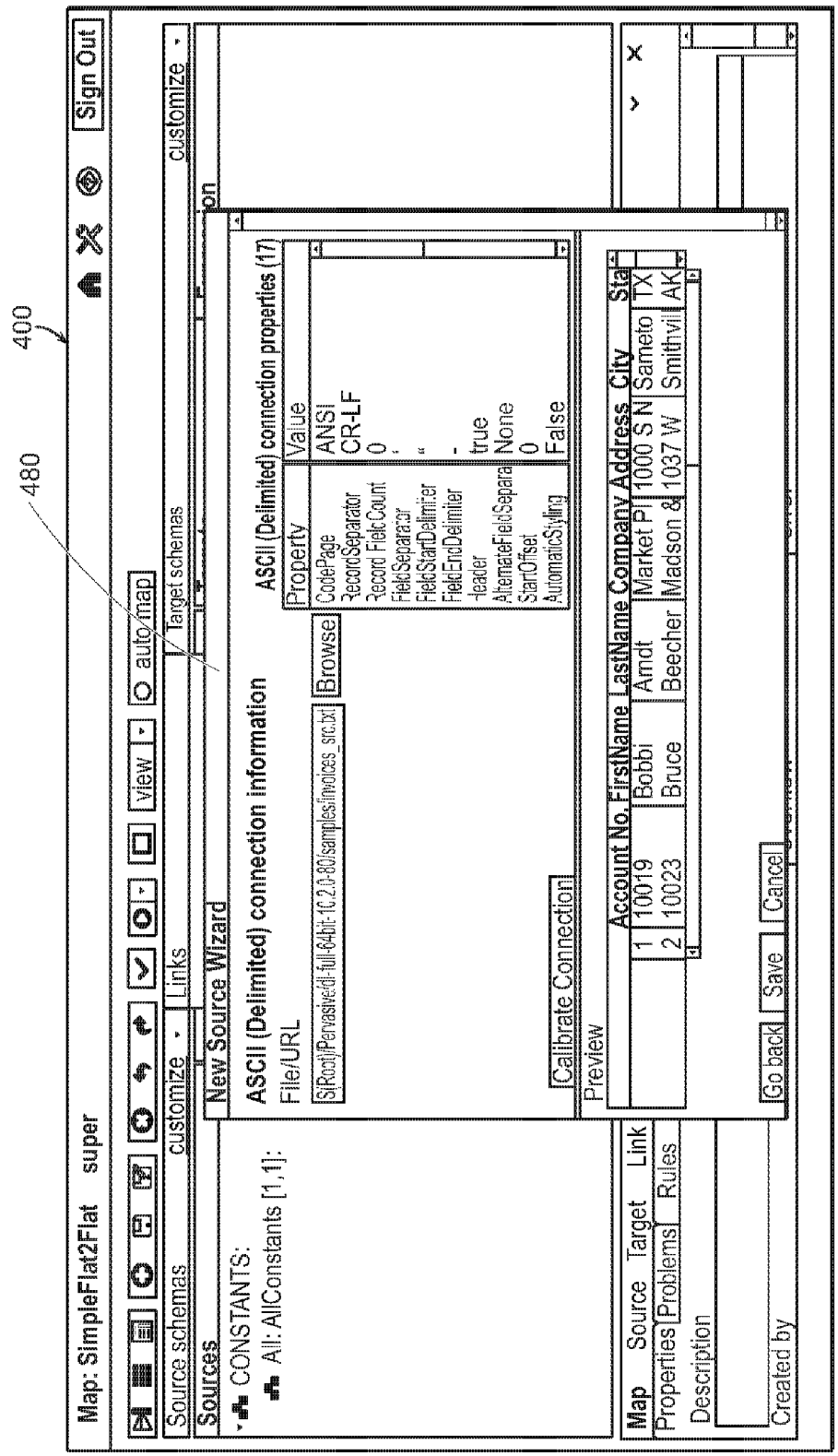

FIGS. 22-24 illustrate an exemplary embodiment of a New Source Wizard 480 that may be used to define a primary source. As shown in FIG. 22, the user may designate where the source structure is coming from by selecting an option from a list comprising creating a new dataset, using an existing dataset or using an existing schema. After selecting an option and naming the primary source (default name "SOURCE"), the user may click on the next button to either complete or continue the source definition process. If an existing dataset or existing schema is selected, for example, clicking on the Next button will add the primary source to the source schema region 410 of the graphical mapping interface 400. If a new dataset is selected, the user may click on the Next button to define the connector (or "spoke") and connector properties (optional) used to connect to the source structure.

In one embodiment, the user may select a particular connector from a drop down list containing a plurality of pre-defined connectors, as shown in FIG. 23. Once the appropriate connector is defined, the user may set one or more connector properties and/or click on the Next button to proceed to the connection information screen shown in FIG. 24. The connection information screen (FIG. 24) enables the user to define all properties needed for establishing a connection to the source data. For file data, the Browse button can be used for browsing to the file or the location can be simply typed into the file field. Different connectors have different properties for accessing data. In some embodiments, the connection information screen may display the connection properties associated with the connector, as well as a preview of the source data and data structure. Once finished, the user may click on the Save button to add the primary source to the source schema region 410 of the graphical mapping interface 400.

Figure 25:
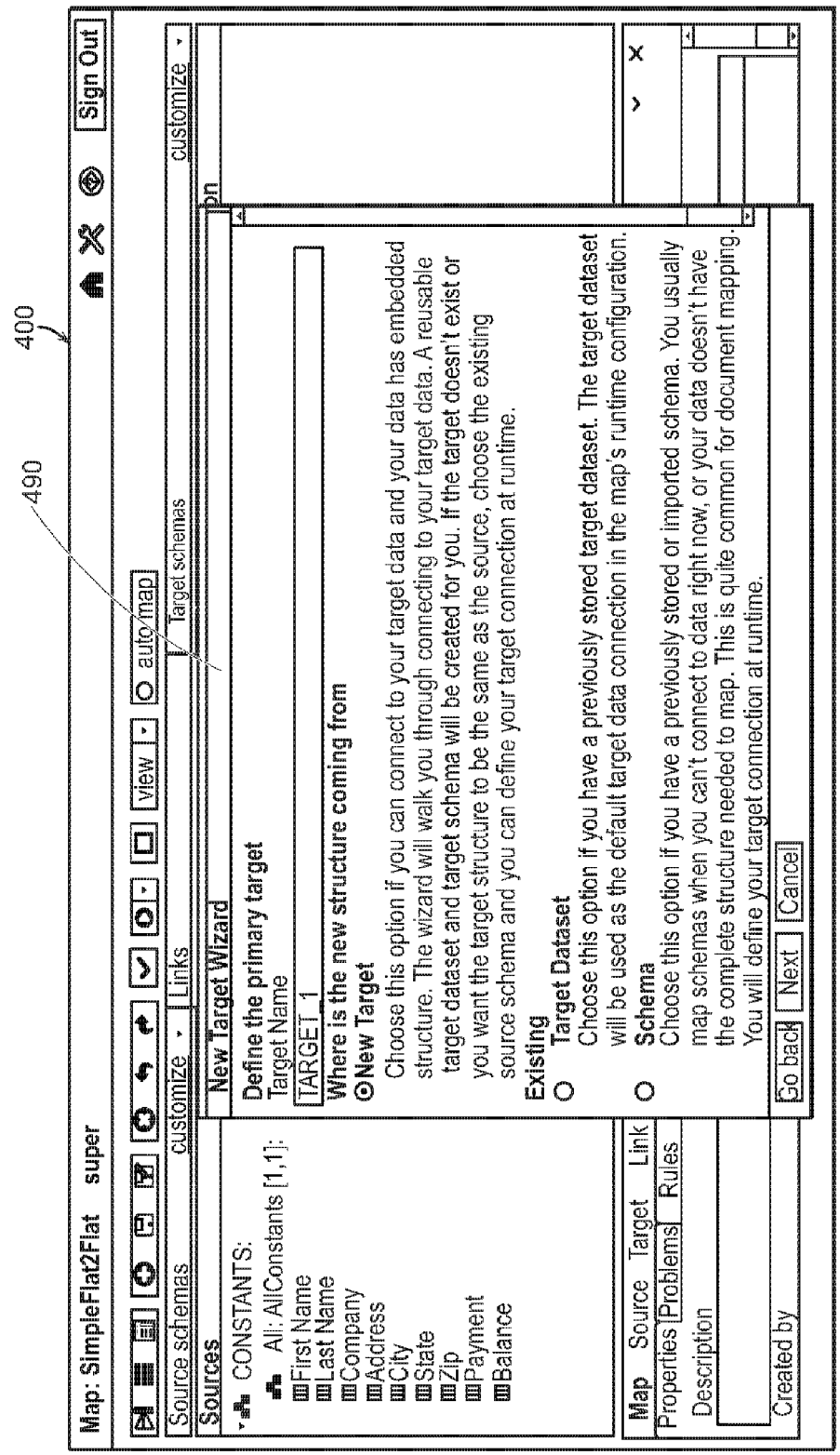
FIG. 25 is a screen shot illustrating an exemplary embodiment of a New Target Wizard that may be used to define a primary target for the schema map within the target schema region of the graphical mapping interface.

A substantially similar process may be used to define the primary target. For example, and as shown in FIG. 25, the user may designate where the target structure is coming from by selecting an option from a list comprising creating a new target dataset, using an existing target dataset or using an existing schema. In some cases, there may be no schema associated with a target, for example, when creating a new target file. In this case, the New Target Wizard 490 may provide the option of using the source schema, defining a new schema or choosing an existing schema for the new target file.

Once an option is selected and the primary target is named (default name "TARGET_1"), the user may click on the Next button to add an existing target to the target schema region 430 of the graphical mapping interface 400, or to define the target connector (or "spoke") and connector properties (optional) used to connect to a new target structure. In general, the steps taken to define the target connector, connector properties and target dataset (if adding a new target) may be substantially identical to the steps shown in FIGS. 23-24 and described above.

Figure 26:
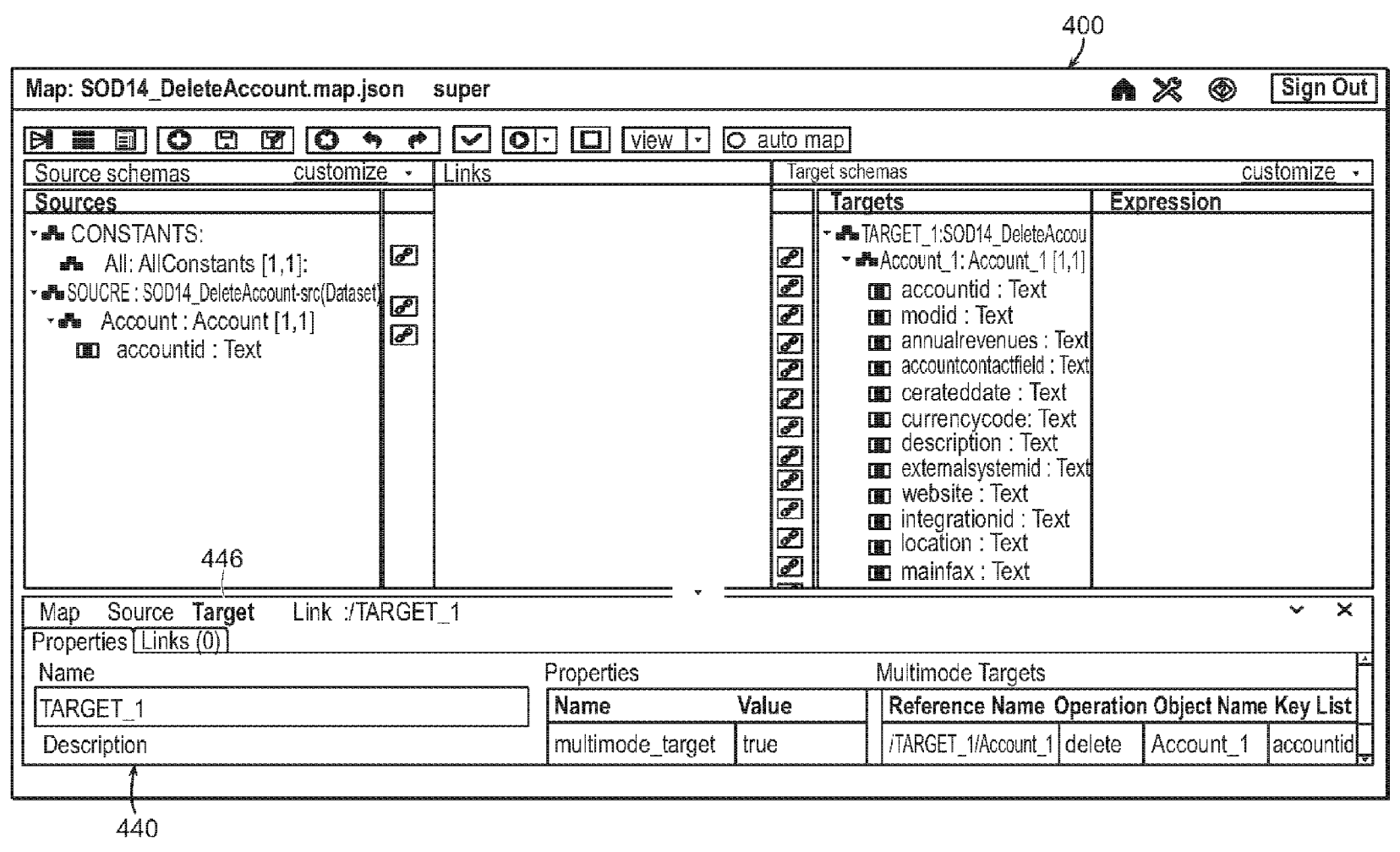

In some cases, however, a user may wish to define the primary target (or a secondary target subsequently added to the target schema region 430) as a multi-mode target. This is achieved, in one embodiment, by selecting a multi-mode target connector in the New Target Wizard 490. When a target is defined as a multi-mode target in the New Target Wizard 490, an additional grid is displayed under the Properties tab of the Target pane 446 of the console panel 440 for setting the multi-mode properties (e.g., output operation, target object and/or keys) for each multi-mode record type in the target schema. FIG. 26 illustrates an exemplary embodiment of a grid that may be used to define a multi-mode target.

As shown in FIG. 26, the multimode_target property value for the TARGET_1 schema is set to 'true' in the Properties tab of the Target pane 446, indicating that the TARGET_1 schema comprises one or more multi-mode targets. For each multi-mode target included within the TARGET_1 schema, the user must define the target reference name of the multi-mode target record (e.g., /TARGET_1/Account_1), the operation to be performed (e.g., delete), and the target object name (e.g., Account_1). If an operation other than the default insert operation is selected, a list of one or more keys (e.g., accountid) must also be defined for matching the records to be deleted, updated or upserted.

Mapping Between Source and Target Schemas

Figure 27:
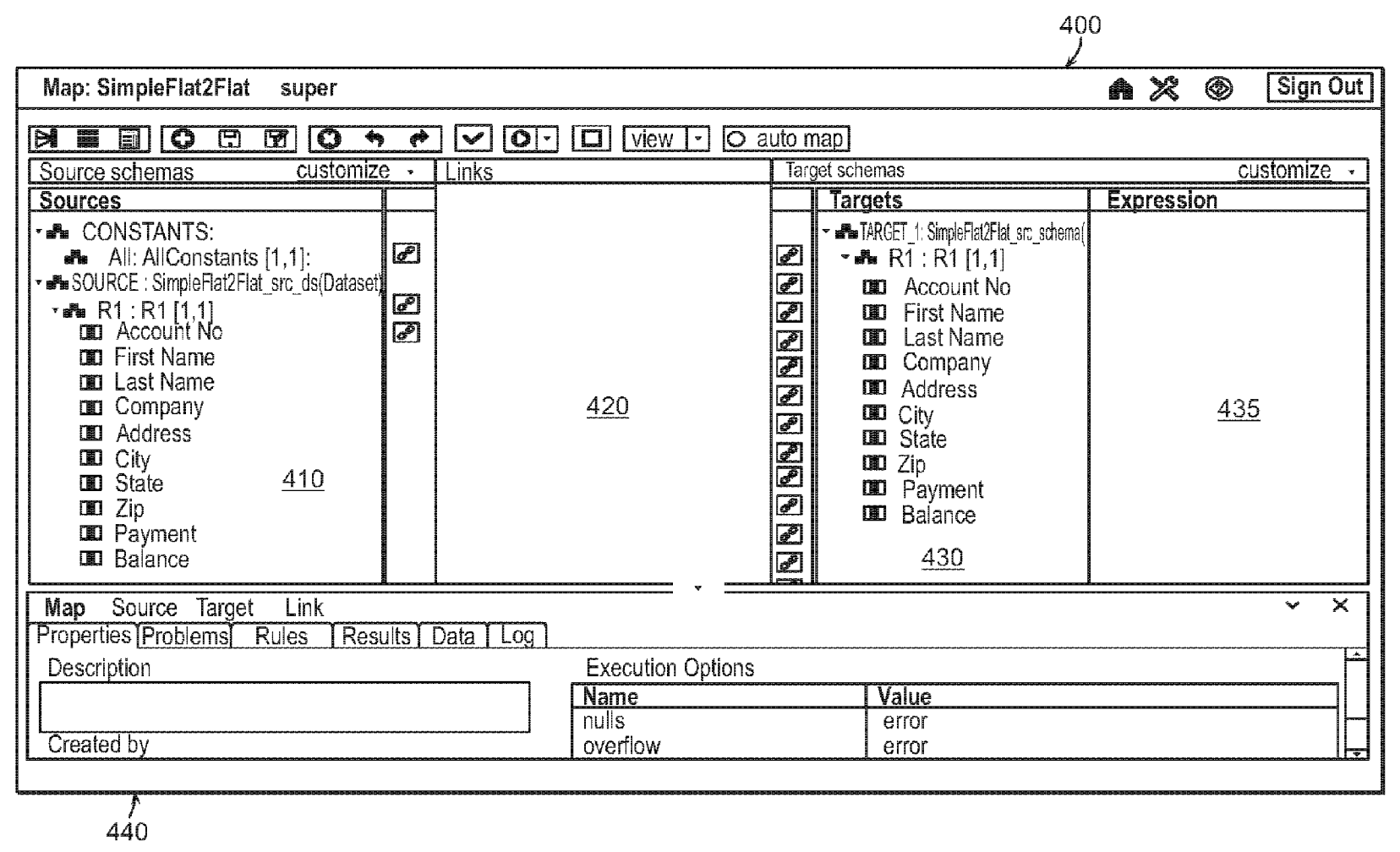

In some embodiments, a user may proceed to the mapping stage once the primary source and the primary target have been defined, as shown for example in FIG. 27. In other embodiments (discussed below), the user may add one or more secondary sources and/or one or more secondary targets to the schema map before proceeding to the mapping stage. Regardless of the number of sources/targets included within a schema map, mapping is achieved by graphically linking the source and target schema nodes. As noted above, the source and target schemas can be flat, multi-record or hierarchical data structures. The graphical mapping interface 400 described herein supports several methods for mapping or linking between the source and target schema nodes. These include auto-mapping and manual mapping. Each of these methods will be described in more detail below.

Auto-Mapping

Figure 28:
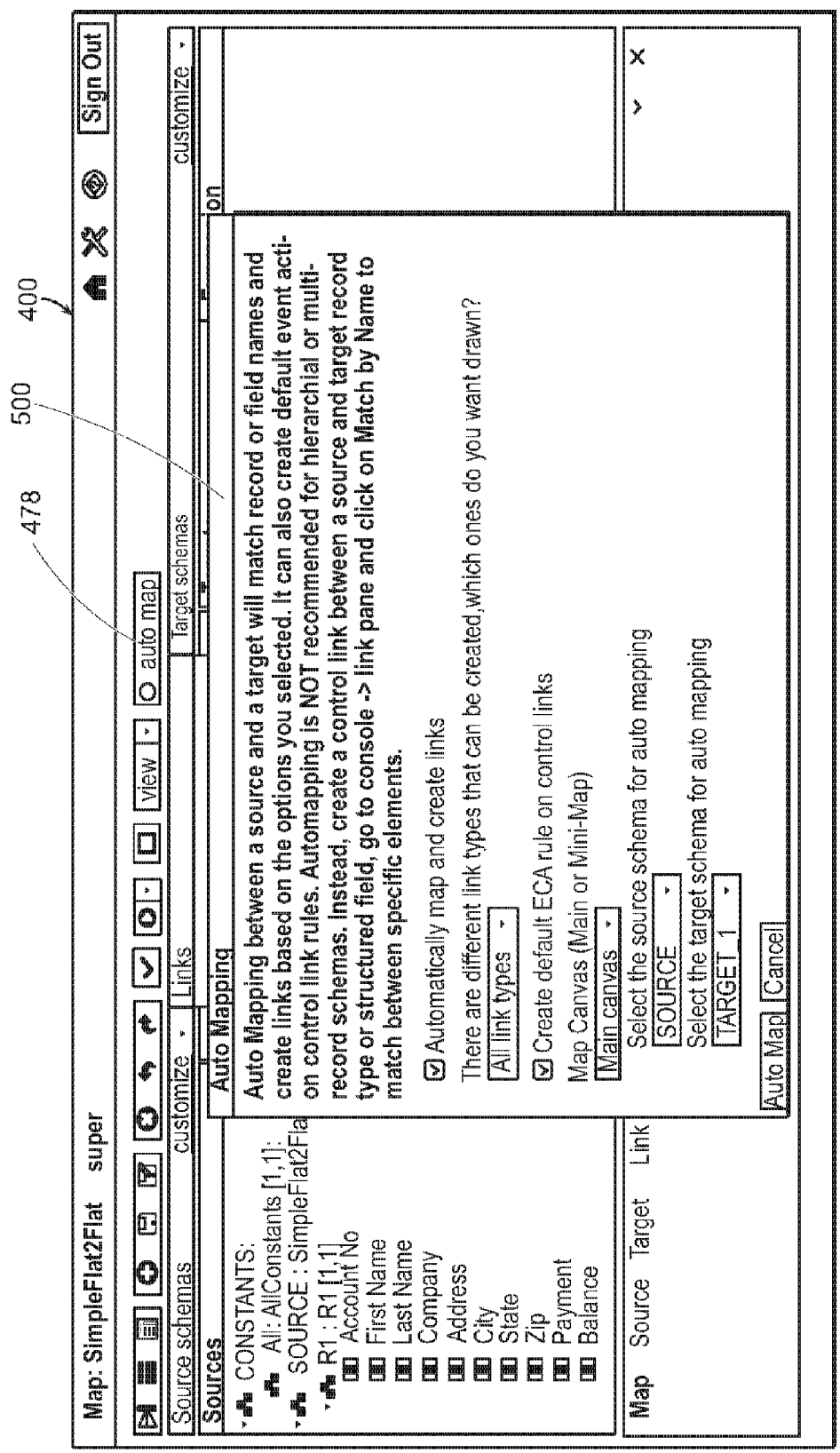
FIG. 28 is a screen shot illustrating an exemplary embodiment of an Auto-mapping Wizard that may be used, in some cases, to automatically map source and target schema elements.

In some embodiments, an Auto-mapping Wizard 500 may be displayed (FIG. 28) once the source and target schemas are defined, for example, as shown in FIG. 27. In other embodiments, the Auto-mapping Wizard 500 may be initialized by clicking on the Auto Map button 478 included within the button toolbar 450 of the graphical mapping interface 400. As shown in FIG. 28, the Auto-mapping Wizard provides the option of selecting the map canvas (e.g., main map or mini-map) and the source and target schemas to be mapped. The Auto-mapping Wizard also provides the option of selecting the type of links to be created (e.g., data links, control links or all link types), and optionally, for setting default ECA rules on any control links created within the map. Once these options are selected, the user may click on the Auto Map button of the Auto-mapping Wizard 500 to start the auto-mapping process. Alternatively, the user may click on the Cancel button to exit the Auto-mapping Wizard to proceed with manual mapping.

When employed, the auto-mapping feature will attempt to automatically match source/target record and field names and create links based on the options selected in the Auto-mapping Wizard (FIG. 28). If the auto-mapping feature is unable to map any records or fields, they can be manually linked after the auto-mapping process is complete. Most types of schemas can be at least partially mapped automatically. For example, source and target schemas that are similar in content and structure are ideal for auto-mapping. However, auto-mapping is not recommended for multi-record or hierarchical schemas. Instead, it is recommended that the user exit the Auto-mapping Wizard 500 to manually map these types of schemas.

Manual Mapping

After the source and target schemas have been defined using the auto-mapping feature, the user may exit the Auto-mapping Wizard (FIG. 28) to manually map record types and fields and add ECA rules, if desired. Manual mapping is generally preferred when the relationship between source and target data is not one-to-one, or the user wishes to have more control over how data is output to a target. In most cases, schemas that define more than one record type (i.e., multi-record schemas) and schemas that are structured hierarchically (i.e., hierarchical schemas) are not suitable for auto-mapping and should be mapped manually.

Figure 29:
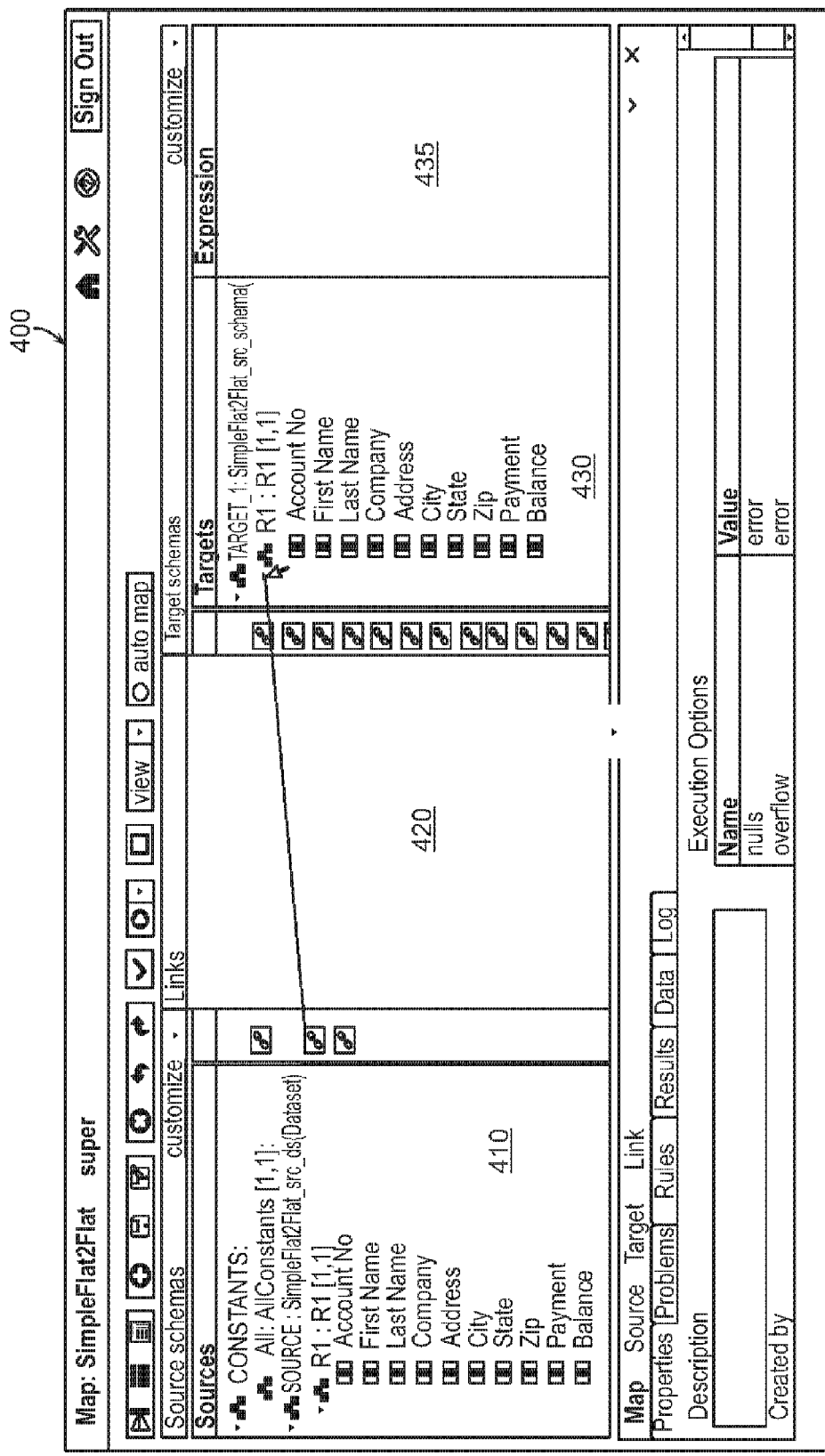
FIG. 29 is a screen shot illustrating an exemplary embodiment of a user creating a control link within the mapping region of the graphical mapping interface by manually mapping a source record to a target record.

In general, source schema nodes may be manually mapped or linked to target schema nodes in one of two ways. In one embodiment, a map link (i.e., a data link or a control link) may be created by dragging a source "map state" icon onto a target "map state" icon, or by dragging the source "map state" icon directly onto the target record or field in the target schema region 430, as shown in FIG. 29. Map state icons are displayed as chain link nodes in the embodiment of FIG. 29. A grayed-out icon indicates that the node is currently unlinked, while linked nodes are represented by fully rendered map state icons. In another embodiment, a map link may be created by clicking on a source "map state" icon and subsequently clicking on a target "map state" icon. Although either method may be used, the latter method may be preferred when connecting a single source node to multiple target nodes, as this method allows the user to click on a source "map state" icon and subsequently click on a number of different target "map state" icons.

In either method, a link indicator may be displayed to indicate whether or not a particular link can be created. Some links are not allowed. For example, a source field node cannot be mapped to a target record node. Likewise, schema root nodes cannot be directly linked. However, if a schema root node contains a lookup table or temporary target, the schema root node may contain a mapped "map state" icon to indicate that links exist within a mini-map (discussed below) associated with the lookup or temporary target. Similarly, if a source record contains children that have been mapped, but the source record (i.e., the parent node) is collapsed, a "children mapped" icon may be displayed to indicate the map state of the children nodes.

As noted above, there are generally two types of links: data links and control links. After one or more links have been created in the schema map, the user has the option of setting ECA rules for control links and/or creating expressions for data links and unlinked target nodes. ECA rules and expressions are described in detail above in Section III. Exemplary methods for setting ECA rules and creating expressions via the graphical mapping interface 400 are described below in reference to FIGS. 30-34.

Setting ECA Rules

Control links are created by linking a source record to a target record, and have one or more Event-Condition-Action (ECA) rules associated with them to control the transformation behavior for a given record type. As noted above, the basic ECA rule has the general form of: on event if condition do action(s). The event is used to determine when the rule is triggered. The condition provides an optional mechanism for filtering the actions. The actions tell the transformation engine what to do with the records that match the specified condition. In most cases, the target record will be the subject of the action(s) specified in an ECA rule. In one embodiment, a solid line adorned with a circular arrow may be used to denote a control link.

Figure 30:
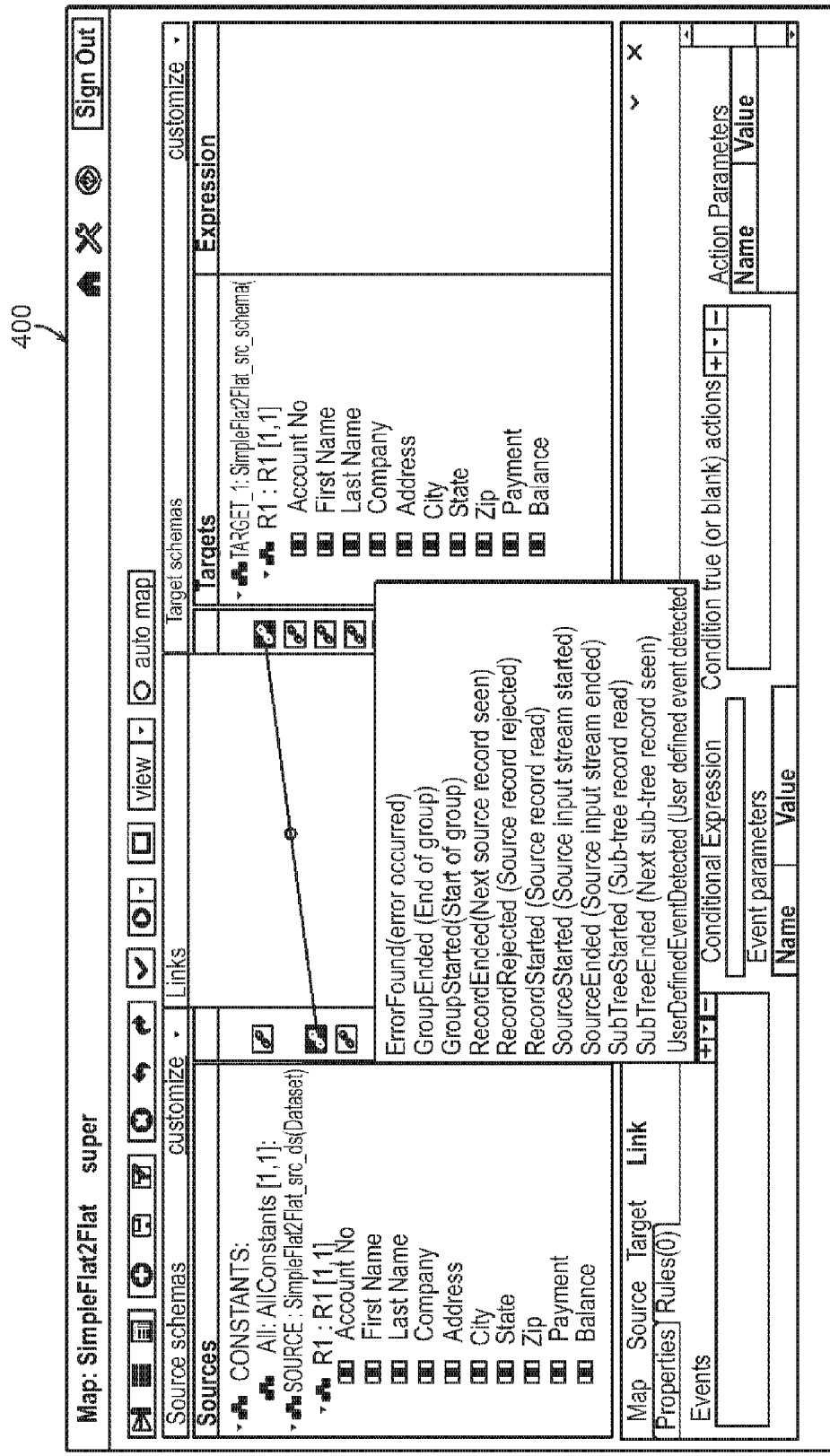
FIGS. 30-31 are screen shots illustrating an exemplary embodiment of how a user may specify ECA rule(s) for a control link via a console panel of the graphical mapping interface.

In the example embodiment of FIG. 30, the source record Ra is mapped to the target record R1 with a control link. Once a control link has been created, one or more ECA rules may be set to control the transformation behavior of the source and target records. This may be achieved, in one embodiment, by clicking on the Rules tab in the Link pane of console 440.

Figure 31:
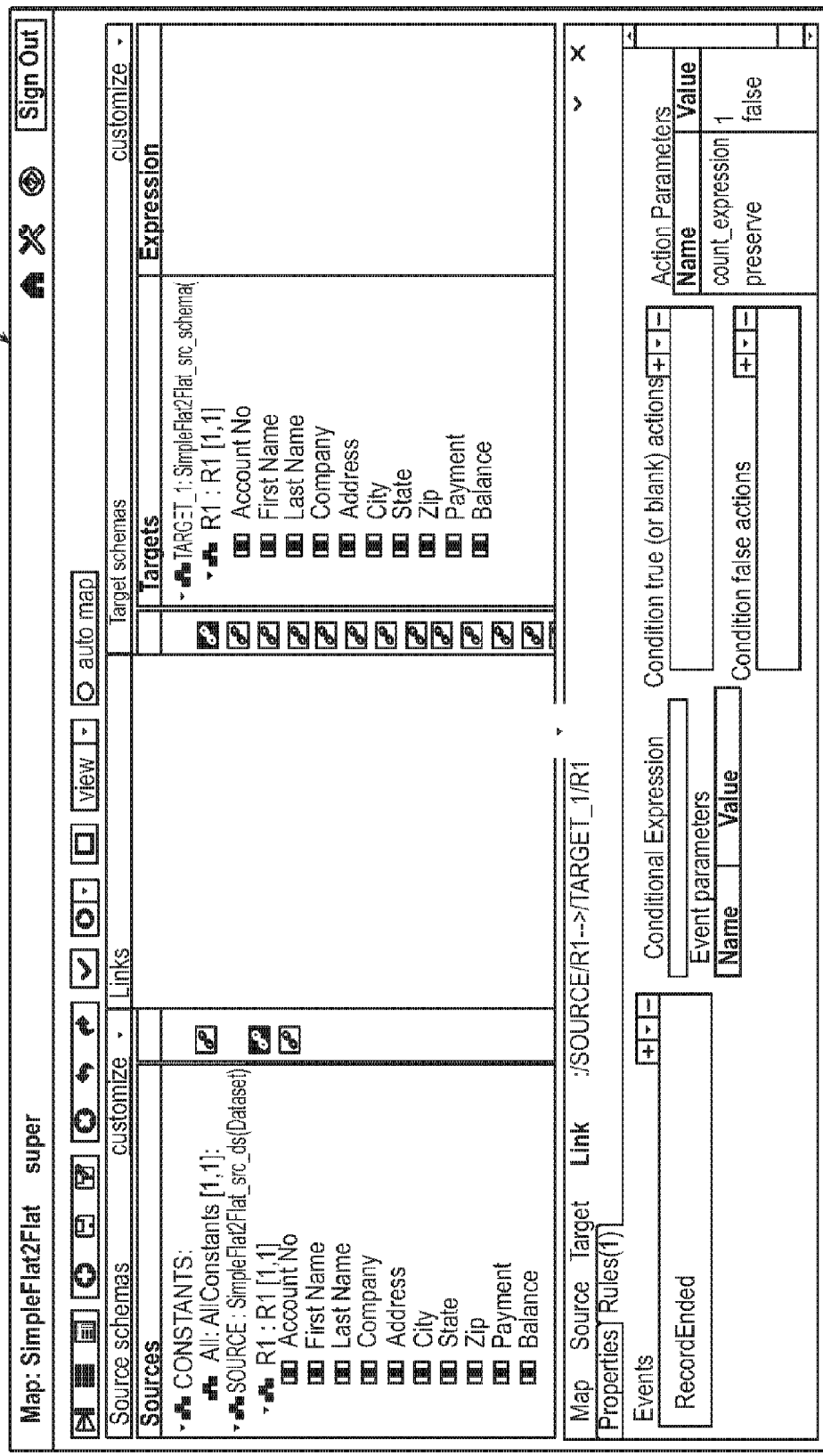

As shown in FIGS. 30-31, the Rules tab in the Link pane of console 440 may include one or more user input boxes, which enable the user to set one or more ECA rules for a given control link. In the illustrated embodiment, a separate user input box is provided for defining events, event parameters, optional conditional expressions, actions to be performed for an event if an optional condition is met (i.e., condition true actions), actions to be performed for an event if an optional condition is not met (i.e., condition false actions), and/or action parameters. However, the graphical mapping interface 400 described herein is not limited to the illustrated embodiment and may comprise alternative means (i.e., means other than user input boxes) for setting ECA rules in other embodiments of the invention.

As shown in FIG. 30, the Rules tab includes an Events box for specifying one or more events for a given control link. Events may be added to the Events box by clicking on the "+" drop down menu, which provides a list of all events available for a selected control link. For example, and as shown in the exemplary embodiment of FIG. 30, the RecordEnded event may be selected to trigger the ECA rule every time there is a new instance of the source record R1 in the input stream. In some cases (not shown), the user may add additional event(s) to the Events box for triggering additional ECA rule(s) associated with the control link.

For each event included within the Events box, the user may define event parameters, optional conditional expressions, actions to be performed for the event if the optional condition is met (i.e., condition true actions) or not met (i.e., condition false actions), and/or action parameters in the user input boxes. For example, and as shown in the exemplary embodiment of FIG. 30, a user may add the OutputRecord action to the condition true (or blank) Actions box to evaluate the target field expressions for the target record and write it to the target of the control link count_expr times (default=1). Like events, actions may be added to the Actions boxes by clicking on the "+" drop down menu, and removed by clicking on the "−" button when an action is selected. In some cases (not shown), the user may add additional actions(s) to the Actions boxes for performing other actions associated with the control link.

According to one embodiment, the graphical mapping interface 400 improves upon conventional mapping tools by providing explicit support for conditions in ECA rules, which increases ECA rule flexibility while eliminating the need for excess code generation on the part of the user. Furthermore, the ECA rules supported by the graphical mapping interface 400 described herein can be used to control transformations between multiple sources/targets, to generate mini-maps, and to provide events and actions specifically pertaining to hierarchical mapping. This is due, at least in part, to the improved schema mapping language, which provides an improved source/target addressing scheme (which uses full path names and FieldAt and RecordAt expressions to describe source and target positions within the schema), and new events (e.g., SubTreeStarted and SubTreeEnded) for handling hierarchical schemas.

Creating Expressions

Data links are created by linking a source field to a target field, a source structured field to a target field, or a source record to a target field. A source element may be linked to one or more target elements. Similarly, a target element may have data links from one or more source elements. In some cases, a schema map may contain one or more target fields without links (i.e., unlinked target fields). These fields either have no data mapping operation associated therewith, or they have an operation, such as constant value or independent expression with no source field dependencies. In one embodiment, a solid line is used to denote data links.

The data link(s) connected to a target element define the list of input(s) for the target field expression. Single data links between a source field and a target field indicate a move operation, in which case there is generally no need for the target field to have an expression, unless filtering or truncation is desired. Expressions are written using a scripting language and may be created between linked source and target elements, and in some cases, for unlinked target fields. In some embodiments, the target field expression may be typed directly into the expression region 435. In other embodiments, an expression builder interface (otherwise referred to herein as a Script Editor) may be used to assist the user in generating the target field expressions.

Figure 32:
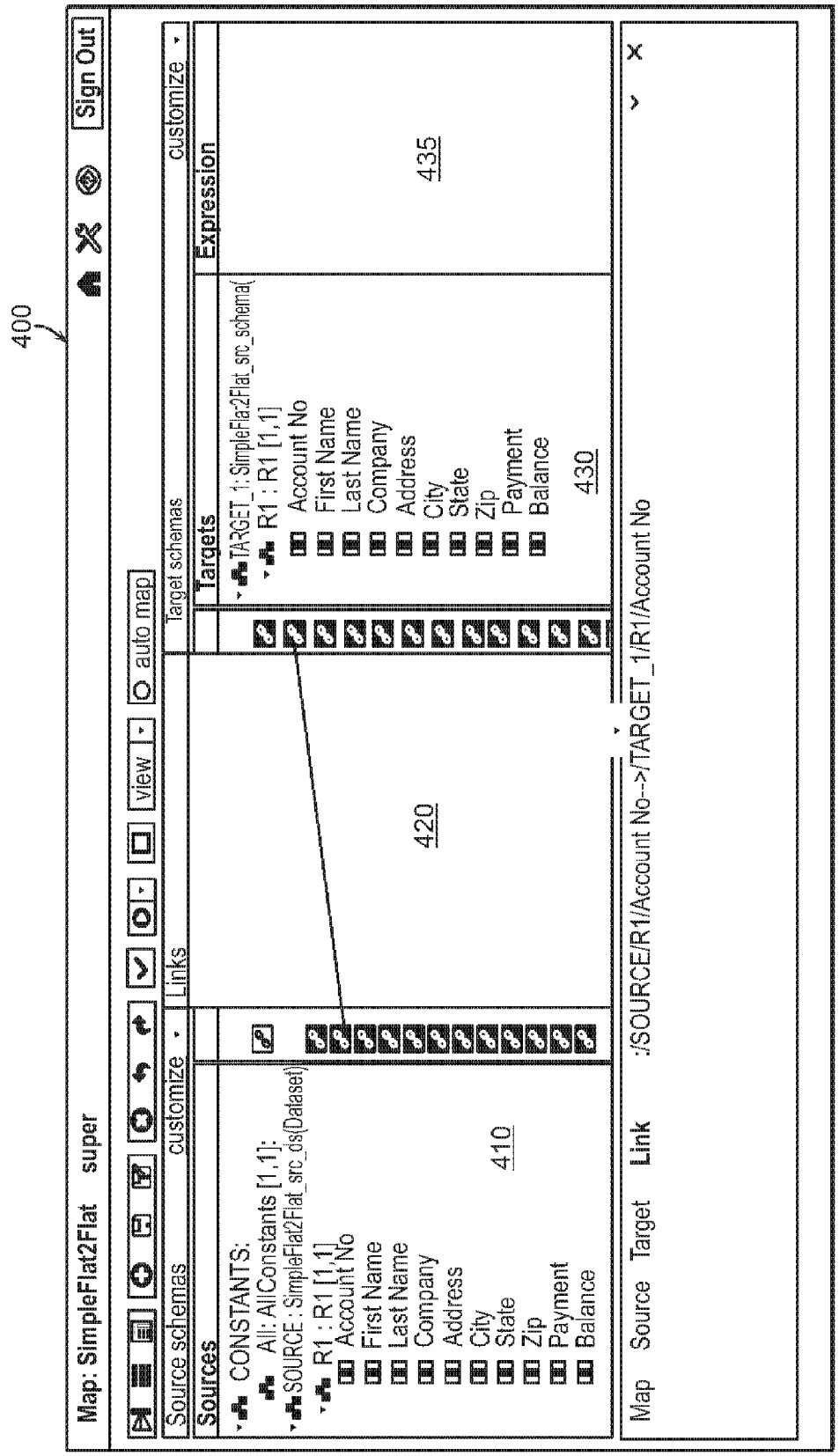
FIG. 32 is a screen shot illustrating an exemplary embodiment of the graphical mapping interface after control and data links have been defined for the schema map.
Figure 33:
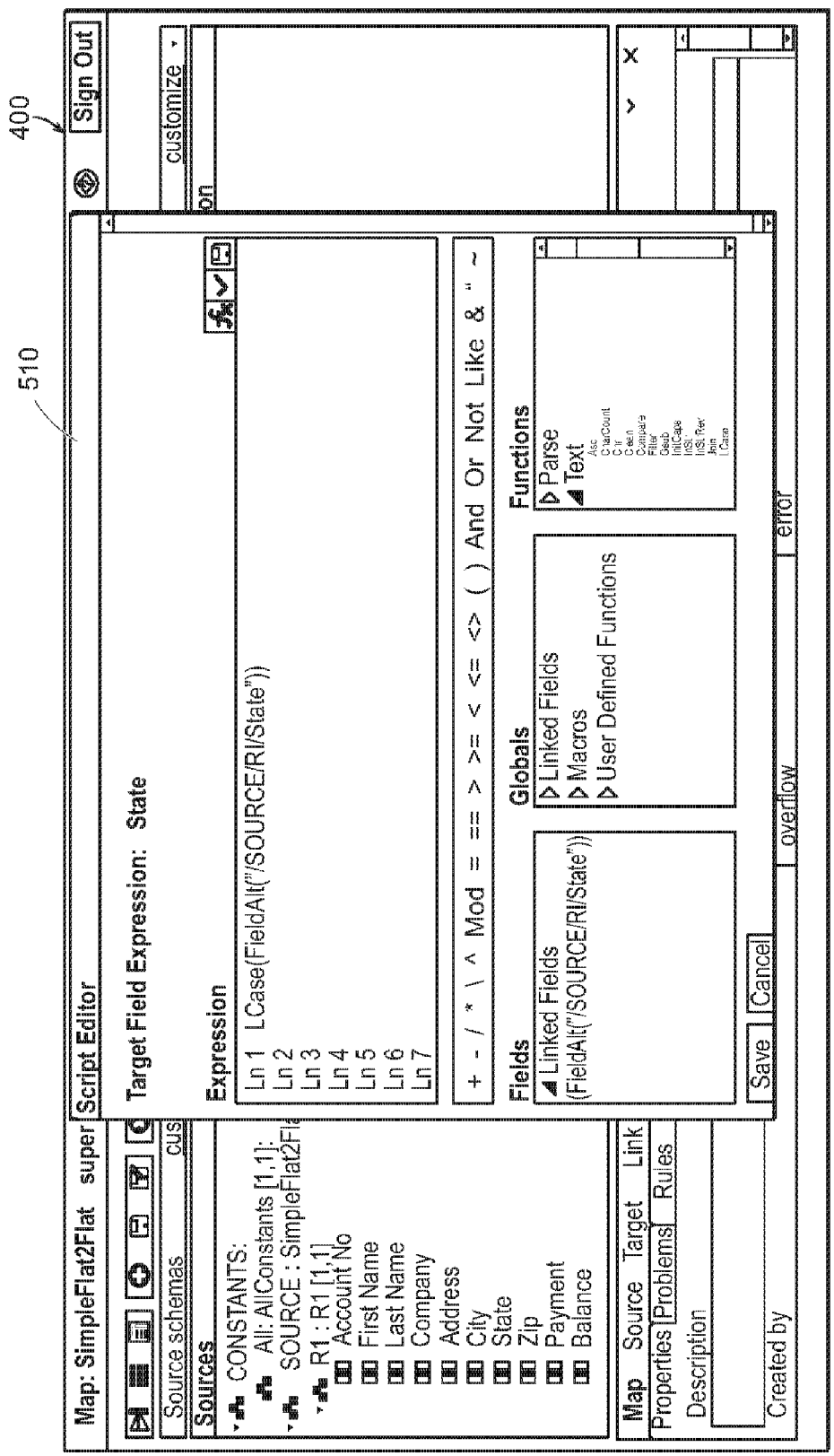
FIG. 33 is a screen shot illustrating an exemplary embodiment of a Script Editor that may be used to assist the user in generating/editing target field expressions for the schema map.
Figure 34:
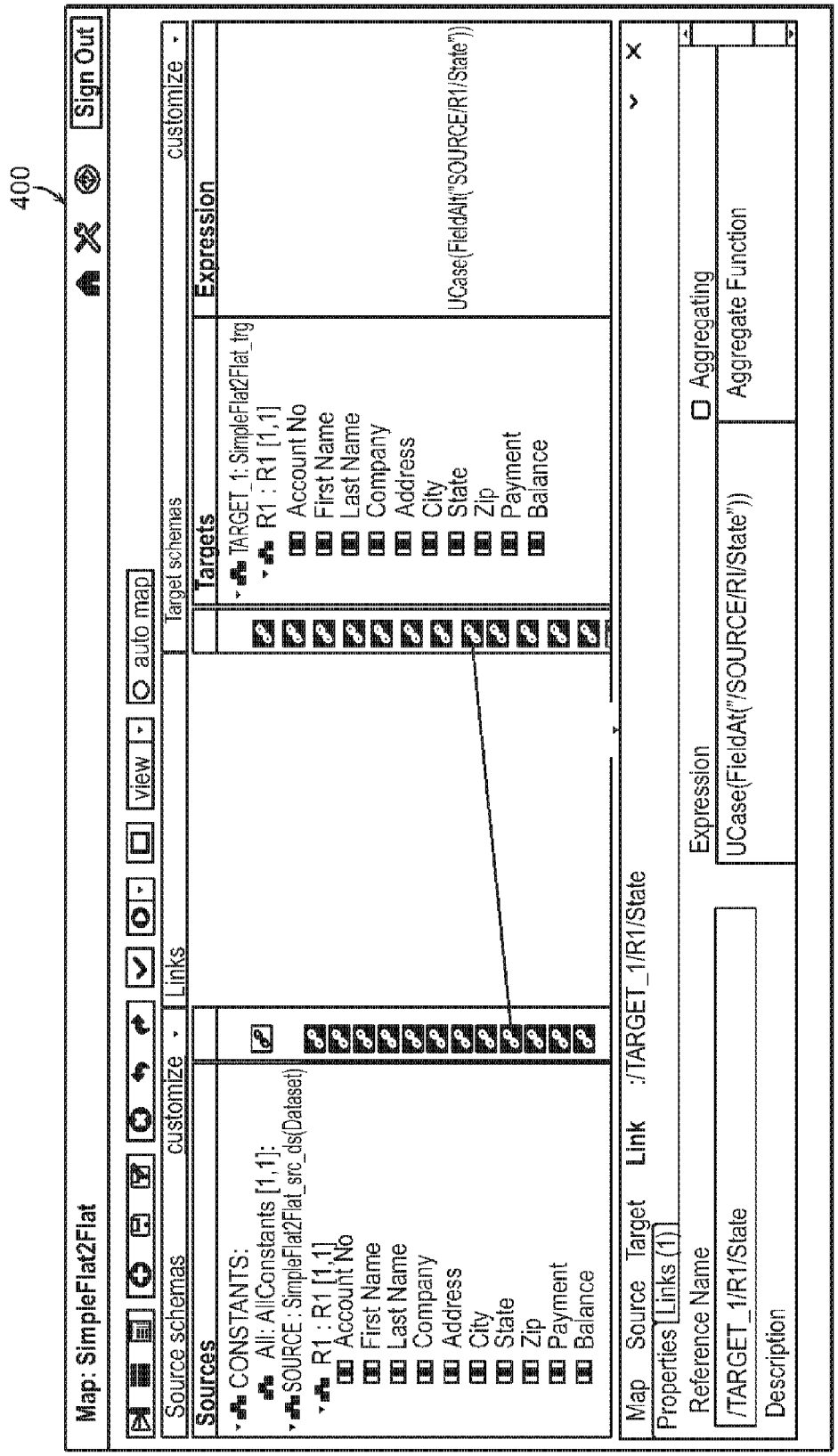
FIG. 34 is a screen shot illustrating an exemplary embodiment of the schema map after target field expressions have been inserted into the expression region of the graphical mapping interface.

FIGS. 32-34 illustrate exemplary embodiments for adding and/or editing target field expressions. In the example embodiment of FIG. 32, data links have been created between each source field in the Source record R1 to a corresponding target field in the Target record R1, so as to move or copy the source field values to their corresponding target fields. In some embodiments, a user may wish to add one or more target field expressions to one or more of the target fields using the linked source field values as input. This may be achieved, in some embodiments, by typing the desired expressions directly into the expression region 435 or by clicking a button (not shown) in a particular expression cell to access the Script Editor. In some embodiments, the button may only appear when mousing over the particular expression cell.

Regardless of the manner in which the target field expression is generated, the target field expression is written using a scripting language and a source reference name for each source node linked to the target node receiving the target field expression. Unlike conventional graphical mapping tools, a textual representation of the target field expression is displayed in the expression region 435. This reduces clutter in the mapping region 420 and enables an absolute position of each of the linked source nodes to be precisely defined.

FIG. 33 illustrates an exemplary embodiment of an expression builder interface (or Script Editor) 510 that may be used to assist the user in generating target field expressions. As shown in FIG. 33, the Script Editor 510 comprises an Expression box for creating one or more expressions for a given target field. If more than one expression is created for the target field, the group of expressions may be referred to as a "script." Although the exemplary embodiment shows only 12 lines within the Expression box, the number of expressions that may be added to the box and included within the script is substantially unlimited.

When a source field is linked to a target field, the source field value is added to the Fields box as a Linked Field. In some embodiments, a user may double click on the source field value in the Fields box to insert the source field value into an expression created within the Expression box. In some embodiments, the user may insert additional source field values into the same expression or a different expression within the script. In addition to linked source field values, the Script Editor 510 provides the option of inserting any number of operators, functions, variables and/or macros into the target field expression or script.

In some embodiments, the user may insert one or more numeric operators (e.g., "+," "−," "/" "*" "\," and "Mod"), comparison operators (e.g., "=," "==," ">," ">=," "<," "<=" "< >" "(," ")," "~," and "!~") and/or logical operators (e.g., "And," "Or," Not," and "Like") into the target field expressions. This may be achieved by typing the desired operator directly into the target field expression or by clicking on one of the numeric, comparison or logical operator buttons shown in FIG. 33.

In some embodiments, a pre-defined function may be inserted into a target field expression, for example, by double clicking on one of a plurality of pre-defined functions listed in the Functions box shown in FIG. 33. In one embodiment, the plurality of pre-defined functions are organized into groups comprising, e.g., Conversion functions, Date and Time functions, File and Directory functions, Flow Control functions, Math functions, Miscellaneous functions, Parsing functions and Text functions. Other types of pre-defined functions may also be included in the Functions box. Functions within a particular group may be accessed by clicking on the group name to expand the group functions, as shown in FIG. 33.

In addition to source field values, operators and pre-defined functions, Script Editor 510 provides the option of inserting one or more variables, macros and/or user-defined functions from the Globals box into the target field expression. This may be achieved, in some embodiments, by double clicking on the desired element in the Globals box. Variables, macros and/or user-defined functions are typically defined by the user beforehand, e.g., by clicking on view menu button 476 to access the pop-up dialog box.

FIG. 34 illustrates an exemplary embodiment of the schema map after a target field expression (e.g., LCase (FieldAt("/SOURCE/R1/State"))) has been inserted into the expression region 435. Although only one expression is shown in FIG. 34, it is possible to create target field expressions and/or scripts for one or more linked and unlinked target fields using the Script Editor.

According to one embodiment, the graphical mapping interface 400 improves upon conventional mapping tools by utilizing expressions—instead of functoids—to describe the data transformation between source and target elements. The use of expressions provides greater flexibility in controlling the data transformation and substantially eliminates the mapping congestion, which is often encountered in conventional graphical mapping tools. The expressions utilized within graphical mapping interface 400 can be used in a variety of complex mapping scenarios, such as those comprising multiple sources/targets, mini-maps and/or hierarchical mapping. This is due, at least in part, to the improved source/target addressing scheme provided by the improved schema mapping language described herein (which uses full path names and FieldAt and RecordAt functions to describe source and target positions within the schema).

In addition to the advantages provided above, the graphical mapping interface 400 enables the user to utilize complex functions within a schema map without requiring the user to write lengthy expressions, such as would be needed to perform aggregation or add/edit temporary targets, lookups, mini-maps and ECA rules, to name a few. As shown in FIG. 34, for example, aggregation functions may be included within a target field expression simply by clicking an Aggregating checkbox found under the Properties tab of the Link pane (448) and setting the desired aggregation function (see, Table 11 above).

Adding Secondary Source(s) to a Schema Map

In some embodiments, a schema map may include multiple sources in the source schema region 410 of the graphical mapping interface 400. In addition to the primary source mentioned above, e.g., a schema map may include one or more secondary sources, wherein such sources may include one or more constant variables or intermediate targets, such as a row set, dynamic lookup table or static lookup table. Once a secondary source is added to the source schema region 410, it may be used for mapping in the Map Canvas. For example, constant variables may be mapped to unlinked target fields (i.e., target fields having no source dependencies) to set a value of the target field equal to the constant value. In addition, constant variables and intermediate target fields may be mapped to linked target fields for use within target field expressions. Exemplary embodiments for adding one or more secondary sources will now be described with respect to FIGS. 35-37.

Figure 35:
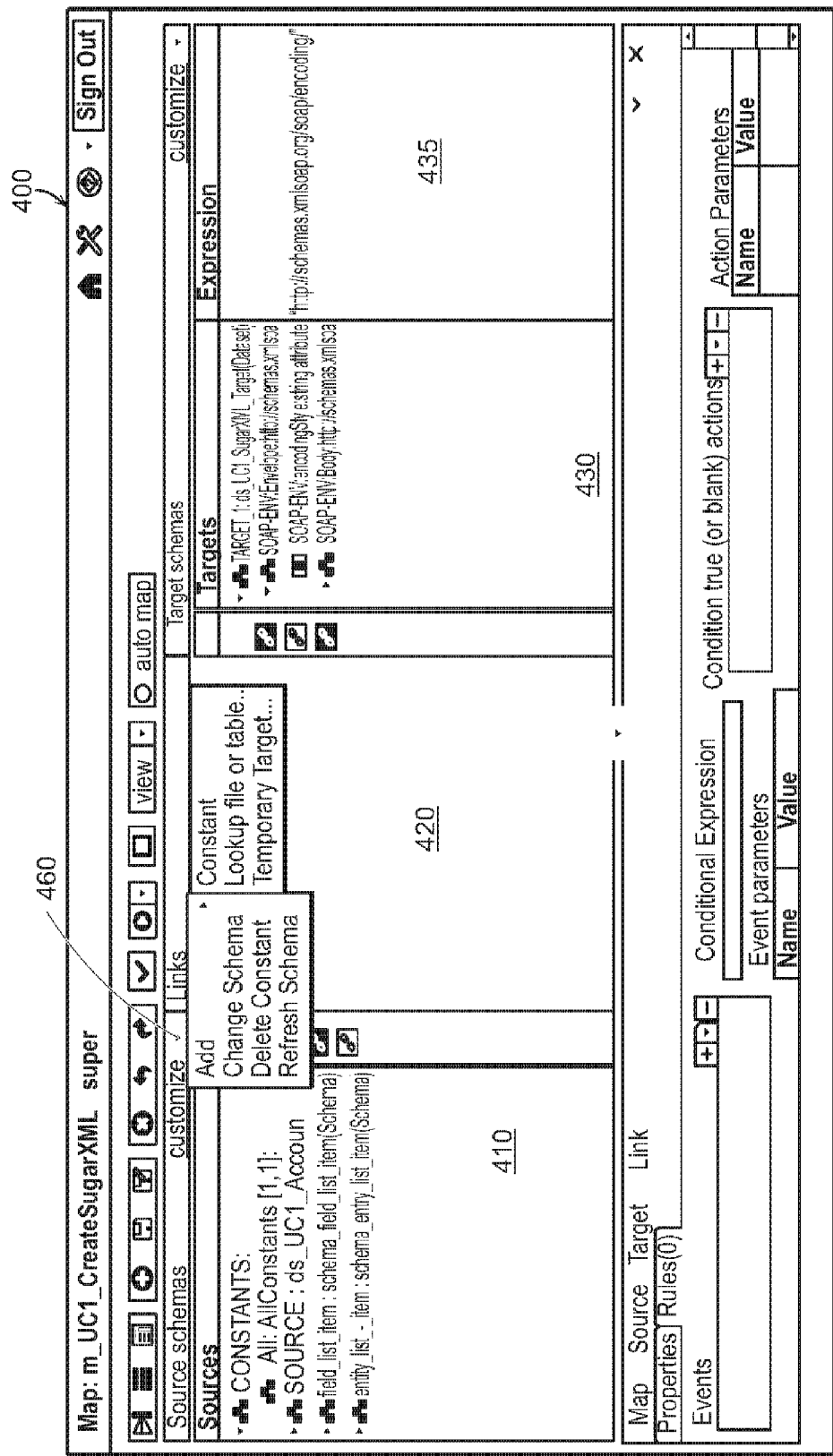
FIG. 35 is a screen shot illustrating an exemplary embodiment of how a user may add a secondary source (e.g., a constant variable or intermediate target) to the source schema region of the graphical mapping interface.

As shown in FIG. 35, secondary sources may be added to the source schema region 410 by clicking on drop down menu 460 and selecting "Add" followed by a "Constant," "Lookup file or table," or "Temporary target." If the "Add Constant" option is selected, a constant node is added to the CONSTANTS container in the source schema region 410. The name, type and value of the constant may be set in console panel 440, e.g., under the Properties tab of the Source pane 444. In some embodiments, selecting the "Add Lookup file or table" or "Add Temporary Target" option may prompt the graphical mapping interface 400 to launch one or more wizards for aiding the user in defining the lookup file/table or temporary target. While exemplary embodiments of such wizards are described herein, it is noted that the use and/or configuration of such wizards may differ in alternative embodiments of the invention.

In one embodiment, the graphical mapping interface 400 may launch a New Lookup Wizard for defining a lookup file or table if the "Add Lookup file or table" option is selected from drop down menu 460. In one embodiment, the New Lookup Wizard (not shown) may be substantially identical to the New Source Wizard 480 shown in FIGS. 22-24 and described in detail above. Further description of the New Lookup/Source Wizard will be omitted herein for the sake of brevity.

In one embodiment, the graphical mapping interface 400 may launch a New Temporary Target Wizard for defining a temporary target if the "Add Temporary Target" option is selected from drop down menu 460. In some embodiments, the New Temporary Target Wizard may be substantially identical to the wizard used to add a primary source or lookup file/table to the source schema region 410. In other embodiments, however, the New Temporary Target Wizard may be substantially different. One embodiment of a New Temporary Target Wizard 520, which differs from the wizards used to add a primary source or lookup file/table, is shown in FIGS. 36-37 and described in more detail below.

Figure 36:
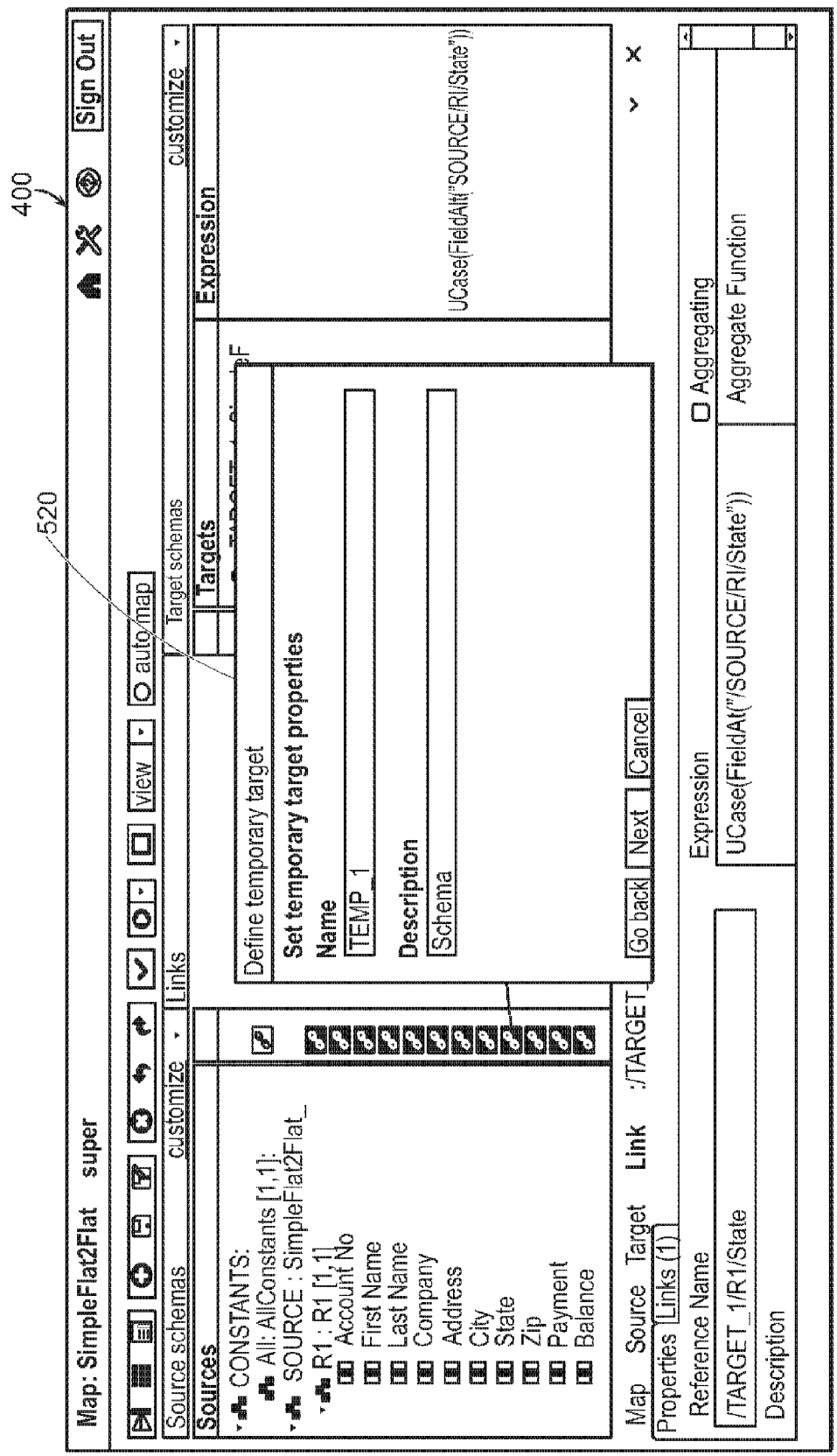
FIGS. 36-37 are screen shots illustrating an exemplary embodiment of a wizard that may be used to define a temporary target to be added to the source schema region of the graphical mapping interface.
Figure 37:
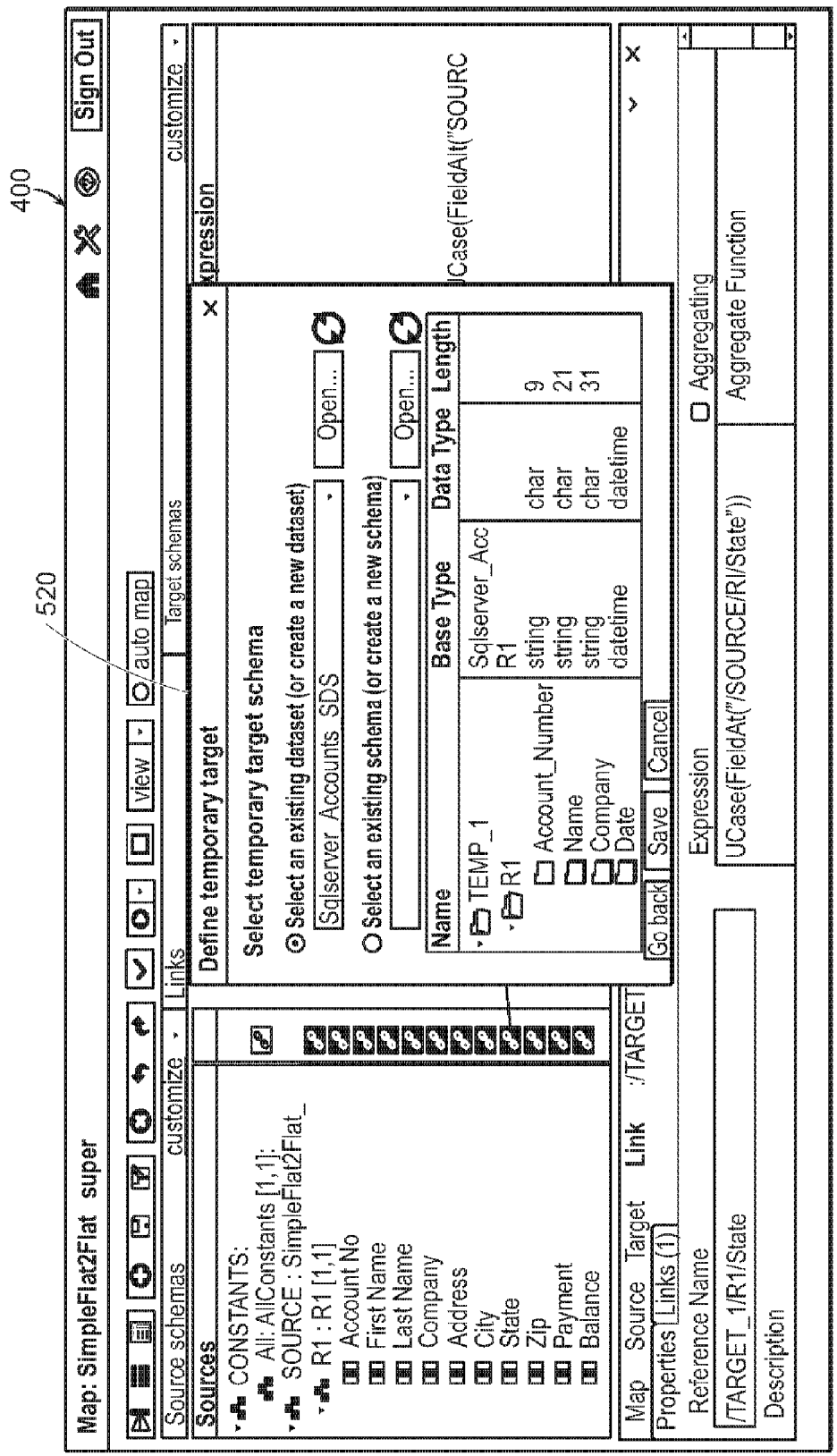

FIGS. 36-37 illustrate an exemplary embodiment in which a temporary target is added to the source schema region 410 as a secondary source. When a temporary target is selected from the drop down menu 460 (FIG. 35), a New Temporary Target Wizard 520 may prompt the user to name the temporary target (default name "TEMP_1") and provide a description (e.g., Schema), as shown in FIG. 36. After naming the temporary target and clicking on the Next button, the user is prompted to specify where the temporary target is coming from by selecting either an existing source dataset or an existing schema, as shown in FIG. 37. Once an existing dataset or schema is selected (e.g., the existing source dataset "Sqlserver_Accounts_SDS"), properties of the existing dataset or schema (such as Name, Base Type, Data Type and Length) may be displayed within the New Temporary Target Wizard 520 for verification purposes (FIG. 37). If the user is satisfied with the selection, the user may click on the Save button to add the temporary target to the source schema region 410 of the graphical mapping interface 400.

If an intermediate target (e.g., a lookup file/table or temporary target) is added to the source schema region 410 as a secondary source, a mini-map is created for mapping into the intermediate target. In some embodiments, the mini-map may be displayed upon saving and adding the intermediate target to the source schema region 410. In other embodiments, the mini-map may be re-launched by clicking on the "map state" icon corresponding to the intermediate target.

Mini-Maps

Mini-maps are created for mapping one or more sources into an intermediate target, such as a temporary target or lookup file or table. The sources available for mapping into an intermediate target include the primary source, as well as any constants or intermediate targets added to the source schema region 410 prior to adding the intermediate target for which a particular mini-map is created. In other words, intermediate targets may be nested or chained within the source schema region 410. When a first intermediate target is added to the source schema region 410, a mini-map is created for mapping the primary source (and any previously added constant variables) into the first intermediate target.

Once mapping is complete, the mini-map is closed and the first intermediate target becomes a "secondary source" in the source schema region 410.

When a second intermediate target is added to the source schema region 410, another mini-map is created for mapping one or more of the previously added sources (e.g., the primary source, the secondary source or a constant variable) into the second intermediate target. Once mapping is complete, the second mini-map is closed and the second intermediate target becomes another secondary source in the source schema region 410. There is generally no limit to the number of intermediate targets that can be added to the source schema region 410 as "secondary sources." Each secondary source added to the source schema region 410 is available for mapping into a primary target or secondary target in the target schema region 430 of the main Map Canvas.

In addition to temporary targets (e.g., temporary sets of records) and lookup files or tables, mini-maps may be created to facilitate other types of intermediate targets and advanced mapping features, such as aggregation, pivot/unpivot operations, and synthetic key generation. The use of mini-maps provides a mechanism to make complex schema maps modular, thus, simplifying the process of building complex schema maps. In some embodiments, mini-maps may be defined independently of a schema map, so that a mini-map can be reused in the same schema map or included within a library of mini-maps for use within other schema maps.

Figure 39:
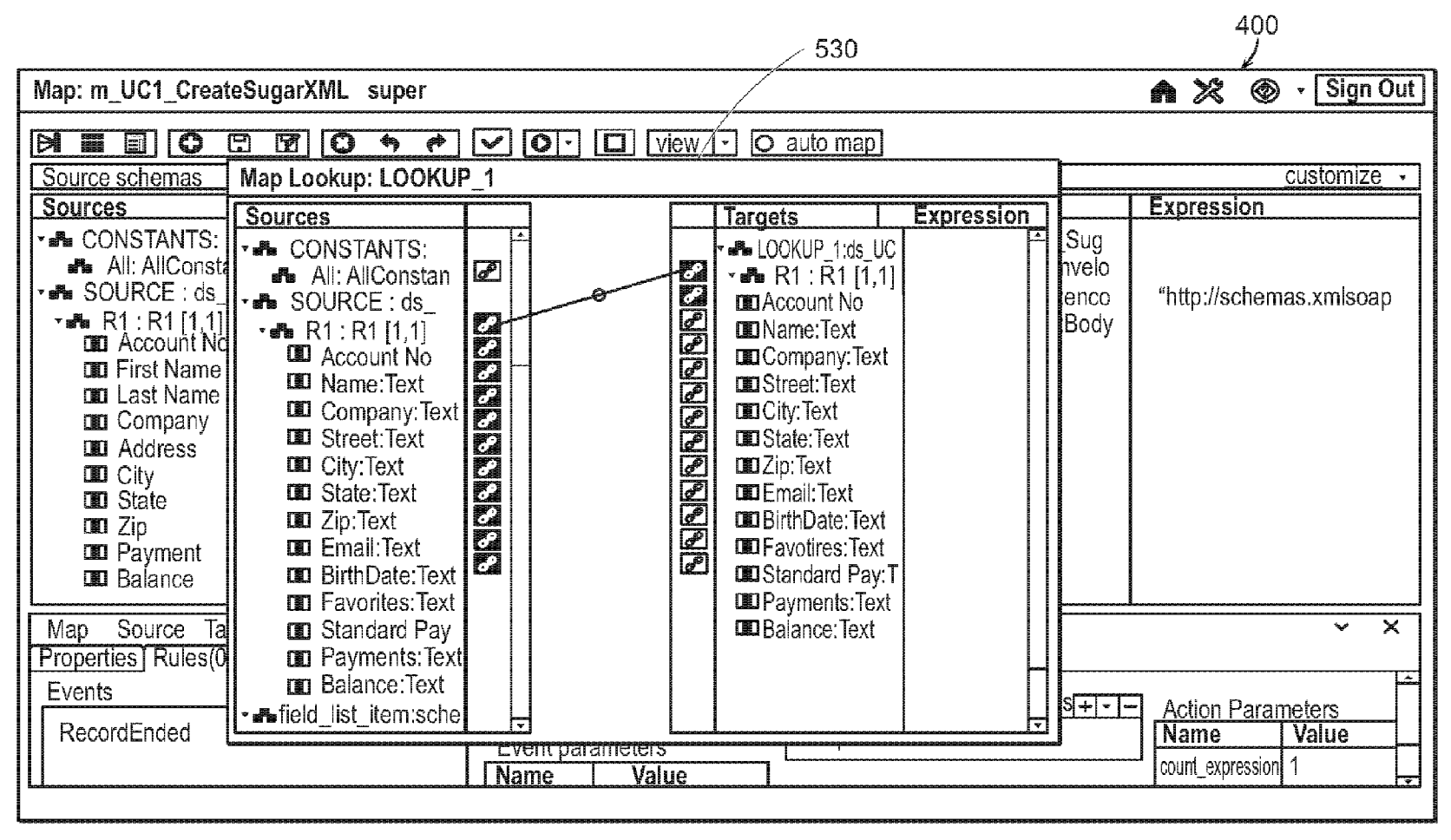
Figure 40:
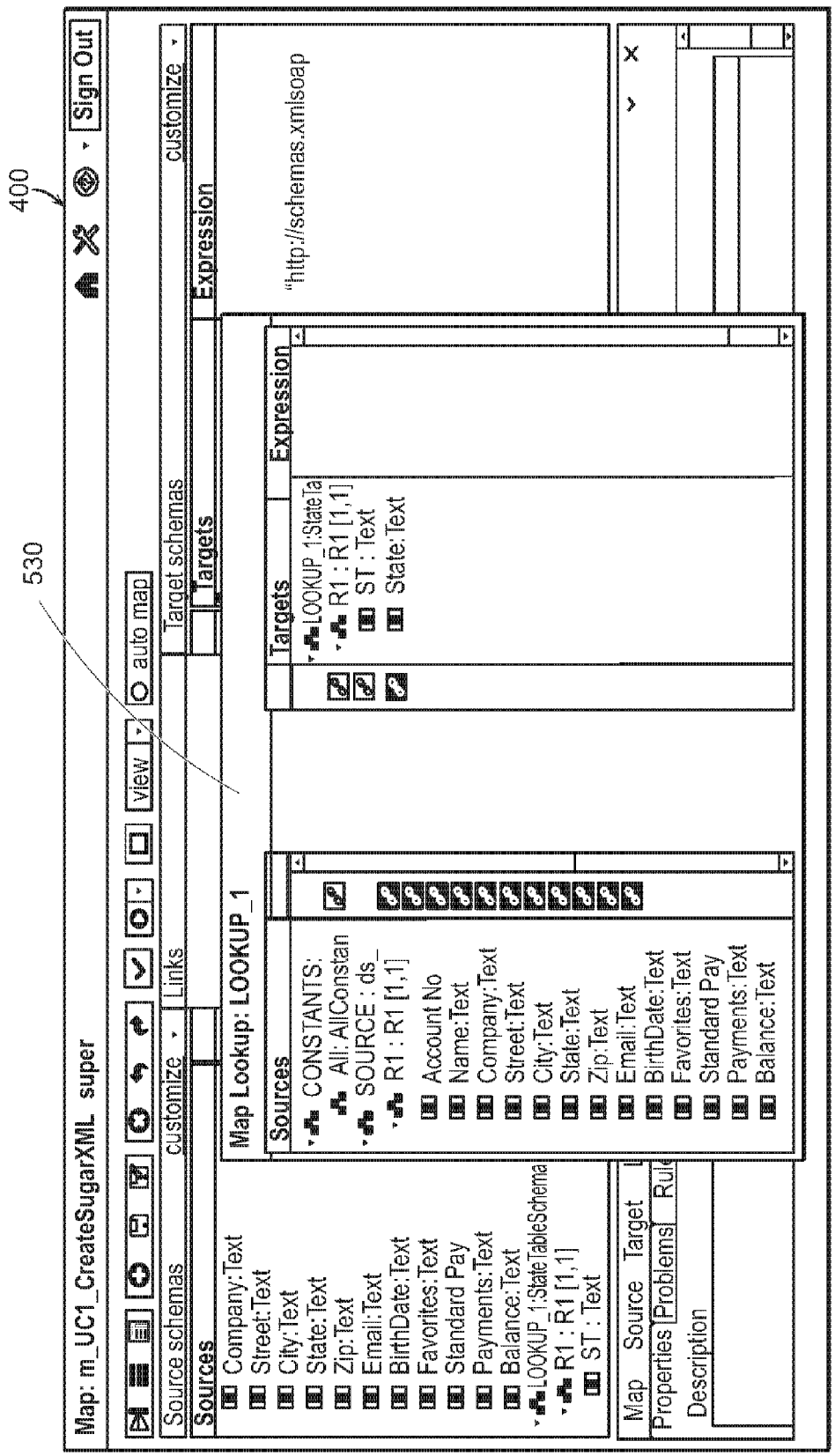

An exemplary embodiment for creating a mini-map will now be described in reference to FIGS. 38-40. While the illustrated embodiment contemplates a lookup table, a skilled artisan would understand how a substantially similar process may be used for mapping into substantially any other type of intermediate target.

Figure 38:
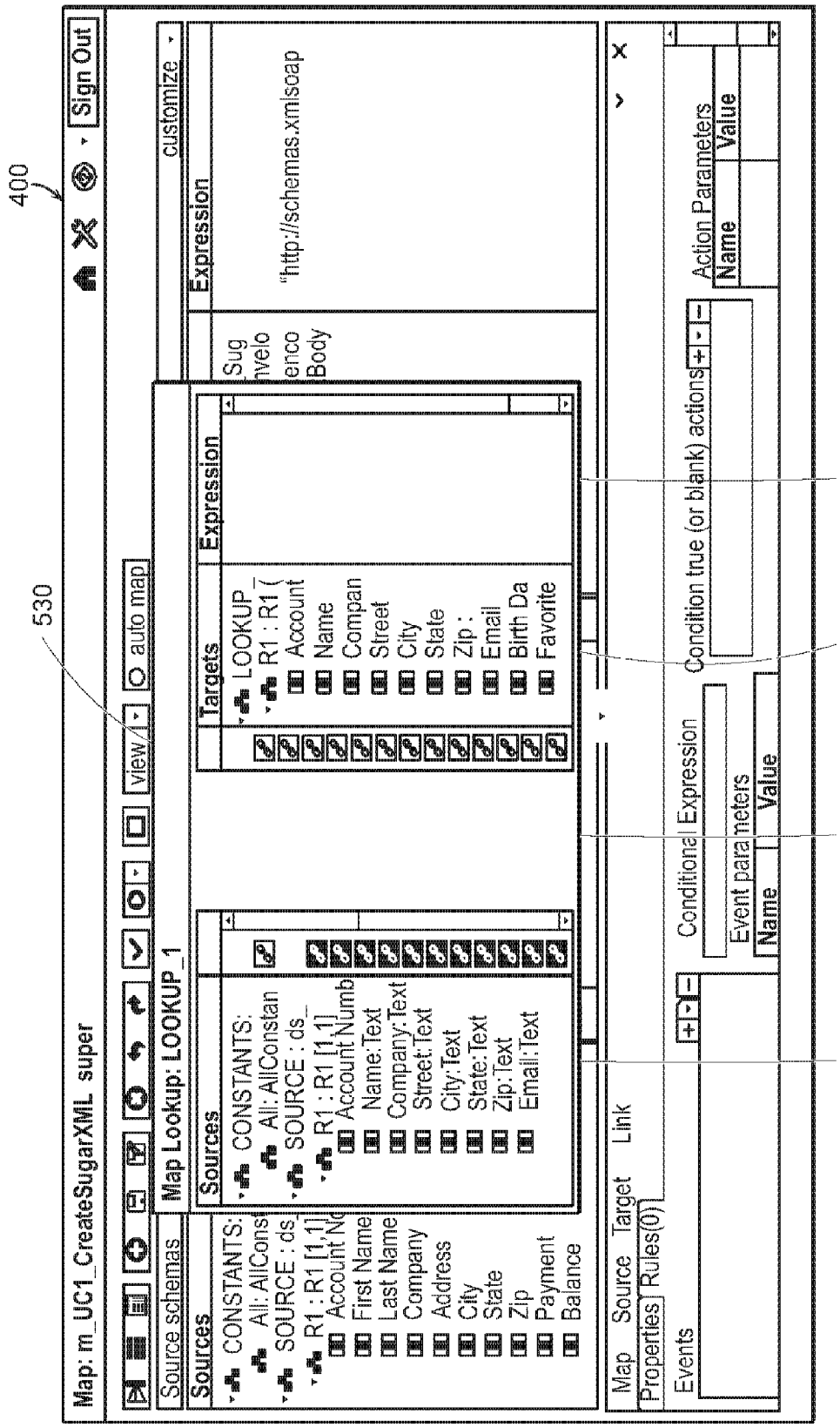
FIG. 38 is a screen shot illustrating an exemplary embodiment of a mini-map created upon adding and defining a lookup file or table.

FIG. 38 illustrates an exemplary embodiment of a mini-map 530 created for mapping a source dataset (e.g., the "ds_UCI_Accounts" source dataset) into a lookup table (named, e.g., LOOKUP_1). As noted above, the mini-map 530 may be displayed, in some embodiments, upon saving and adding the lookup table to the source schema region 410 of the main Map Canvas. In other embodiments, the mini-map may be re-launched by clicking on the "map state" icon corresponding to the lookup table in the source schema region 410. When launched, the mini-map 530 displays all sources available for mapping into the lookup table.

In some embodiments, the layout of the mini-map may be substantially identical to the layout of the main Map Canvas. For example, and as shown in FIG. 38, the mini-map may include a source schema region 532, a mapping region 534, a target schema region 536 and an expression region 538. The regions may be configured and arranged as described above. However, the mini-map is not limited to the configuration shown in FIG. 38 and may be alternatively configured in other embodiments of the invention.

In some embodiments, mapping within a mini-map may be substantially identical to mapping within the main Map Canvas. For example, and as shown in FIG. 39, control and data links may be created within the mapping region 534 between the source/target records and fields of the mini-map. In addition, ECA rules may be set for any control links created within the mini-map by specifying the desired events, conditions and actions under the Rules tab in the Link pane of console 440 when the mini-map has focus. Further, target field expressions may be added to the expression region 538 for linked and unlinked target fields. As in the main Map Canvas, target field expressions may be typed directly into the expression region 538 of the mini-map. Alternatively, an expression builder interface (otherwise referred to herein as a Script Editor) may be used to assist the user in generating the target field expressions.

Once mapping within the mini-map is complete and the mini-map is closed, the lookup table can be used as a secondary source for mapping into other intermediate targets subsequently added to the source schema region 410, or into a final target included within the target schema region 430 of the main Map Canvas. As shown in FIG. 24, the mini-map created in FIGS. 38-39 is added to the source schema region 410 as a lookup schema (named "field_list_._item"). In some embodiments, a user may wish to edit the lookup schema. Once the lookup schema is added to the source schema region 410, the lookup schema may be edited by clicking on the "map state" icon associated with that schema. This re-launches the mini-map, as shown in FIG. 40.

The ECA rules applied to the lookup schema (named "field_list_._item") may generally function to control the lookup and place lookup results in memory. Results of the lookup may be mapped to another intermediate target in the source schema region 410, or to a target field in the target schema region 430 of the main Map Canvas. In one embodiment, the lookup results may be mapped to a secondary source (e.g., "entity_list_._item"), which has been added to the source schema region 410 after the field_list_._item schema was added. To facilitate such mapping, another mini-map would be created for mapping the lookup results from the field_list_._item schema into the entity_list_._item schema. In another embodiment, the lookup results from the field_list_._item schema may be mapped into a target field included within the target schema region 430 by creating a data link between the field_list_._item schema node and the desired target field.

Adding Secondary Target(s) to a Schema Map

Figure 41:
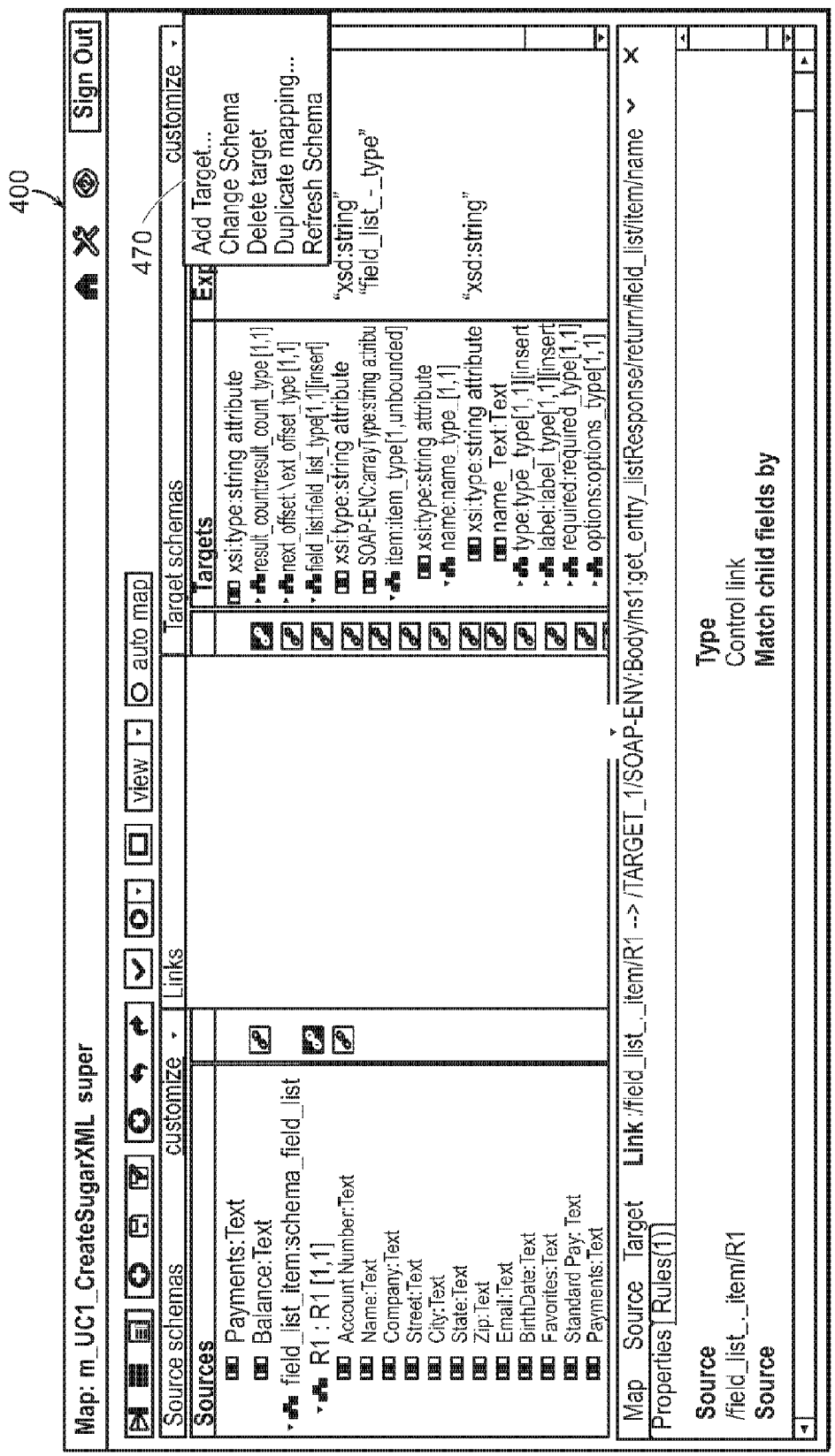
FIG. 41 is a screen shot illustrating an exemplary embodiment of how a user may add a secondary target (e.g., an additional final target) to the target schema region of the graphical mapping interface.

In some embodiments, a schema map may include multiple targets in the target schema region 430 of the graphical mapping interface 400. In addition to the primary target mentioned above, e.g., a schema may include one or more secondary targets (e.g., an additional final target). As shown in FIG. 41, secondary targets may be added to the target schema region 430 by clicking on drop down menu 470 and selecting "Add Target." Selecting the "Add Target" option launches the New Target Wizard 490 shown in FIG. 25 and discussed in detail above. Further description of the New Target Wizard 490 will be omitted herein for the sake of brevity.

Validating a Schema Map

Figure 42:
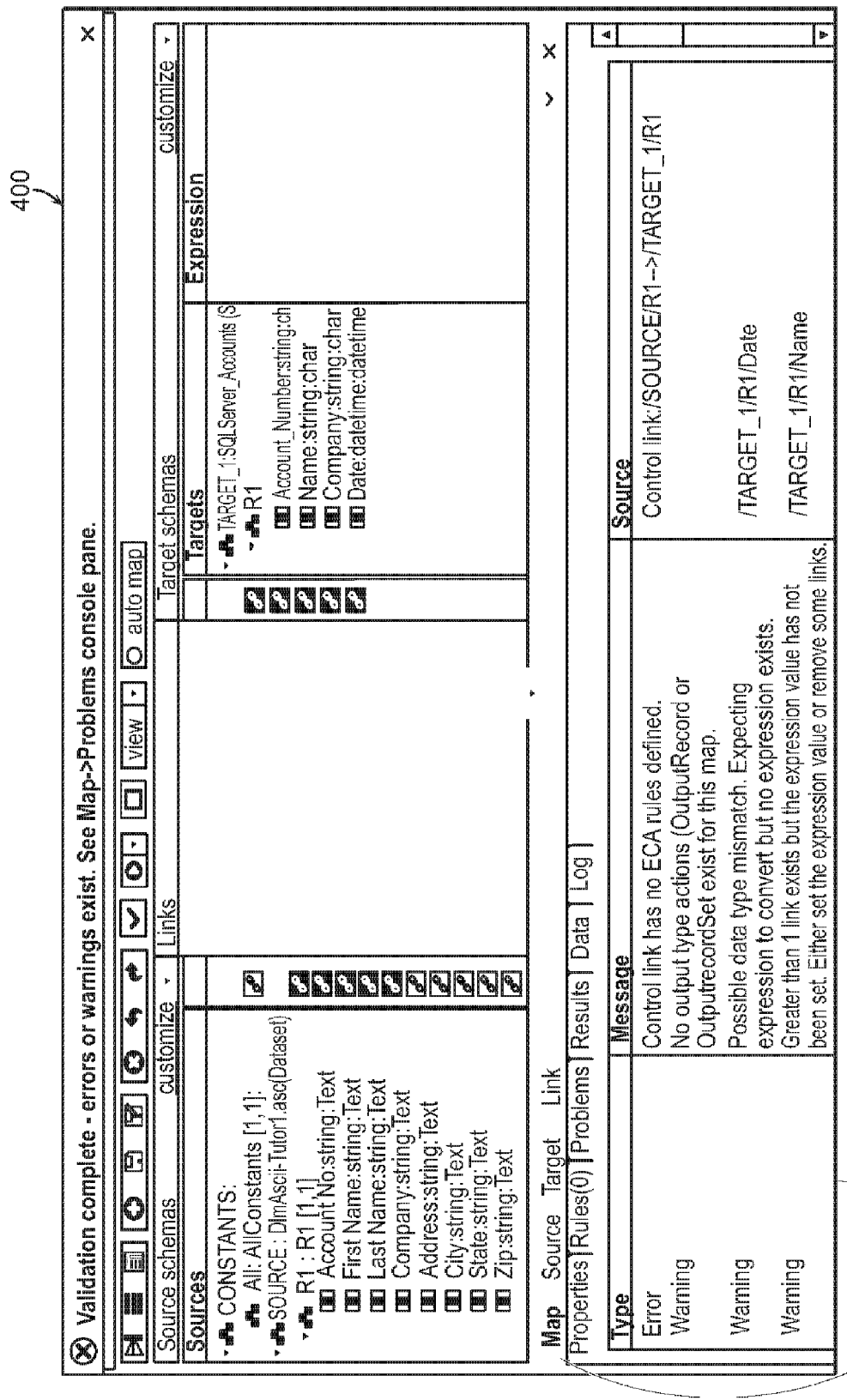
FIG. 42 is a screen shot illustrating an exemplary embodiment of validation results that may be displayed under the Problems tab in the Map pane of console panel after a user validates a schema map.

As noted above, a user can validate a map design at any time in the map design process by clicking on the validate button 470. When this occurs, the validation results are displayed under the Problems tab in the Map pane 442 of console panel 440, with each validation issue listed on a separate row in the problems grid. This is shown in the exemplary embodiment of FIG. 42. In particular, FIG. 42 illustrates an exemplary problems grid including the source of the validation issue (e.g., a particular, target node or link), the type of validation issue (e.g., an error or warning) and a message describing the validation issue. For example, the problems grid shown in FIG. 42 informs the user that the control link /SOURCE/R1->TARGET_1/R1 includes an error because no ECA rules have been defined for the control link. In addition, the problems grid informs the user of various warnings associated with the TARGET_1/R1 Name and Date fields.

Figure 43:
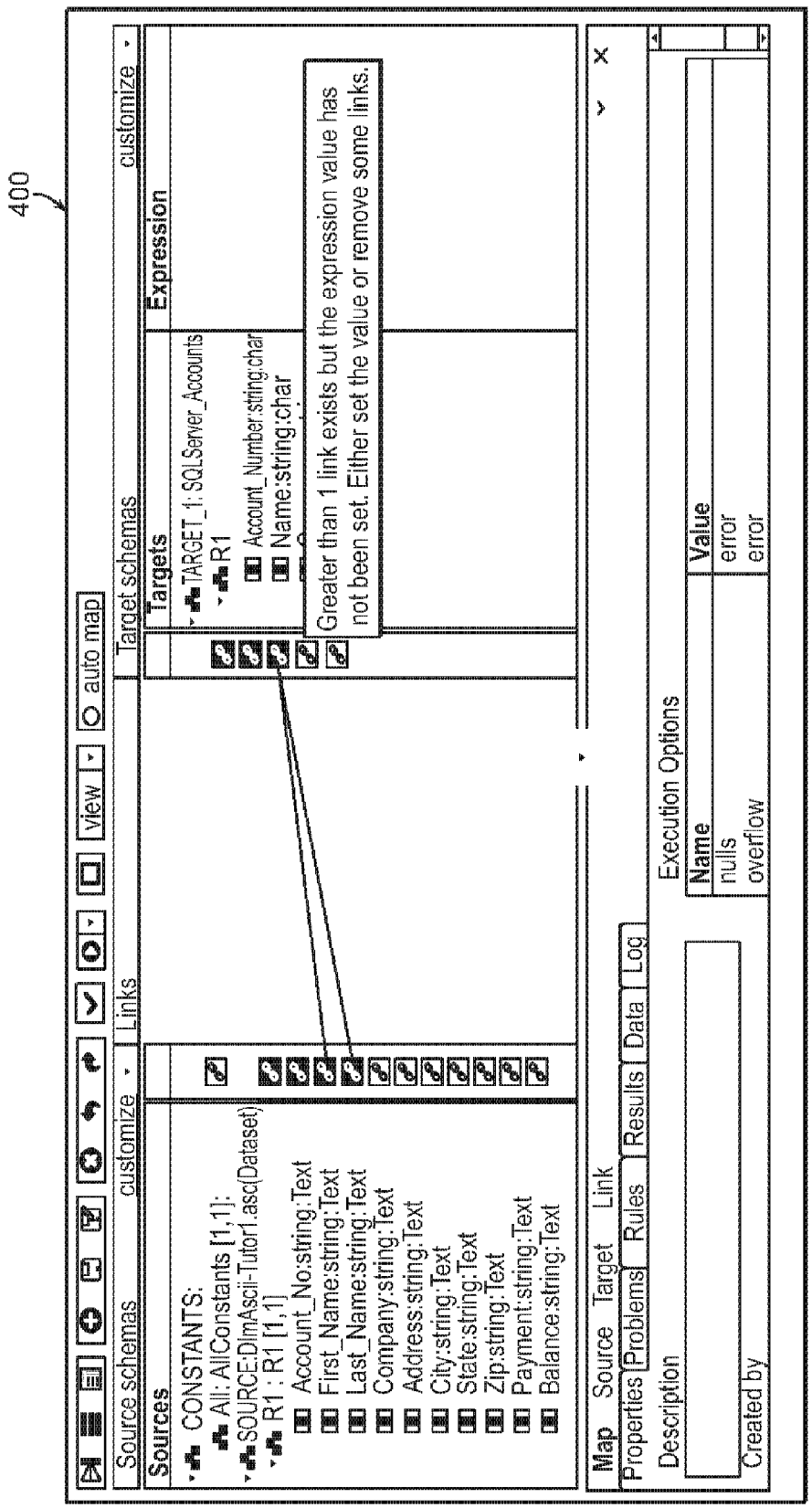
FIG. 43 is a screen shot providing an example of a visual indication that may be displayed to a user while mapping a source node to a target node to indicate to the user that one or more mapping problems may occur when mapping those nodes.

In addition to the validation process described above, the map designer/graphical mapping interface 400 includes visual indication of possible mapping problems that may occur while mapping. In one embodiment, a caution sign icon may be displayed over a target node to warn the user of potential validation issues that may occur as a result of mapping to the target node. In addition to the caution sign icon, tool tips may be displayed to describe the potential validation issue and any options available for avoiding the issue. As shown in FIG. 43, for example, a caution sign icon may be displayed over the target node corresponding to the /TARGET 1/R1/Name field to warn the user of a potential validation issue that may occur when mapping the /SOURCE/R1/Last_Name field to the /TARGET 1/R1/Name field. The tool tip informs the user that multiple links have been drawn to the target field node without an expression. To avoid a potential validation issue, the tool tip suggests setting the expression value or removing one of the links.

The validation features provided by the graphical mapping interface 400 enhance the mapping process by providing a highly visual and fully descriptive mechanism for warning users of potential validation issues that may occur in a map, as well as indicating how such issues may be avoided. The validation features provide support for many different types of errors and warnings, only some of which are shown in FIGS. 42-43.

Creating a Runtime Configuration

Designing a map and running a map are two different operations. As noted above, a map can be designed once and run multiple times with different run-time configurations. Each runtime configuration for a map is stored separately in the design repository (160, FIG. 2A).

A runtime configuration contains the settings necessary to run a schema map. For example, a runtime configuration may specify the datasets to be used for all sources, intermediate targets and final targets included within the schema map. In addition, the runtime configuration may specify execution and logging options, as well as initial values for variables and setting values for macros. The runtime configuration dialog box enables the user to create new runtime configurations, run existing configurations, duplicate configurations and delete configurations. If the user attempts to load an existing configuration that no longer matches the schema map, the user will be prompted to make some changes before running the map. The runtime configuration box may be launched by clicking on the drop down menu of run button 472 and selecting "Configurations".

Figure 44:
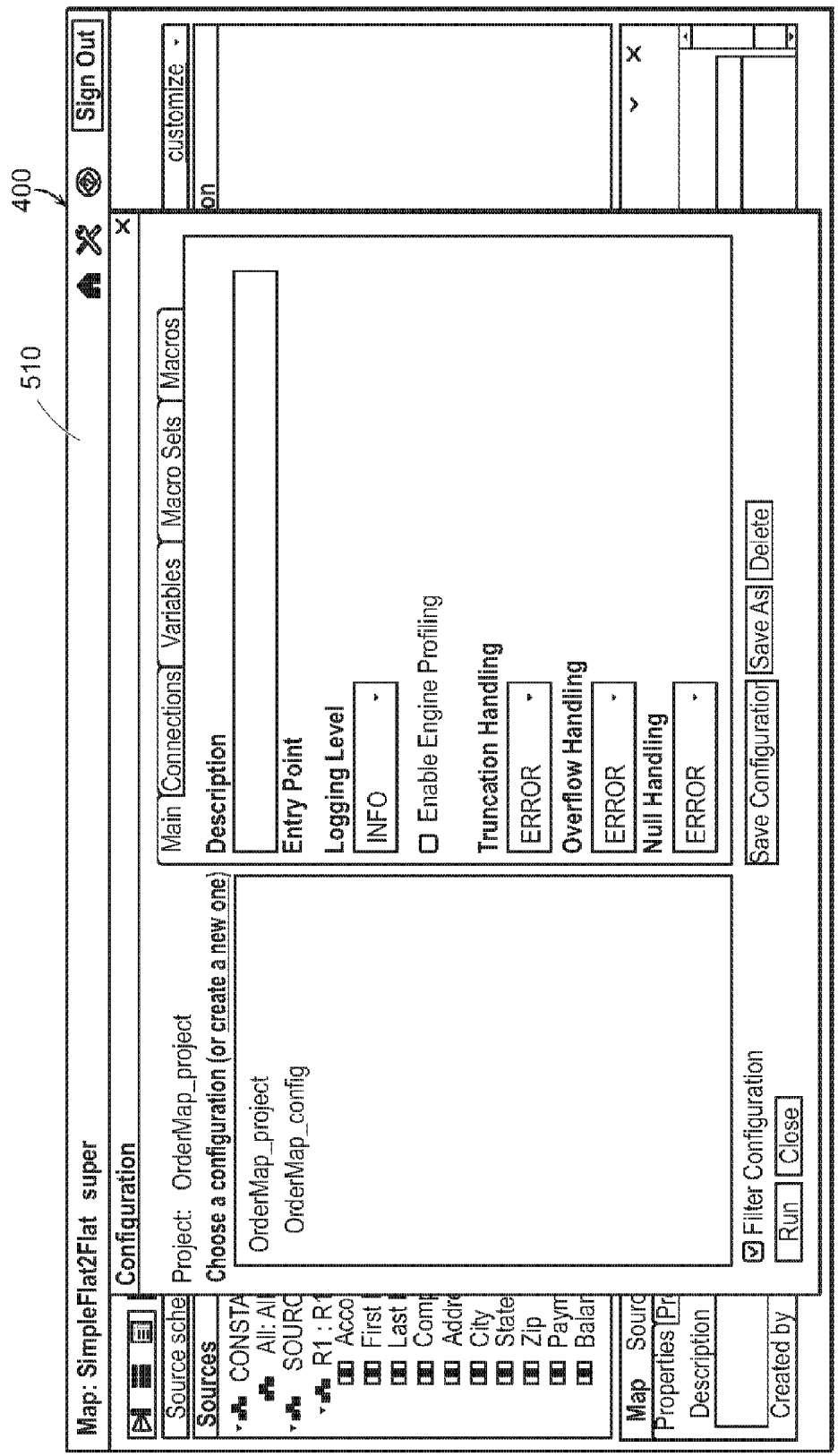
FIG. 44 is a screen shot illustrating an exemplary embodiment of a runtime configuration box that may be used to create a new runtime configuration or run a schema using an existing runtime configuration.

FIG. 44 illustrates one embodiment of a runtime configuration dialog box 540. The left side of the runtime configuration box 540 shows a list of runtime configurations (e.g., OrderMap_config) currently saved within the repository project. A user may run a schema map using one of the currently saved configurations or add a new configuration by clicking the "create a new one" link. The right side of the runtime configuration box 540 is used for setting the runtime properties. The Main tab includes the entry point (i.e., what schema map to run), the logging settings (e.g., logging level) and the execution settings (e.g., truncation, overflow and Null handling). The Connections tab may be used for setting or overriding all datasets associated with the sources, targets and lookups of the map. The Variables and Macros tabs may be used for overriding values for variables and macros used in the map.

Running a Map

The final step of the mapping process is to run the map. If one or more runtime configurations have already been defined for a map, clicking on the run button 472 displays a drop down list of the runtime configurations available to run the map. Clicking directly on one of these will run the map using the selected runtime configuration.

As noted above, a user may view the status of the map execution under the Results tab in the Map pane 442 of console panel 440 while a map is running. After execution of the map is complete, the user may view a log file of the map execution under the Log tab in the Map pane of console panel 440. In addition, the user may view a list of all datasets that were defined in the selected runtime configuration under the Data tab in the Map pane of console panel 440. By clicking on any one of these datasets, the user may view the source data or the target data that was produced by successful execution of the map.

If the user is satisfied with the map execution, the package builder 180 shown in FIG. 2A may be utilized to build a deployment package of the project. To create a deployment package, the package builder 180 extracts a set of project artifacts (e.g., schema maps, datasets, configurations and script libraries) from the design repository 160 and creates an executable having everything the transformation engine needs to execute a transformation. Once created, the deployment package may be stored within a deployment repository (not shown) for later use, or loaded into the transformation engine 110 along with a selected run-time configuration to execute a schema map during runtime.

It will be appreciated to those skilled in the art having the benefit of this disclosure that this invention is believed to provide an improved schema mapping language for use within an improved map designer/graphical mapping interface, which improves upon and enhances the abilities of an event-drive data transformation system. Further modifications and alternative embodiments of various aspects of the invention will be apparent to those skilled in the art in view of this description. It is intended, therefore, that the following claims be interpreted to embrace all such modifications and changes and, accordingly, the specification and drawings are to be regarded in an illustrative rather than a restrictive sense.

What is claimed is:

1. A graphical mapping interface for creating and displaying a schema map, wherein the graphical mapping interface is displayed on a screen and implemented with computer-readable instructions, which are stored on a non-transitory computer-readable storage medium and executed on a processor, and wherein the graphical mapping interface comprises:

a main map window comprising a source schema region adapted for displaying a graphical representation of a primary source schema defining a structure of a primary data source; and a pop-up map window accessible from the main map window, wherein the pop-up map window comprises:

a source schema region adapted for displaying a graphical representation of the primary source schema, wherein the primary source schema comprises at least one source node;

a target schema region adapted for displaying a graphical representation of an intermediate target schema, wherein the intermediate target schema comprises at least one intermediate target node;

an expression region adapted for displaying at least one target field expression for at least one intermediate target node displayed in the target schema region of the pop-up map window;

a mapping region adapted for creating and displaying a graphical representation of one or more links connecting one or more nodes of the primary source schema to one or more nodes of the intermediate target schema within the pop-up map window; and wherein upon closing the pop-up map window, a graphical representation of the intermediate target schema is displayed in the source schema region of the main map window and accessible for mapping within the main map window.

2. The graphical mapping interface as recited in claim 1, wherein the mapping displayed in the pop-up map window is adapted to perform a lookup operation on the primary source schema and provide results of the lookup operation to the intermediate target schema.

3. The graphical mapping interface as recited in claim 1, wherein the mapping displayed in the pop-up map window is adapted to transfer at least a subset of data from the primary source schema to the intermediate target schema.

4. The graphical mapping interface as recited in claim 1, further comprising a second pop-up map window accessible from the main map window and adapted for creating and displaying a mapping between a second intermediate target schema and at least one of the primary source schema and the intermediate target schema, wherein upon closing the second pop-up map window, a graphical representation of the second intermediate target schema is displayed in the source schema region and accessible for mapping within the main map window.

5. The graphical mapping interface as recited in claim 1, wherein the rule is created and displayed in a console panel region of the main map window when the pop-up map window is displayed.

6. The graphical mapping interface as recited in claim 1, wherein the main map window further comprises:

a target schema region adapted for displaying a graphical representation of at least one target schema; and a mapping region adapted for creating and displaying a graphical representation of one or more links connecting one or more nodes of the primary source schema to one or more nodes of the at least one target schema.

7. The graphical mapping interface as recited in claim 6, wherein the mapping region of the main map window is further adapted for creating and displaying a graphical representation of a link connecting a node of the intermediate target schema displayed in the source schema region of the main map window to a node of the at least one target schema displayed in the target schema region of the main map window.

8. A method for creating a mapping in a graphical mapping interface that is displayed on a screen and implemented with computer-readable instructions, which are stored on a non-transitory computer-readable storage medium and executed on a processor, the method comprising:

displaying a main map window comprising a source schema region, which is adapted for displaying a graphical representation of a primary source schema defining a structure of a primary data source;

accessing a pop-up map window from the main map window;

creating a mapping between the primary source schema and an intermediate target schema by drawing one or more graphical links connecting one or more nodes of the primary source schema to one or more nodes of the intermediate target schema within a mapping region of the pop-up map window, wherein the step of creating a mapping between the primary source schema and the intermediate target schema comprises:

displaying a graphical representation of the primary source schema within a source schema region of the pop-up map window, wherein the primary source schema comprises a plurality of source nodes;

displaying a graphical representation of the intermediate target schema within a target schema region of the pop-up map window, wherein the intermediate target schema comprises a plurality of intermediate target nodes; and creating a mapping between the primary source schema and the intermediate target schema by drawing a plurality of graphical links between the source nodes and the intermediate target nodes, wherein the plurality of graphical links comprise at least one control link and at least one data link, and wherein graphical representations of the control and data links are displayed in the mapping region of the pop-up map window; and wherein upon closing the pop-up map window, a graphical representation of the intermediate target schema is displayed in the source schema region of the main map window.

9. The method as recited in claim 8, further comprising creating, within a mapping region of the main map window, a mapping between the intermediate target schema displayed in the source schema region and a primary target schema displayed in a target schema region of the main map window.

10. The method as recited in claim 8, further comprising:

accessing a second pop-up window from the main map window, wherein the second pop-up window is associated with the graphical representation of the intermediate target schema displayed in the source schema region of the main map window; and creating a mapping within the second pop-up map window between a second intermediate target schema and at least one of the primary source schema and the intermediate target schema, wherein upon closing the second pop-up map window, a graphical representation of the second intermediate target schema is displayed in the source schema region of the main map window.

11. The method as recited in claim 8, wherein the step of creating a mapping between the primary source schema and the intermediate target schema further comprises specifying a rule associated with the at least one control link, wherein the at least one control link connects a particular source node to a particular intermediate target node, and wherein the rule specifies an event corresponding to the particular source node, a conditional expression, and an action to be performed for the particular intermediate target node if an occurrence of the event is detected in the primary data source and the conditional expression is met.

12. The method as recited in claim 8, wherein the step of creating a mapping between the primary source schema and the intermediate target schema further comprises specifying at least one target field expression within an expression region of the pop-up map window for at least one intermediate target node displayed in the target schema region of the pop-up map window, and wherein a textual representation of the at least one target field expression is displayed in the expression region.

13. A graphical mapping interface for creating and displaying a schema map, wherein the graphical mapping interface is displayed on a screen and implemented with computer-readable instructions, which are stored on a non-transitory computer-readable storage medium and executed on a processor, and wherein the graphical mapping interface comprises:
- a source schema region adapted for displaying a graphical representation of at least one source schema;
- a target schema region adapted for displaying a graphical representation of at least one target schema comprising at least one target record node, which is configured for supporting multiple types of output operations on one or more target objects included within the at least one target record node, wherein the multiple types of output operations comprise an insert operation, a delete operation, an update operation and an upsert operation;
- a console region adapted for setting properties of the at least one target record node, wherein the properties comprise a target reference name, an output operation selected from the multiple types of output operations and a target object name for each of the one or more target objects; and
- a mapping region adapted for creating and displaying a graphical representation of links connecting nodes of the at least one source schema to nodes of the at least one target schema.

14. The graphical mapping interface as recited in claim 13, wherein the at least one target schema comprises a plurality of record types, and wherein an output operation and a target reference name is defined for each record type.

15. The graphical mapping interface as recited in claim 14, wherein the output operation is selected from a group comprising an insert operation, a delete operation, an update operation and an upsert operation.

16. The graphical mapping interface as recited in claim 13, wherein the source schema region is adapted for displaying a graphical representation of a plurality of source schemas, wherein the target schema region is adapted for displaying a graphical representation of a plurality of target schemas, and wherein the plurality of source schemas and the plurality of target schemas comprise different schema types.

17. The graphical mapping interface as recited in claim 16, wherein the different schema types are selected from a group comprising single mode, multi-mode, multi-record, flat and hierarchical schema types.

18. A data transformation system, comprising:
- a graphical mapping interface for creating and displaying a schema map, wherein the graphical mapping interface is displayed on a screen and implemented with computer-readable instructions, which are stored on a non-transitory computer-readable storage medium and executed on a processor, and wherein the graphical mapping interface comprises:
  - a main map window comprising a source schema region adapted for displaying a graphical representation of a primary source schema defining a structure of a primary data source; and
  - a pop-up map window accessible from the main map window, wherein the pop-up map window comprises:
    - a source schema region adapted for displaying a graphical representation of the primary source schema, wherein the primary source schema comprises at least one source node;
    - a target schema region adapted for displaying a graphical representation of an intermediate target schema, wherein the intermediate target schema comprises at least one intermediate target node;
    - an expression region adapted for displaying at least one target field expression for at least one intermediate target node displayed in the target schema region of the pop-up map window; and
    - a mapping region adapted for creating and displaying a graphical representation of one or more links connecting one or more nodes of the primary source schema to one or more nodes of the intermediate target schema within the pop-up map window; and
  - wherein upon closing the pop-up map window, a graphical representation of the intermediate target schema is displayed in the source schema region of the main map window and accessible for mapping within the main map window.

19. The data transformation system as recited in claim 18, wherein the mapping region of the pop-up map window is further adapted for displaying at least one control link connecting a source record node of the primary source schema to an intermediate record node of the intermediate target schema, and wherein a rule associated with the at least one control link specifies an event corresponding to the source record node, a conditional expression, and an action to be performed for the intermediate target node if an occurrence of the event is detected in the primary data source and the conditional expression is met.

20. The data transformation system as recited in claim 18, wherein the main map window further comprises:
- a target schema region adapted for displaying a graphical representation of at least one target schema; and
- a mapping region adapted for creating and displaying a graphical representation of one or more links connecting one or more nodes of the primary source schema to one or more nodes of the at least one target schema.

21. The data transformation system as recited in claim 20, wherein the mapping region of the main map window is further adapted for creating and displaying a graphical representation of a link connecting a node of the intermediate target schema displayed in the source schema region of the main map window to a node of the at least one target schema displayed in the target schema region of the main map window.

22. The data transformation system as recited in claim 20, wherein the at least one target schema displayed in the target schema region of the main map window comprises at least one target record node having multiple output operations associated therewith.

23. The data transformation system as recited in claim 22, wherein the multiple output operations are selected from a group comprising an insert operation, a delete operation, an update operation and an upsert operation.

24. The data transformation system as recited in claim 20, wherein the source schema region of the main map window is adapted for displaying a graphical representation of a plurality of source schemas, wherein the target schema region of the main map window is adapted for displaying a graphical representation of a plurality of target schemas, and wherein the plurality of source schemas and the plurality of target schemas comprise different schema types.

25. The data transformation system as recited in claim 24, wherein the different schema types are selected from a group comprising single mode, multi-mode, multi-record, flat and hierarchical schema types.

26. The data transformation system as recited in claim 18, further comprising a design repository for storing the schema map created via the graphical mapping interface.

27. The data transformation system as recited in claim 26, further comprising a package builder coupled for extracting the schema map from the design repository and configured for packaging the schema map into a deployment package.

28. The data transformation system as recited in claim 27, further comprising:
 a read spoke configured for retrieving data from the data source;
 a target spoke configured for storing transformed data to the data target; and
 a transformation engine coupled to the read spoke for receiving the data from the data source, coupled to the target spoke for storing the transformed data in the data target, and coupled to the package builder for receiving the deployment package, wherein the transformation engine is configured for transforming the received data into the transformed data using the schema map included within the deployment package.

29. A graphical mapping interface for creating and displaying a schema map, wherein the graphical mapping interface is displayed on a screen and implemented with computer-readable instructions, which are stored on a non-transitory computer-readable storage medium and executed on a processor, and wherein the graphical mapping interface comprises:
 a main map window comprising a source schema region adapted for displaying a graphical representation of a primary source schema defining a structure of a primary data source; and
 a pop-up map window accessible from the main map window, wherein the pop-up map window comprises:
  a source schema region adapted for displaying a graphical representation of the primary source schema, wherein the primary source schema comprises at least one source node;
  a target schema region adapted for displaying a graphical representation of an intermediate target schema, wherein the intermediate target schema comprises at least one intermediate target node; and
  a mapping region adapted for creating and displaying a graphical representation of one or more links connecting one or more nodes of the primary source schema to one or more nodes of the intermediate target schema within the pop-up map window, wherein the one or more links comprise at least one control link connecting a source record node of the primary source schema to an intermediate record node of the intermediate target schema, and wherein a rule associated with the at least one control link specifies an event corresponding to the source record node, a conditional expression, and an action to be performed for the intermediate target node if an occurrence of the event is detected in the primary data source and the conditional expression is met; and wherein upon closing the pop-up map window, a graphical representation of the intermediate target schema is displayed in the source schema region of the main map window and accessible for mapping within the main map window.

30. The graphical mapping interface as recited in claim 29, wherein the mapping displayed in the pop-up map window is adapted to perform a lookup operation on the primary source schema and provide results of the lookup operation to the intermediate target schema.

31. The graphical mapping interface as recited in claim 29, wherein the mapping displayed in the pop-up map window is adapted to transfer at least a subset of data from the primary source schema to the intermediate target schema.

32. The graphical mapping interface as recited in claim 29, further comprising a second pop-up map window accessible from the main map window and adapted for creating and displaying a mapping between a second intermediate target schema and at least one of the primary source schema and the intermediate target schema, wherein upon closing the second pop-up map window, a graphical representation of the second intermediate target schema is displayed in the source schema region and accessible for mapping within the main map window.

33. The graphical mapping interface as recited in claim 29, wherein the pop-up map window further comprises an expression region adapted for displaying at least one target field expression for at least one intermediate target node displayed in the target schema region of the pop-up map window.

34. The graphical mapping interface as recited in claim 29, wherein the rule is created and displayed in a console panel region of the main map window when the pop-up map window is displayed.

35. The graphical mapping interface as recited in claim 29, wherein the main map window further comprises:
 a target schema region adapted for displaying a graphical representation of at least one target schema; and
 a mapping region adapted for creating and displaying a graphical representation of one or more links connecting one or more nodes of the primary source schema to one or more nodes of the at least one target schema.

36. The graphical mapping interface as recited in claim 35, wherein the mapping region of the main map window is further adapted for creating and displaying a graphical representation of a link connecting a node of the intermediate target schema displayed in the source schema region of the main map window to a node of the at least one target schema displayed in the target schema region of the main map window.

* * * * *